Oct. 6, 1959 J. M. CUNNINGHAM 2,907,521
TOLL HIGHWAY RECORDER
Filed Dec. 21, 1953 28 Sheets-Sheet 1

INVENTOR.
JAMES M. CUNNINGHAM
BY
*J. Janerin Jr.*
ATTORNEY

Oct. 6, 1959      J. M. CUNNINGHAM      2,907,521

TOLL HIGHWAY RECORDER

Filed Dec. 21, 1953      28 Sheets-Sheet 2

FIG. 4

| LANE IDENTIFICATION | 24 02 | 24 02 |
| INTERCHANGE NUMBER | | |
| SEQUENCE NUMBER | 1592 | 1642 |
| REVERSE AXLE COUNT | 0006 | 0031 |
| FORWARD AXLE COUNT | 1348 | 1523 |
| TOTAL AXLES SELECTED | 1342 | 1492 |

FIG. 3

| CLASS | | | | | FARE FROM FARTHEST TERMINAL, STATION NUMBER 47 | | | | | | CLASS | |
|---|---|---|---|---|---|---|---|---|---|---|---|---|
| 10 | 10.80 | | | 1.05 | | | | | | 11.50 | 10 |
| 9 | 10.20 | | | .95 | | | | | | 11.00 | 9 |
| 8 | 9.00 | | | .85 | | | | | | 10.30 | 8 |
| 7 | 8.15 | | | .75 | | | | | | 9.10 | 7 |
| 6 | 7.00 | | | .65 | | | | | | 8.05 | 6 |
| 5 | 6.05 | | | .55 | | | | | | 7.10 | 5 |
| 4 | 5.00 | | | .45 | | | | | | 6.00 | 4 |
| 3 | 3.95 | | | .35 | | | | | | 4.95 | 3 |
| 2 | 2.85 | | | .25 | | | | | | 3.30 | 2 |
| 1 | 2.00 | | | .15 | | | | | | 2.25 | 1 |
| 11 | 11.20 | | | 1.15 | | | | | | 12.00 | 11 |
| 12 | 11.80 | | | 1.25 | | | | | | 12.25 | 12 |
| TO STAT. NO. | 5 | 10 | 12 | 35 | 32 | 30 | 28 | 40 | 42 | 44 | 47 | |

FIG. 2

ENTRANCE BINGHAMTON
ANY STATE TURNPIKE
TRIP CARD

| | DAY | TIME | LANE | COLL. |
|---|---|---|---|---|
| | | | 1 | H 3 |
| | | | 8 | M 4 |
| | | 18:26 | 1 | |
| | 265 | 20:30 | 0 | |
| SEQ. NO. | | | | |
| 1593 | 265 | | | |
| 5678 | | | | |

INVENTOR.
JAMES M. CUNNINGHAM

BY J. Janecin Jr.

ATTORNEY

Oct. 6, 1959  J. M. CUNNINGHAM  2,907,521
TOLL HIGHWAY RECORDER
Filed Dec. 21, 1953  28 Sheets-Sheet 3
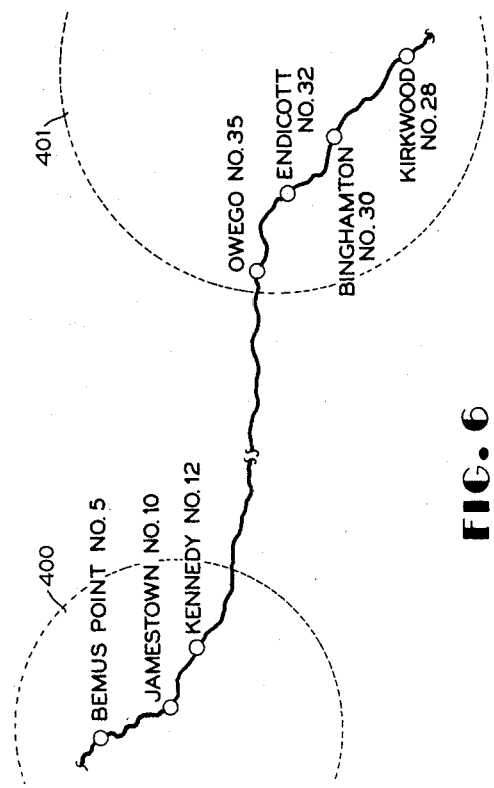
INVENTOR.
JAMES M. CUNNINGHAM
BY
J. Tannin Jr.
ATTORNEY INVENTOR.
JAMES M. CUNNINGHAM
BY
J. Jancin Jr.
ATTORNEY Oct. 6, 1959 J. M. CUNNINGHAM 2,907,521
TOLL HIGHWAY RECORDER
Filed Dec. 21, 1953 28 Sheets-Sheet 5

INVENTOR.
JAMES M. CUNNINGHAM
BY
ATTORNEY

Oct. 6, 1959

J. M. CUNNINGHAM 2,907,521

TOLL HIGHWAY RECORDER

Filed Dec. 21, 1953

INVENTOR.
JAMES M. CUNNINGHAM

BY

*T. Jansen Jr.*

ATTORNEY

Oct. 6, 1959  J. M. CUNNINGHAM  2,907,521
TOLL HIGHWAY RECORDER
Filed Dec. 21, 1953  28 Sheets-Sheet 7

*INVENTOR.*
JAMES M. CUNNINGHAM

BY

*J. Jansen Jr.*

ATTORNEY

Oct. 6, 1959 J. M. CUNNINGHAM 2,907,521
TOLL HIGHWAY RECORDER
Filed Dec. 21, 1953 28 Sheets-Sheet 10

*INVENTOR.*
JAMES M. CUNNINGHAM
BY
*J. Jancin Jr.*
ATTORNEY

INVENTOR.
JAMES M. CUNNINGHAM

Oct. 6, 1959  J. M. CUNNINGHAM  2,907,521
TOLL HIGHWAY RECORDER

Filed Dec. 21, 1953  28 Sheets-Sheet 12

*INVENTOR.*
JAMES M. CUNNINGHAM
BY
ATTORNEY

Oct. 6, 1959   J. M. CUNNINGHAM   2,907,521
TOLL HIGHWAY RECORDER
Filed Dec. 21, 1953   28 Sheets-Sheet 14

INVENTOR.
JAMES M. CUNNINGHAM
BY
ATTORNEY

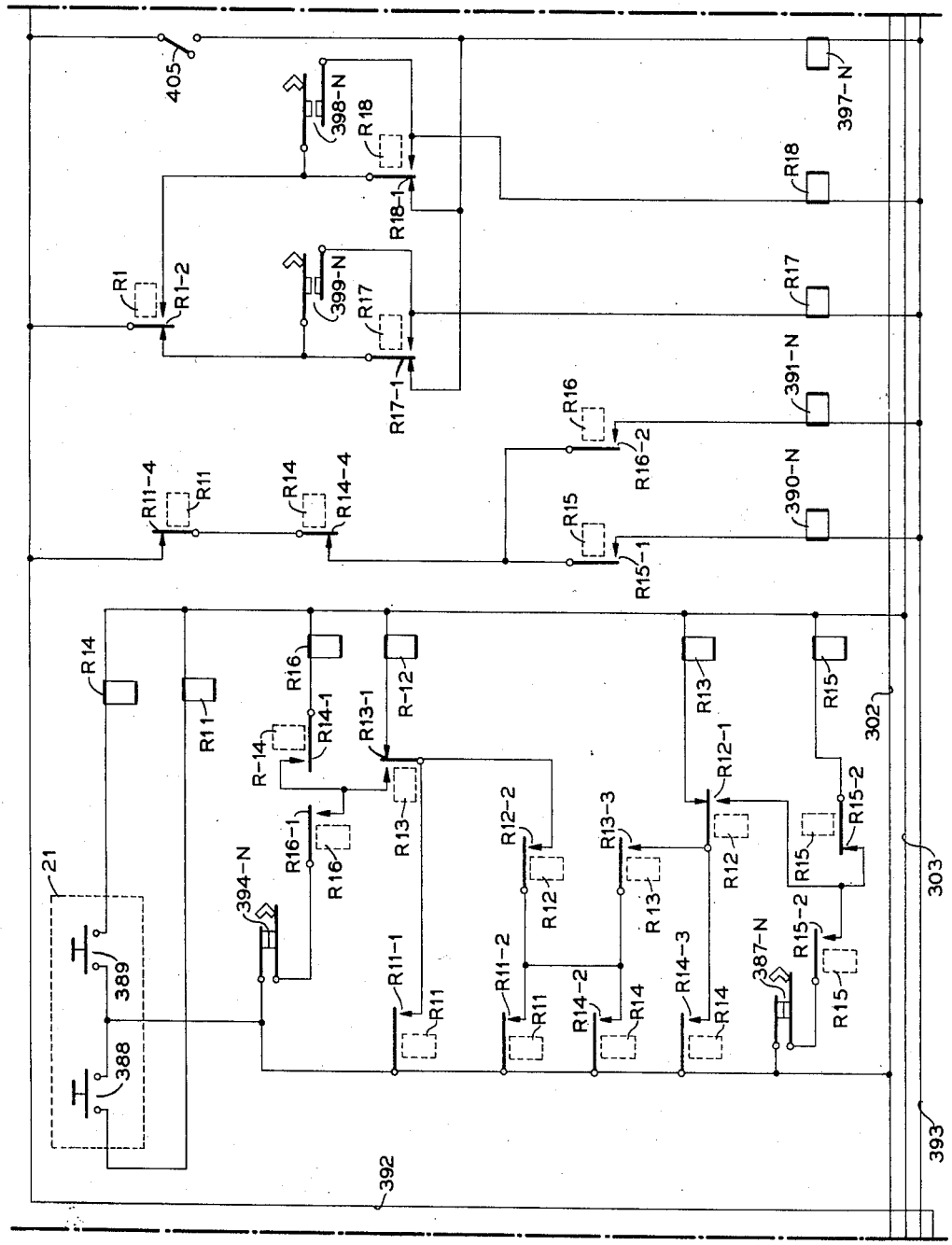

Oct. 6, 1959   J. M. CUNNINGHAM   2,907,521
TOLL HIGHWAY RECORDER
Filed Dec. 21, 1953   28 Sheets-Sheet 17

INVENTOR.
JAMES M. CUNNINGHAM
BY
J. Tavein Jr.
ATTORNEY

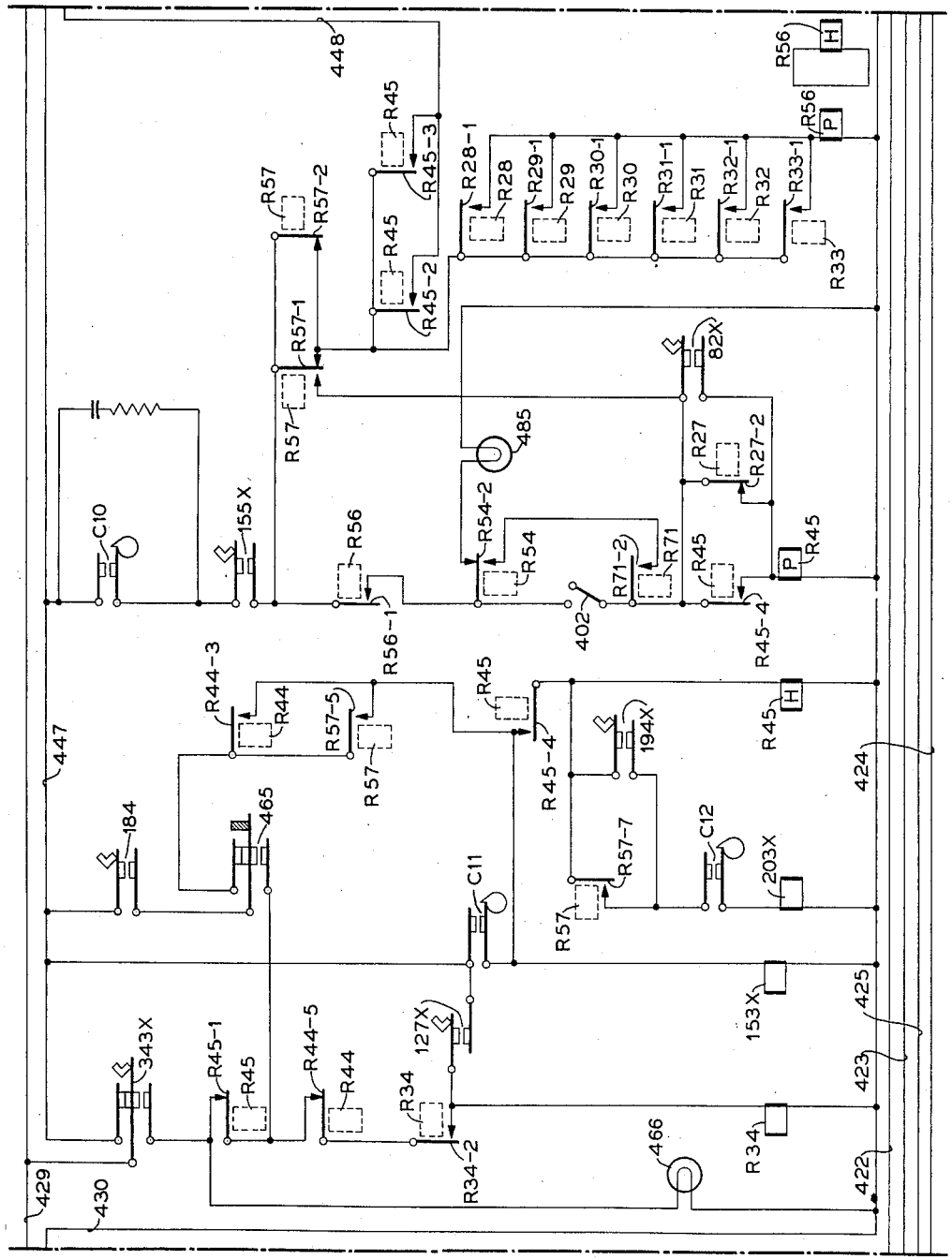

Oct. 6, 1959

J. M. CUNNINGHAM 2,907,521

TOLL HIGHWAY RECORDER

Filed Dec. 21, 1953

INVENTOR.
JAMES M. CUNNINGHAM

BY

*J. Janvin Jr.*

ATTORNEY

Oct. 6, 1959   J. M. CUNNINGHAM   2,907,521
TOLL HIGHWAY RECORDER
Filed Dec. 21, 1953   28 Sheets-Sheet 20

INVENTOR.
JAMES M. CUNNINGHAM
BY
*J. Jancin Jr.*
ATTORNEY

Oct. 6, 1959 J. M. CUNNINGHAM 2,907,521
TOLL HIGHWAY RECORDER
Filed Dec. 21, 1953 28 Sheets-Sheet 24

INVENTOR.
JAMES M. CUNNINGHAM
BY
J. Jancin Jr.
ATTORNEY

Oct. 6, 1959   J. M. CUNNINGHAM   2,907,521
TOLL HIGHWAY RECORDER

Filed Dec. 21, 1953   28 Sheets-Sheet 27

INVENTOR.
JAMES M. CUNNINGHAM
BY
J. Tancin Jr.
ATTORNEY

United States Patent Office 2,907,521
Patented Oct. 6, 1959

2,907,521

TOLL HIGHWAY RECORDER

James M. Cunningham, Endicott, N.Y., assignor to International Business Machines Corporation, New York, N.Y., a corporation of New York Application December 21, 1953, Serial No. 399,229

13 Claims. (Cl. 235—99)

This invention relates to a recorder system for a toll highway having a vehicle entrance station and an exit station whereat information is recorded which is pertinent to vehicles passing over the toll highway from the entrance station to the exit station.

Operation of the Pennsylvania Turnpike since its opening in the year 1940 has proved the financial success of toll highways as well as public acceptance of toll financed roads for raising public highway program funds. Consequently, an ever increasing number of toll highways are being constructed throughout the United States. The success and acceptance by the public of toll highways is due, in part, to the absence of cross highway traffic, traffic signs and stop lights to thereby make it possible for a vehicle operator to move his vehicle at a constant rate of high speed. The preceding features also afford generally safe, carefree and economical driving.

Of course, the financial success of a toll highway program is dependent upon the manner in which records relating to vehicle classifying, toll collection, and daily revenue audit, for example, are kept. In line with the foregoing, the apparatus by which the various records are made is extremely important. Hence, a broad object of this invention is to provide an improved toll highway recorder system for recording information pertinent to vehicles passing over a toll highway.

A more specific object of this invention is to provide an improved manually settable vehicle classification apparatus.

Another object of this invention is to provide a rugged, fast operating toll recorder apparatus which is extremely reliable, efficient and simple to operate.

In the preferred embodiment of this invention, the pertinent vehicular information is recorded, in part, at the toll highway entrance station and, in part, at the exit station, upon a trip card. The trip card associated with a particular vehicle is carried by the vehicle operator from the entrance station where it is partially processed in an entrance toll recorder, to the exit station where the processing is completed in an exit toll recorder. The operation of the exit toll recorder is controlled by a manifestation of partial processing recorded on the trip card at the entrance station.

Above and beyond affording data records relative to vehicular traffic over a toll highway, the instant invention includes apparatus to detect dishonest practices and unintentional mistakes brought about by toll collectors and vehicle operators. That is, the instant invention includes apparatus to detect accidental errors and/or fraudulent acts. In addition, apparatus is included to clearly indicate to the toll collector at the time the error or act is detected, the nature of the error or the act.

Accordingly, another broad object of this invention is to provide a recorder system having means controlled by a manifestation of partial processing which is marked on a record, for completing the processing of the record.

Accordingly, another broad object of this invention is to provide a toll highway recorder system having means for detecting accidental errors and/or fraudulent acts.

In line with the foregoing, another object of this invention is to provide a toll highway recorder system having means for recording specific information relative to the variety and scope of a plurality of different accidental errors and/or fraudulent acts.

Still another object of this invention is to provide a toll highway recorder system having an entrance station apparatus and an exit station apparatus, wherein each apparatus includes means for detecting and recording accidental errors and/or fraudulent acts committed at the other station.

Another object of this invention is to provide a toll highway recorder system having an entrance station apparatus and an exit station apparatus, wherein the exit station apparatus includes means for detecting and recording information relating to an irregular act committed at either toll highway station. One such irregular act which may be either accidental or fraudulent has to do with information concerning the number of axles on a vehicle. This information is caused to be marked on a trip card under the control of a toll collector at the entrance station. The same type of information is caused to be marked on the trip card under control of another toll collector at the exit station. In addition, information under the combined control of an axle treadle and a manually settable key device operated by the exit station toll collector is marked on the trip card to indicate the actual number of vehicle axles. The exit station apparatus also includes means for detecting any difference between the number of axles recorded upon the trip card at the entrance station and number of axles manually keyed at the exit station, and means for detecting a difference between the information marked on the trip card under the control of an exit station toll collector, and the actual number of axles.

In the preferred embodiment of this invention, a zero control counter is used to indicate the number of axles in error as indicated by a difference count between the actual number of vehicle axles determined by an axle treadle and the number of axles caused to be marked upon a trip card by a toll collector. In addition to accumulating a count of the axles in error to thereby indicate the actual number of axles as determined by the axle treadle, this counter also designates the direction or type of error. That is, the zero control counter designates whether the number of axles caused to be marked on the trip card by the toll collector is less than, equal to, or greater than, the actual number of vehicle axles.

Accordingly, another object of this invention is to provide an improved apparatus for detecting a difference between the number of vehicle axles as determined by a toll collector and the actual number of axles on a vehicle.

Another object of this invention is to provide an apparatus for determining and recording the number of axles in error as caused by an improper determination of the number of vehicle axles by a toll collector.

A further object of this invention is to provide an apparatus for designating that the axles in error number is a positive value or a negative value to correspondingly indicate that the number of vehicle axles caused to be marked on a record by the toll collector is less than, equal to, or greater than, the actual member of axles on the vehicle.

A common fraudulent act which is extremely difficult to detect is termed "kiting." In general, this is a practice where a vehicle operator traveling a great distance on a toll highway, three hundred miles for example, from station A to station D, and passing along the way stations B and C each of which is only ten miles away from stations A and D, respectively, withholds from the toll collector at station D the trip card issued at station A, and thereafter during a return trip makes use of the withheld trip card at station B. Ordinarily, this act would appear to the toll collector at station B as one in which the vehicle has been moved only ten miles because it entered the toll highway at station A. The fact of the matter is, however, that the vehicle has actually been moved from station A to station D to station B. Not withstanding this fact, ordinarily the vehicle operator will pay a toll for a short trip instead of the truly long one. It may be seen, too, that one withheld trip card will pave the way to a succession of fraudulent acts by kiting.

Kiting is detected in the instant toll highway recorder system by providing a time limit within which a vehicle must be moved from an entrance station in a given zone area to one or more designated exit stations in the same zone area. This time limit is recorded on the trip card at the entrance station for comparison with the actual time at which the vehicle enters the exit station in order to determine the time of travel to the exit station. Obviously, all vehicles requiring more travel time than that afforded by the time limit, are detected. The type of disciplinary action, if any, taken thereafter is determined by the governmental authority operating the toll highway.

Accordingly, another object of this invention is to provide means to detect and to indicate the act of kiting.

Another object of this invention is to provide a toll recorder apparatus for detecting a vehicle whose toll highway traveling time exceeds a predetermined time limit.

In line with the foregoing, another object of this invention is to provide a toll highway recorder system for indicating upon a record associated with a vehicle that the time of vehicle highway travel is in excess of a predetermined time limit.

Still another object is to provide a toll highway recorder system having a highway entrance apparatus to record a future time, and a highway exit apparatus to detect a period of highway travel having a duration such that the time at which a vehicle leaves the toll highway is later than the previously recorded future time.

A still another object of this invention is to provide a tool highway recorder system having an apparatus associated with each exit station to detect vehicles entering the toll highway at any one of selected entrance stations in the same zone area as the exit station.

Each vehicle passing over the toll highway is identified by a trip card which is partially processed at the system entrance station and completely processed at the exit station. The exit station apparatus detects and prevents the reuse of a completely processed trip card. Similarly, this apparatus detects and prevents the use of a trip card which has not been partially processed at a highway entrance station.

Another object of this invention resides in the provision of means to prevent the reuse of a completely processed trip card.

A more specific object of this invention is to provide a toll recorder having means to detect a completely processed trip card for controlling the operation of the toll recorder.

In line with the foregoing, a more specific object of this invention is to provide a record sensing apparatus for controlling the operation of a record marking apparatus so that the record is marked by the latter apparatus only if the sensing apparatus detects the absence of a mark on a record.

Another object of this invention is to provide a toll highway recorder system having an exit station apparatus for detecting a trip card which has not been partially processed at an entrance station.

As mentioned previously, the financial success of a toll highway program is dependent upon the manner in which records are kept. For this reason, of course, the apparatus by which records are made is extremely important so that any accidental errors and/or fraudulent acts committed at a station are detected by the toll recorder apparatus therein. These errors and acts, if not corrected, are marked upon a record during operation of the toll recorder. In order to associate the recorded errors and acts with the toll collector in charge of the apparatus at which they occur, an identification key serving a plurality of purposes is provided. The key controls the application of power to the toll recorder, and causes the toll collector's identification number to be printed upon each record.

Another object of this invention is to provide a device for conditioning a toll recorder so as to render the same operable and to thereupon cause the identity of the toll collector on duty to be printed upon each record processed in the toll recorder.

As apparatus for marking information such as the time of day, for example, upon a trip card is changing continually, and since a toll recorder of necessity requires a finite period to complete an operational cycle, a mechanism is provided to detect the oncoming of such a change in order to prevent a toll recorder cycle until after the change is completed. Accordingly, another object of this invention is to provide a mechanism for preventing a toll recorder cycle for a predetermined period preceding a change in the setting of the toll recorder marking apparatus.

In order to have specific information marked upon a trip card in a designated position thereon, interlock circuits are used whereby operation of the toll recorder is determined, in part, by the full and proper insertion of a trip card into the card receiver of the recorder. In view of the fact that operation of the toll recorder is controlled by the position of the trip card in the card receiver, a mechanism is provided to prevent recycling; i.e., more than one recorder cycle per trip card. That is, it is necessary to remove the trip card from the card receiver after a toll recorder cycle in order to condition the recorder for another cycle.

Another object of this invention is to provide an improved toll recorder card receiver mechanism for initiating a toll receiver cycle.

Another object of this invention is to provide a toll recorder card receiver mechanism for controlling the operation of a toll recorder so that toll recorder recycling is prevented.

A still another object of this invention is to provide a card receiver braking mechanism which is rendered effective only upon the initial insertion of a trip card in the card receiver.

A further object of this invention is to provide a toll recorder having a self interlocking card braking mechanism for permitting movement of a record card in only a single direction.

Manually settable keys are used to control electric circuits whereupon pertinent vehicular information is caused to be marked upon a record. Since the keys which are selected control electric circuits effective during a toll recorder cycle, a key unit mechanism is provided to prevent the inadvertent operation of a key during a toll recorder cycle.

Accordingly, another object of this invention is to provide an improved key unit mechanism for preventing an inadvertent key operation during a toll recorder cycle.

As mentioned previously, pertinent vehicular information is marked upon individual trip cards by a toll recorder apparatus. Each time data is entered upon a trip card, corresponding data is accumulated in a remotely positioned tour of duty recorder. This recorder affords a summary report of the information pertinent to the toll highway vehicular traffic for a designated period. A convenient period is that during which a toll collector performs his tour of duty. Hence, the instant invention includes apparatus whereby an initiating summary report is printed upon a record at the start of a tour of duty and a final summary report is printed upon the record at the end of a tour of duty. An interlock is provided whereby the toll recorder apparatus is rendered ineffective until the initiating summary report is caused to be printed.

Accordingly, another object of this invention is to provide an interlock between a toll recorder and a summary recorder so that the latter device causes information to be printed upon a record at the start of a toll collector's tour of duty and at the end of a tour of duty.

Another object of this invention is to provide an interlock between a toll recorder and a summary recorder whereby the former is rendered ineffective until the latter is caused to operate at the start of a toll collector's tour of duty.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2 shows the front side of a processed trip card.

Fig. 3 shows the reverse side of a processed trip card.

Fig. 4 shows a portion of the tour of duty recorder check sheet with summary information thereon.

Fig. 5 shows one side of a tour of duty card.

Fig. 6 is a somewhat diagrammatic representation of a toll highway between separate zone checking areas.

Figs. 20a to 20e, inclusive, taken together, constitute a wiring diagram of a toll highway system entrance station apparatus.

Figs. 21a to 21k, inclusive, taken together, constitute a wiring diagram of a toll highway system exit station apparatus.

Figure 22:
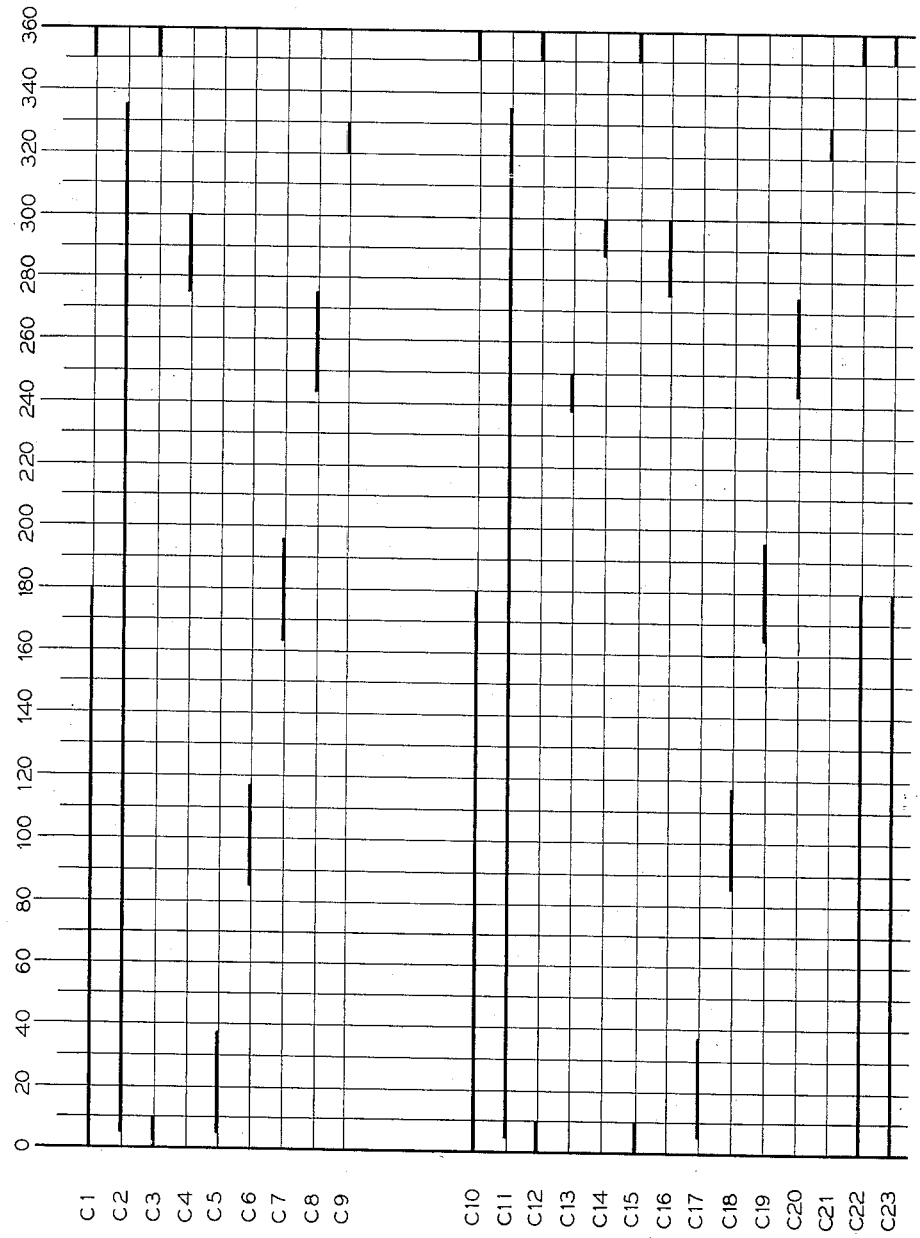

Fig. 22 is a timing chart.

*General system description*

Prior to describing the various mechanical and electrical components of the instant invention which cooperate to afford a workable and effective toll highway recorder system, the same will first be described briefly and in a general way so as to present an explanation of the overall operation of the system.

Figure 1:
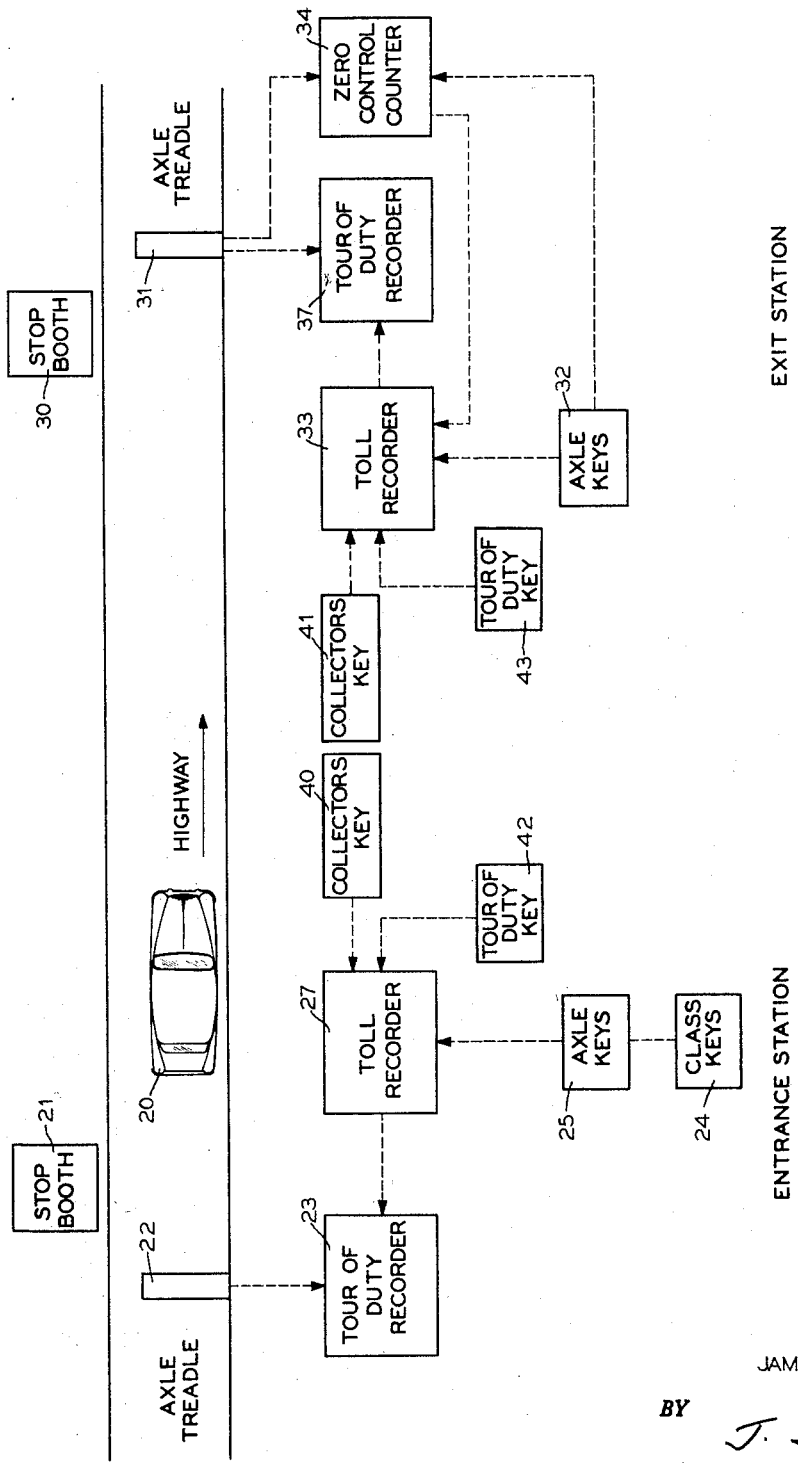
Fig. 1 is a diagrammatic representation of a toll highway recorder system having entrance station apparatus and exit station apparatus.

The illustrative toll highway recorder system represented in the drawing, having a vehicle entrance station and an exit station, is shown in block diagram form in Fig. 1. The two stations are separated by the number of highway miles between the location of the entrance station and the exit station, this distance being a partial determining factor for the toll paid by a vehicle operator for the privilege of passing over the highway.

A vehicle 20 which is about to pass over the highway, must first be stopped at the entrance station so that specific information relative to toll recording is entered upon a trip card and in a summary data tour of duty recorder. This vehicle is stopped opposite stop booth 21 after passing over axle treadle 22. The number of axles passing over the treadle in a forward direction, i.e., in a direction towards the highway, are accumulated in a forward axle count printing counter. In the event the vehicle is moved over treadle 22 in a reverse direction after having passed completely over the treadle in a forward direction, the number of axles passing over the treadle in a direction away from the highway, are accumulated in a reverse axle count printing counter. Both of the aforementioned entrance station printing counters are located in the tour of duty recorder 23 for printing upon a summary check sheet 38 (see also Fig. 4), at select periods, the total forward axle count and total reverse axle count.

Upon being stopped opposite stop booth 21, vehicle 20 is examined by the toll collector, whereupon the latter determines the classifiction of the vehicle. The preferred embodiment of this invention includes manually settable means for setting up one of twelve distinct vehicle classifications. The classification of different types of vehicles is preferably determined by the governmental authority which controls the operation of the toll highway recorder system. This authority may, for example, assign a classification 1 to all passenger vehicles whose manufacturer's, or licensing, weight is under 3500 pounds, and a classification 2 to all passenger vehicles whose weight is over 3500 pounds. The authority may determine that lightweight delivery vehicles such as the so-called quarter ton pick-up trucks are in classification 3, etc. Hence, a classification key corresponding to the classification determination made by the collector, is depressed in unit 24.

In addition to setting up the classification of the vehicle, the toll collector depresses an axle count key in unit 25 which corresponds to the number of vehicle axles. In the preferred embodiment of this invention, provision is made to accommodate vehicles having one through six axles.

The toll collector then obtains a trip card 26 (see also Fig. 2) from a convenient card rack, for insertion into the card receiver of the toll recorder 27. As is shown in Fig. 2, trip card 26 has a corner cut 28 and the general appearance of the well-known IBM tabulating record card. Complete insertion of the trip card with proper regard to the position of corner cut 28 will render electric circuits operated which cause the following information to be entered upon the card:

(1) The identification number of the entrance station toll collector, e.g., H/3 (Fig. 2).

(2) The number of the entrance station lane through which the vehicle passes to enter the highway, e.g., 1/8.

(3) The time and the day at which the trip card has the information entered thereupon, e.g., 18:26 and 265, respectively.

(4) The sequence, or successive count, number of the vehicle entering the highway, e.g., 1593.

(5) The classification number of the vehicle (row 1, columns A through L).

(6) The entrance station, or interchange, number (row 2, columns F through L).

(7) The number of vehicle axles (row 3, columns B through D).

(8) The time of trip control value within which the vehicle should pass over a predetermined part of the highway (row 3, columns E through L). This feature is to prevent kiting and will be described in detail hereinafter.

As is shown in Fig. 2, the first four preceding items of information are printed on the first line of the face of trip card 26, whereas the last four items of information are recorded on the trip card as perforated data in rows 1 to 3, inclusive.

After the trip card is marked with printed matter and punched holes as described hereinabove, the card is removed from the toll recorded card receiver and placed into the custody of the vehicle operator. The operator is then permitted to leave the entrance station to pass over the highway towards his destination at which an exit station is located.

Upon entering the exit station, vehicle 20 is stopped opposite stop booth 30, prior to passing over axle treadle 31. Vehicle 20 is once again examined by a toll collector, this time an exit station toll collector, whereupon the number of vehicle axles is determined for a second time. In accordance with the number of axles carried on the vehicle, an axle count key in unit 32 is depressed. The trip card 26 (see also Fig. 2) which was placed in the custody of the vehicle operator at the entrance station, is taken by the toll collector for insertion into the card receiver of toll recorder 33. Complete insertion of the trip card with proper regard to the position of corner cut 28 will render electric circuits operative whereby sensing mechanism is caused to analyze trip card 26. Additional electric circuits will be rendered operated thereafter in order to complete the processing of the trip card only if the aforementioned sensing mechanism indicates the following information:

(1) An entrance station interchange number is punched in trip card 26.

(2) The perforated number of vehicle axles entered upon the trip card at the entrance station corresponds with the number of axles represented by the axle count key depressed in unit 32.

(3) The absence of a cancellation perforation which is punched in the trip card only at an exit station. This check prevents the reuse of a trip card after it has once been processed at an exit station.

(4) A time of trip control value which indicates that excess time was not required for vehicle 20 to move from the entrance station to an exit station in a single zone checking area.

The aforesaid additional electric circuits which are rendered operated only if the sensing mechanism indicates the foregoing information, will cause the following information to be entered upon trip card 26 at the exit station:

(1) The identification number of the exit station toll collector, e.g., M/4 (Fig. 2).

(2) The number of the exit lane through which vehicle 20 passes to leave the highway, e.g., 1/0.

(3) The time and the day at which the trip card has the information entered thereupon at the exit station, e.g., 20:30 and 265, respectively.

(4) The sequence number of the vehicle leaving the highway, e.g., 5678.

(5) The exit station, or interchange, number (row 4, columns F through L).

(6) The number of vehicle axles (row 5, columns B through D).

(7) Excess time was not required for vehicle 20 to pass over the highway (row 3, column A).

As is shown in Fig. 2, the first four preceding items of information are printed on the second line of trip card 26, whereas the last three items of information are entered as punched data.

In addition to the foregoing, an axles in error indication is entered upon the trip card. This axles in error indication, however, is information relating to a vehicle which preceded vehicle 20 through the exit station, and will be described as the description advances. The setup of this information is as follows:

The depression of an axle count key in unit 32 causes a count of the vehicle axles to be added, for example, in zero control counter 34 (Fig. 1). The passage of the vehicle for which the axle count key was depressed over axle treadle 31 causes a count of the vehicle axles to be subtracted in zero control counter 34. If the axle count added is the same value as the axle count subtracted, counter 34 will have a zero total after the vehicle passes over treadle 31. If, however, the axle count added in counter 34 is more or less than the axle count subtracted, counter 34 will have a plus or minus total, respectively, therein. It is apparent that since the trip card is processed before vehicle 20, for example, passes over treadle 31, the axles in error indication, i.e., the axle count difference represented as a total in counter 34, cannot be entered upon the trip card associated with vehicle 20 for which this difference occurs, but must be entered upon a trip card processed subsequently.

After the trip card 26 for vehicle 20 is processed at the exit station, the toll collector determines the toll to be paid by the vehicle operator. This determination is made by referring to a toll chart imprinted upon the back of the trip card (see Fig. 3). The amount of the toll paid for the privilege of passing over the highway is selected from this chart after consideration is given to the distance traveled over the highway by the vehicle operator and the classification of the vehicle. As is shown in Fig. 3, the toll collector selects the exit station through which the vehicle is passing, Endicott station No. 32 for example, as the ordinate, and the classification perforation, five for example, as the abscissa. The position at which the ordinate and abscissa intersect defines the toll which in this case is $0.55. It is to be observed that each entrance station has assigned thereto a particular group of trip cards, each of which has a toll chart which includes all of the exit station locations that can be reached from the entrance station.

The tour of duty recorders 23 and 37 (Fig. 1) are similar in construction, function and purpose. The tour of duty recorder is one at which a summary report of the operations at a station lane is made. For each toll collector's tour of duty, an eight hour period for example, data relating to the start of the tour duty (see upper line in Fig. 4) and data relating to the end of the tour of duty (see lower line in Fig. 4), is recorded in order to afford a summarization of operations pertinent to toll highway vehicular traffic. The information printed on the summary check sheet 38 includes the following items:

(1) Total Axles Selected which is an accumulation of the axle count represented by the axle count keys depressed by the toll collector.

(2) Forward Axle Count and Reverse Axle Count which, as described hereinbefore, represent a count corresponding to the number of vehicle axles passing over an axle treadle in the forward and reverse directions, respectively.

(3) Sequence Number which is a count of toll recorder operations.

(4) Station, or Interchange, Number and Lane Identification.

Examination of the summary check sheet shown in Fig. 4 will reveal that during the time interval represented by the tour-of-duty start data and the end data, the toll collector depressed axle count keys corresponding to one hundred fifty vehicle axles, i.e., 1492 minus 1342 is equal to 150. Actually, one hundred seventy-five axles crossed the axle treadle in a forward direction, and twenty-five axles passed over the treadle in a reverse direction. This shows that the total number of axles selected by the toll collector is equal to the net total of axles passing over the treadle in a forward direction. According to the sequence number difference, the toll recorder was operated, or cycled, fifty times. Hence, the toll collector is required to account for fifty trip cards 26 and tour of duty cards 39 (Fig. 5). The tour of duty cards will be described subsequently.

The information recorded on the summary check sheet 38 (Fig. 4), except for the station and lane numbers, is accumulated in printing counters to be described hereinafter. A recorder cycle during which tour of duty information is recorded, is controlled by a toll collector key, each of which has type elements thereon identified with a specific toll collector. The insertion of collector key 40 (Fig. 1) into toll recorder 27 initiates a printing cycle in recorder 23, whereas insertion of key 41 into exit recorder 33, initiates a printing cycle in recorder 37. It is to be observed that the key which is assigned to a toll collector must be inserted into the toll recorder immediately at the start of the collector's tour of duty. The key (see also Fig. 9) has a type face embossed thereon which is used to print the toll collector's identification number on trip cards (see also Fig. 2) and tour of duty cards.

The recorder cycle during which tour of duty information is recorded upon the summary check sheet, is also initiated by the removal of the collector key from an associated toll recorder. This must be done at the end of a toll collector's tour of duty. Hence, as mentioned hereinbefore, only two summary information printing cycles occur in a tour of duty recorder for a single tour of duty.

The tour of duty recorder 23, for example, is in a locked cabinet which may be remotely positioned from toll recorder 27. This is for the reason that only an inspector, or toll collector supervisor, is expected to inspect the summary totals marked on the check sheet 38.

In addition to inserting a toll collector key into a station toll recorder at the start of a tour of duty, the toll collector is required to insert a tour of duty record card 39 (Fig. 5) into the card receiver of the toll recorder. Complete insertion of the tour of duty card with proper regard to the position of corner cut, and depression of a tour of duty key, such as that in unit 42 (Fig. 1) or 43, associated with the toll recorder, will render electric circuits operative which cause the following information to be recorded upon tour of duty card 39 (Fig. 5):

(1) The identification number of the station toll collector, e.g., H/3.

(2) The number of the station lane at which the collector is directed to spend his tour of duty, e.g., 1/8.

(3) The time and day at which the tour of duty card is recorded, e.g., 18:00 and 265, respectively.

(4) The sequence number of the toll recorder cycle of operation, e.g., 1592.

(5) The station, or interchange, number at which the collector is directed to spend his tour of duty (row 2, columns F through L).

As is shown in Fig. 5, the first four preceding items of information are printed upon the face of card 39, and the last item is recorded as punched data.

The tour of duty card is processed at the start of a tour of duty so that the aforementioned information is recorded on one side of the card, and at the end of a tour of duty so that similar information is recorded on the other side of the card. Thus, the tour of duty card is in effect a daily work record, or a job card, for a toll collector's daily work period.

At the end of a tour of duty, each toll collector is responsible for the delivery of all processed tour of duty cards and trip cards in his possession to a centrally located punched card accounting bureau. These cards are then processed through accounting machines such as the well-known IBM punched card machines so as to complete desired accounting reports which are accurate and obtained speedily. These reports may be checked against the summary totals printed on the summary check sheet 38 (Fig. 4) in order to determine whether the trip card data corresponds with check sheet data.

Time control mechanism

As the time control mechanism in the entrance toll recorder 27 (Fig. 1) is similar to that in exit toll recorder 33, only the aforesaid mechanism in recorder 27 will be described to avoid undue prolixity.

It will be apparent to those persons familiar with this art that the instant time control mechanism is basically the same as the mechanism described in U.S. Patent No. 2,281,998, granted to F. Q. Rast. This patent may be referred to for a more detailed description of the time control mechanism.

Figure 7:
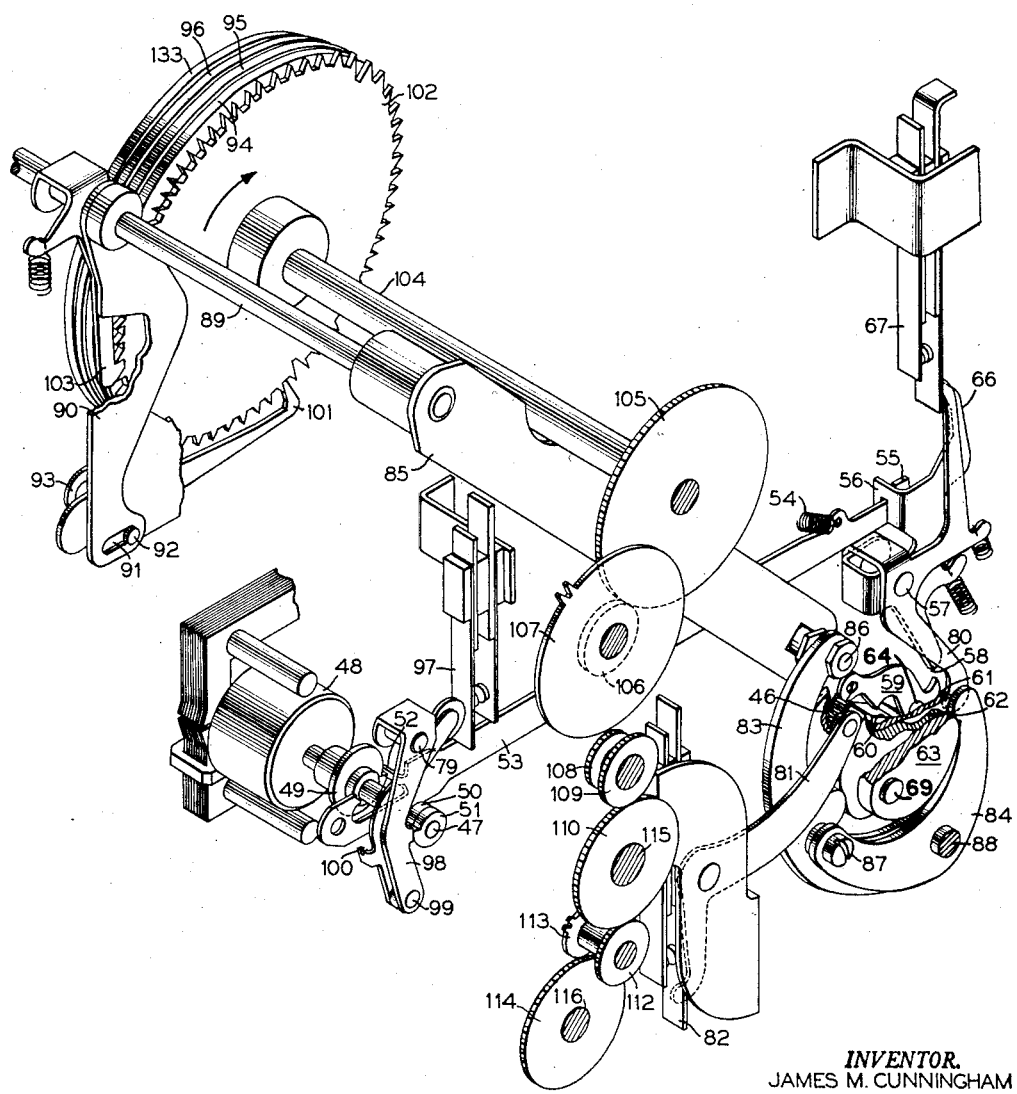
Fig. 7 is a perspective view, somewhat diagrammatic in character, of a toll recorder time control mechanism.

Referring to Fig. 7, shaft 47 of continuously operating synchronous motor 48 completes one revolution each minute. A synchronous motor is customarily used in locations where it is desirable to operate the recorder as an independent unit. The time control mechanism may be operated by a solenoid (not shown) which is energized by minute impulses from a master clock or other timing device. However, the time control mechanism operated is the same in either case and will now be described with reference to Fig. 7.

Cams 49, 50 and 51 are attached to shaft 47, and also complete one revolution each minute. Hence, cam follower projection 52 drops off the high dwell of cam 49 once each minute, whereupon latch arm 53 is moved to the left under action of latch arm spring 54. As the latch arm is moved to the left, a latch point 55 on arm 53 engages latch member 56. This engagement pivots spring-biased member 56 about stud shaft 57 in a counterclockwise direction. Consequently, the lower portion 58 of the latch member 56 is moved to the right to permit drive clutch pawl 59 to drop into engagement with a drive clutch ratchet 60 under the urging of a pawl spring 46. The pawl 59 is pivotally mounted upon the face of a cam 61 (see also Fig. 8) by stud shaft 64 so that the engagement of the pawl with the ratchet has the effect of connecting the cam with the ratchet. Cams 62 and 63 are fixed to cam 61 for rotation therewith.

Figure 8:
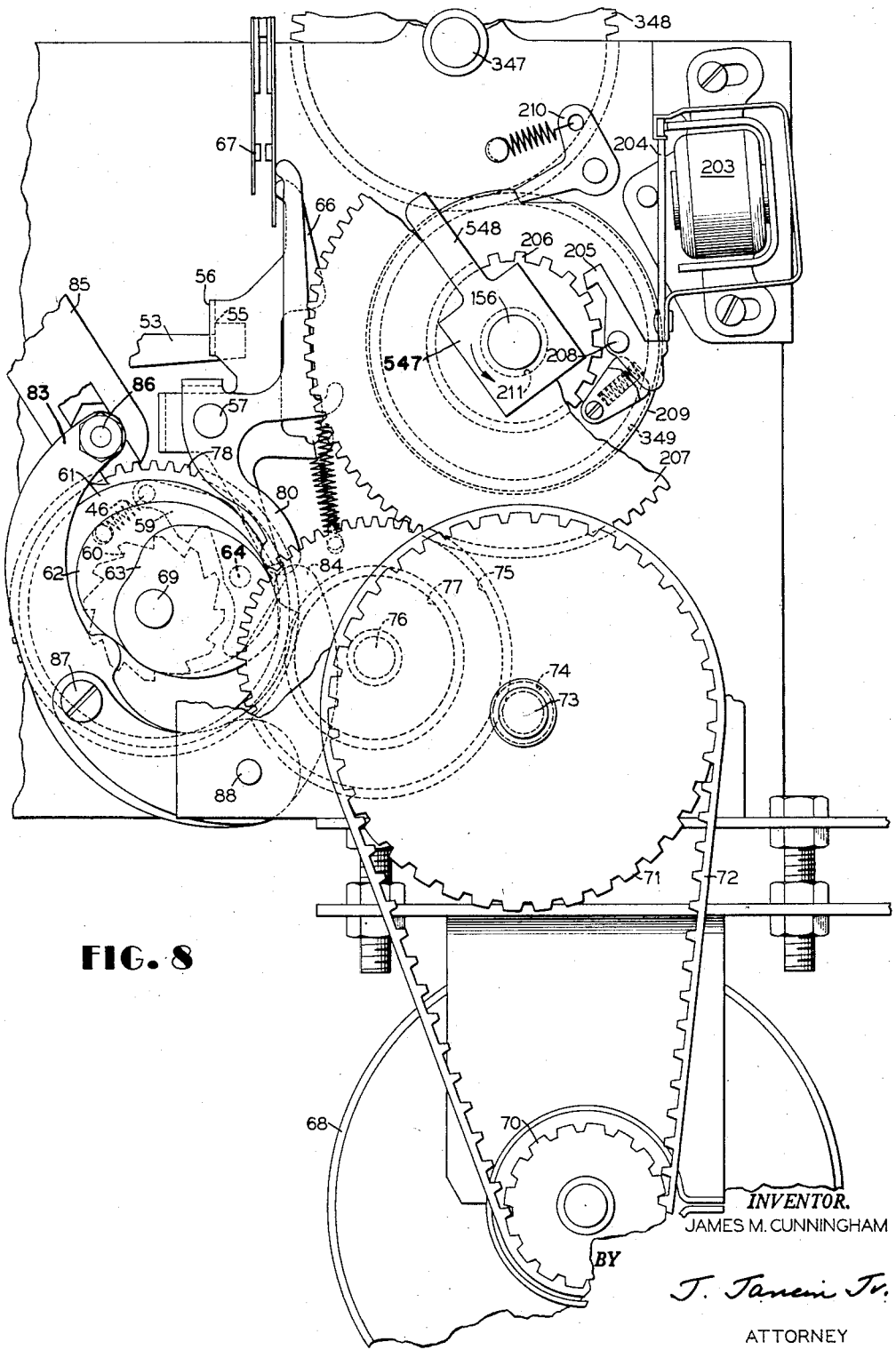
Fig. 8 is an elevation of the main drive mechanism for a toll recorder.

The upper end 66 of latch member 56 operates a pair of minute advance motor contacts 67 to complete a circuit when closed to a drive motor 68 (Fig. 8). This circuit will be described hereinafter in connection with the circuit diagram, it being sufficient for the present to say that upon the closing of contacts 67, motor 68 operates to turn a shaft 69 (Fig. 8) in a counterclockwise direction. As is shown in Fig. 8, drive pulley 70 is connected to driven pulley 71 via timing belt 72 in order to revolve shaft 73 and gear 74 attached thereto whenever motor 68 operates. Gear 74 is in mesh with gear 75 which is attached to shaft 76 to which gear 77 is also attached. Gear 77, in turn, is in mesh with gear 78 which is fixed to shaft 69. Drive clutch ratchet 60 is also attached to shaft 69.

Cams 61, 62 and 63 are loosely mounted on shaft 69, but since pawl 59 is now engaged with ratchet 60, these cams are carried with the ratchet as the latter is rotated by the motor.

A cam follower 80 (see also Fig. 7) rides on the periphery of cam 61 and is shaped like a bell crank, being pivoted at stud shaft 57 and having a contact operating extension which is moved to the left to close contact 67 as the lower extremity of the cam follower rides up out of the recess in the periphery of cam 61 in which it is normally positioned. This has the effect of maintaining the motor contacts 67 closed during the course of one revolution of cam 61. As mentioned previously, fixed to the outer face of cam 61 are complementary cams 62 and 63. The cam follower end of bell crank 81 (Fig. 7) rides upon the periphery of cam 62 in order to operate minute interlock contacts 82, the use of which will be described hereinafter in connection with the circuit diagram.

Continued rotation of cam 49 (Fig. 7) causes latch arm 53 to be moved to the right. As to be described hereinafter, arm 85 is caused to rock during the time that the clutch, i.e., pawl 59 and ratchet 60, is engaged. During the clockwise rocking thereof, a pin (not shown) on arm 85 moves lever 53 downward at its right end to unlatch the same from member 56. This permits latch member 56 to return to its normal position. Hence, the lower portion 58 is moved into the path of drive clutch pawl 59 so as to disengage pawl 59 from ratchet 60 after only one revolution of the clutch and associated mechanism. During disengagement, cam follower 80 will move into the recess in the periphery of cam 61. This has the effect of opening the motor contacts 67 to thereupon open the circuit to the motor 68 (Fig. 8).

As will be described hereinafter in connection with the circuit diagram, minute advance warning contacts 97 (Fig. 7) are closed approximately 0.4 second before latch arm projection 52 drops off the high dwell of cam 49 in order to afford a signal to indicate that a minute type wheel advance is going to occur. Contacts 97 are opened approximately 0.3 second after the minute advance does occur. Since any of the type wheels 94, 95 and 96 and 133 may be moved during a minute advance period, it is undesirable to have a toll recorder printing cycle occur within this period because the printing stroke may occur precisely at the time that a type wheel is being moved. The signal resulting from the closing of contacts 97 disables the circuits which cause a toll recorder cycle, until after the minute advance is completed. After the minute type wheel is advanced, these circuits are automatically rendered operative by the closing of contacts 97.

As is shown in Fig. 7, cam follower 98 is pivotally connected to stud shaft 79 and to cam follower 100 at connection 99. As mentioned previously, just prior to the time that projection 52 drops off the high dwell of cam 49, cam follower 100 drops off the high dwell of cam 50 thereby closing contacts 97 when follower 100 moves in a clockwise direction about connection 99. Shortly thereafter, cam follower 98 drops off the high dwell of cam 51, carrying with it connection 99 as follower 98 moves in a counterclockwise direction about pivot stud 79. During this latter movement, the contact operating end of cam follower 100 is caused to move away from contacts 97 and to therefore open the same. This action results because the point at which cam follower 100 rests upon cam 50 is the point about which follower 100 pivots in a counterclockwise direction as connection 99 is carried by cam follower 98.

Up to this point it has been shown how the movement of latch arm 53 causes a clutch to engage and a motor to operate in order to drive the clutch. Mechanism operated from this clutch to drive a minute advance type wheel unit will now be described. As cams 62 and 63 rotate, their respective cam followers 83 and 84 cause arm 85 to oscillate about shaft 89, first in a clockwise direction then in a counterclockwise direction. The forked end of arm 85 straddles a cam which is attached to eccentric stud 86, and cam follower 84 is attached to cam follower 83 by screw 87. Each of the aforesaid cam followers 83 and 84 rocks about stud shaft 88. A rocking motion is thereby imparted to shaft 89 causing an arm 90 attached near the center of shaft 89 to be moved clockwise first, and then counterclockwise. This arm is provided with an elongated hole 91 through which a stud 92 projects. Stud 92 forms a part of a pawl carrying member 93 which is moved forward (to the left) with the arm 90 as stud 92 engages the rear end of the slot 91. The forward movement of the pawl carrying member 93 provides the feed stroke for advancing the minute type wheel 94 one position in a clockwise direction. Also, when there is an hour and day change the pawl carrying member advances an hour type wheel 95 and one or both day type wheels 96 and 133 one position in a manner which will now be described.

The pawl carrying member 93 is provided with four type unit feed pawls only one of which, pawl 101, is shown in Fig. 7. These three feed pawls cooperate with the type wheel ratchets of the minute, hour and day type wheels. Only ratchet 102 for the minute type wheel is shown. Hence, when pawl carrying member 93 is moved forward with arm 90, spring-biased feed pawl 101 advances minute type wheel 94 one position. Spring-biased detent arm 103 is loosely attached to shaft 89, and positions the type wheel accurately for printing after the latter is advanced by the feed pawl 101. As is described in the aforementioned Rast patent, the day type wheel feed pawl has a projection attached thereto which bears against the underside of the minute pawl 101, and the hour type wheel feed pawl has a projection attached thereto which bears against the underside of the day type wheel pawl. By this construction, the hour and day pawls are maintained just out of engagement with their respective type wheel ratchets as long as the minute pawl 101 is seated in a normal depth tooth of its ratchet 102. However, type wheel ratchet 102 is provided with a deep tooth so that when the minute pawl 101 drops into this tooth, the hour pawl (not shown) is permitted to engage its ratchet (not shown) to advance the latter ratchet one tooth on the forward stroke of the pawl carrying member 93. This will be recognized by persons skilled in the art as the familiar "deep-tooth" transfer operation. The hour wheel ratchet is provided with one deep tooth so that at the end of one revolution of the hour wheel when the hour feed pawl drops into this tooth, the day feed pawl is permitted to engage its ratchet to advance the latter ratchet and wheel 96 one tooth on the forward stroke of the member 93. As is shown and described in the aforementioned Rast patent, the hour type wheel characters appear doubly, one following the other, and therefore it is necessary to advance the hour wheel twice to effect a difference in reading of one hour. The first advancement of the hour type wheel will occur for the advancement of the hour type wheel as the minute type wheel is advanced on the sixtieth minute. The minute wheel is numbered from 00 to 59. The hour wheel is numbered half way around from 1 to 12 and for the other half from 13 to 24, double numbering being employed as described hereinabove. Thus, a total of 48 type characters are provided on the hour wheel as compared with 60 type characters on the minute wheel. The day wheel 96 is provided with forty type characters, 0–9 four times around, whereas wheel 133 is provided with a 0–36 tens of days type characters. The second advancement of the hour type wheel may occur at any predetermined point in the revolution of the minute wheel depending upon the location of the second deep tooth in the minute type wheel ratchet 102. This advancement of the hour wheel, however, has no effect in changing the reading of the hour wheel but simply moves this wheel so that the first of a pair of similar type characters is moved out of a registering position and the second character of the pairs advance to supplant the first. This feature is employed in order to limit the wear of hour type characters.

Minute type wheel 94 is attached to shaft 104 which, in turn, is connected to gear 105. Gear 105 (see also Fig. 10) is in engagement with driven gear 106 which is attached to transfer gear 107. The ratio between gears 105 and 106 is such that the transfer gear 107 completes one revolution each half hour. Hence, since the notches on transfer gear 107 engage gear 108, the gear train including gears 109, 110 and 112 is advanced one increment each half hour. A second transfer gear 113 is connected to a shaft common to gear 112. The design of the gears mentioned above is such that transfer gear 113 completes one revolution every five hours, and gear 114 which engages the single set of notches on transfer gear 113, is advanced one increment every five hours.

Figure 10:
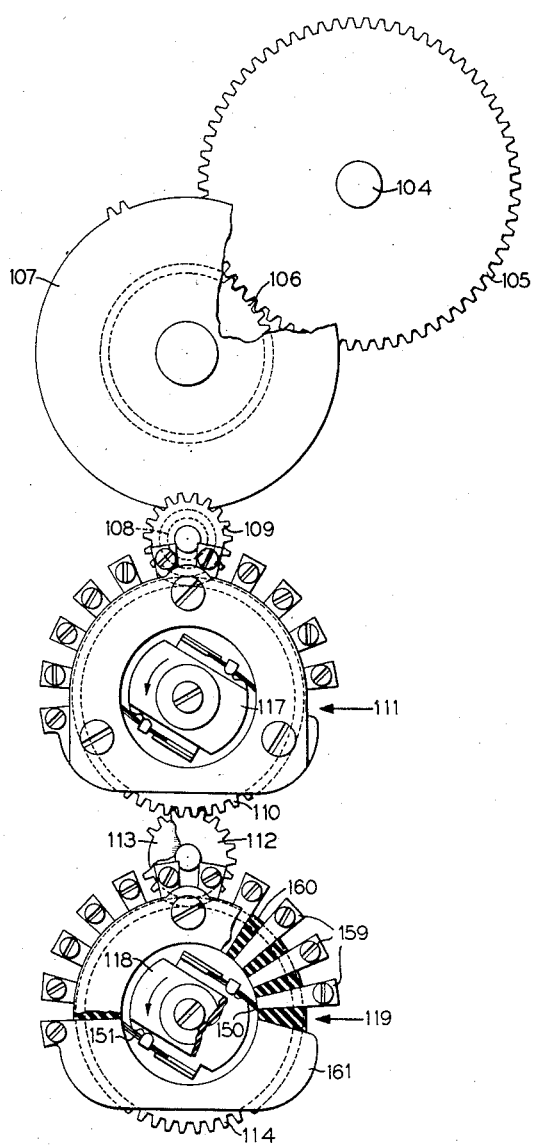
Fig. 10 is an elevation with parts in section of a toll recorder timing emitters.

Gears 110 and 114 are attached to shafts 115 and 116, respectively, as are time emitter rotors 117 and 118 (see also Fig. 10). Since time emitters 111 and 119 are constructed similarly, only emitter 119 will be described.

A pair of electrically connected brushes 150 and 151 are insulated from, and attached to, rotor 118 for movement therewith. Ten conducting segments 159 are equidistantly spaced and radially arranged in an insulator 160. A common conducting segment 161 is arranged so that either brush 150 or 151 is in contact with this segment at any one time. As gear 114 is moved one increment, rotor 118 is moved an amount sufficient to move a brush, brush 150 for example, from one conducting segment 159 to the next. Hence, as will be described in detail in connection with the circuit diagram, a circuit at any time will be completed from a segment 159, through the brush 150 or 151 in contact therewith, the other brush on rotor 118, to segment 161 in contact with the latter brush. Similarly, a circuit will be completed by emitter 111. The incremental movement of rotors 117 and 118 is such that a brush on rotor 118 passes from one conducting segment 159 to the next every fifth hour, whereas a brush on rotor 117 moves from one conducting segment to the next every half hour.

*Card receiver mechanism*

As the card receiver mechanism in the entrance toll recorder 27 (Fig. 1) is similar to that in exit toll recorder 33, only the aforesaid mechanism in recorder 27 will be described to avoid undue prolixity.

Figure 9:
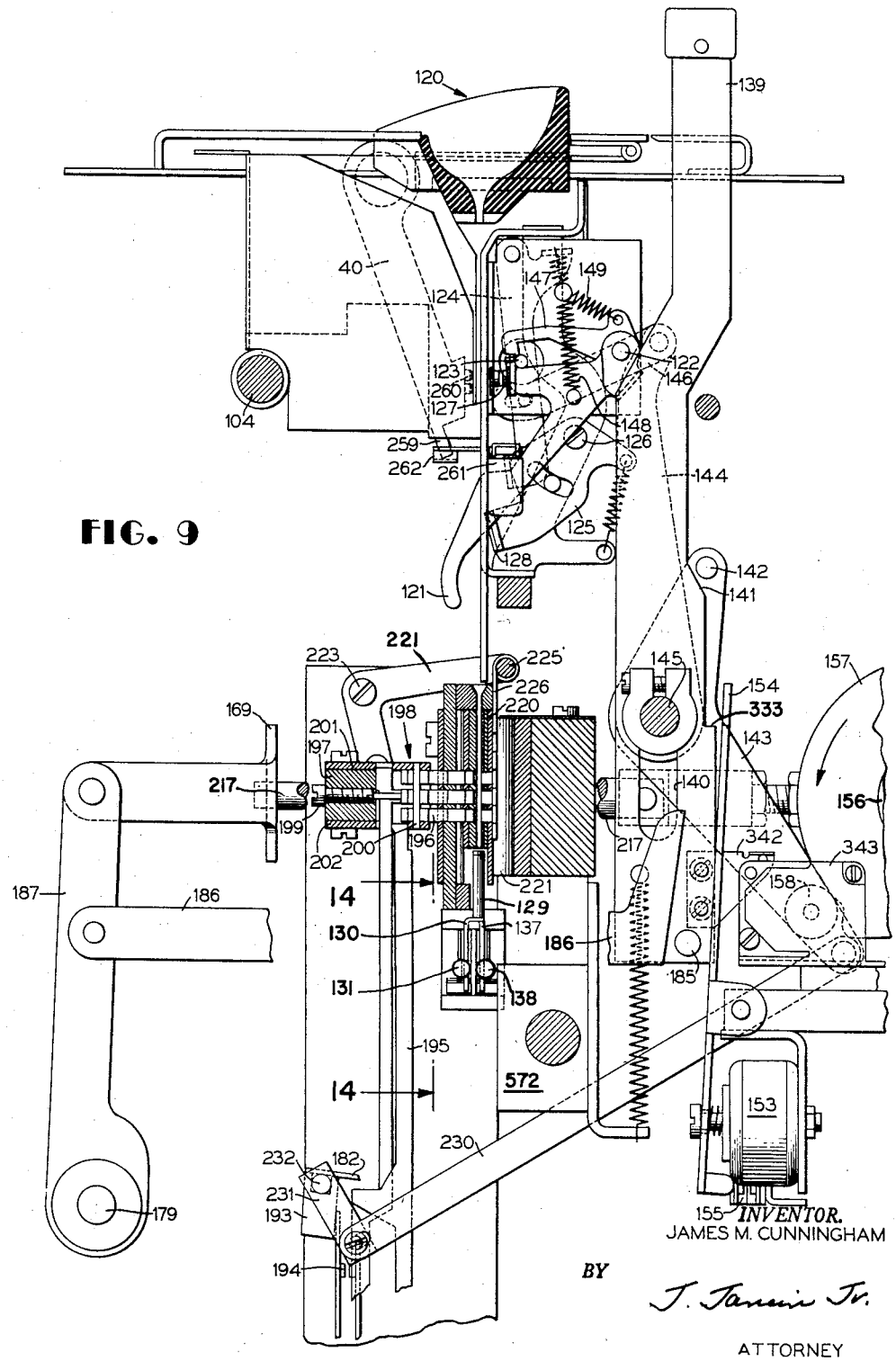
Fig. 9 is an elevation, taken substantially along lines 9—9 of Fig. 15, with parts in section of a toll recorder card receiver mechanism.
Figure 11:
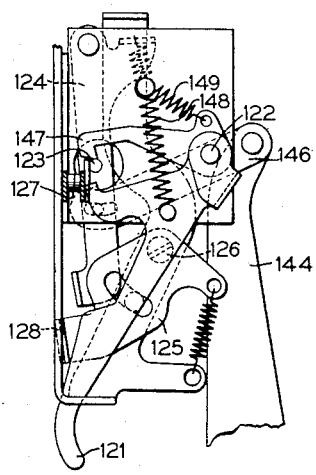
Fig. 11 is an elevation of the card receiver braking mechanism in an operative position.

Referring to Fig. 9, a trip card 26 such as is shown in Fig. 2, is inserted in card receiver 120 and moved downwardly. As the leading edge of the trip card engages card lever 121, the latter is moved in a counterclockwise direction about point 122. This action releases arm pin 123 from the engaging projection of lever 121 to thereupon permit arm 124 to which pin 123 is attached to move in a clockwise direction. As the lower lip of arm 124 is in engagement with spring-biased card braking member 125, member 125 is also moved with arm 124, in a clockwise direction about pivot 126. The aforementioned clockwise movement of arm 124 causes pin 123 to close a pair of card inserted contacts 127 (see also Fig. 11).

Secured to the lower portion of card braking member 125 are brake shoes 128 which, upon the disengagement of pin 123 and card lever 121, are moved against the back side of the trip card. Since the brake shoes 128 are made from a non-skid material, rubber for example, an extremely high frictional contact is obtained between the trip card and the brake shoes. It is to be observed that after the trip card and the brake shoes are brought into contact, the card is prevented from being removed from card receiver 120 due to this braking action. However, the trip card may be inserted further into card receiver 120 because member 125 may be moved in a counterclockwise direction against the action of its spring.

Figure 14:
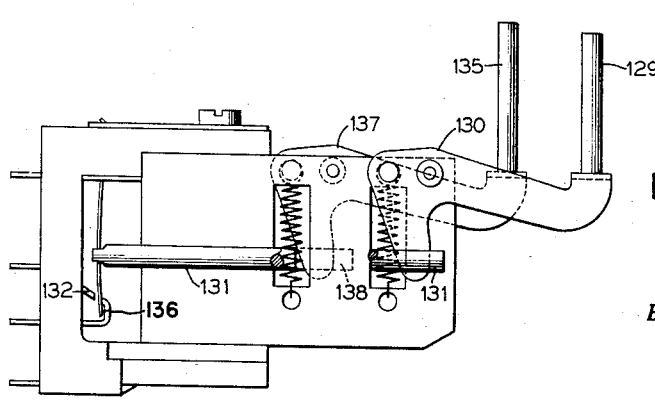
Fig. 14 is an elevation, taken along lines 14—14 of Fig. 9, of a card position indicating contact mechanism for a toll recorder card receiver.

As is mentioned hereinbefore in General System Description, and as to be described in detail hereinafter in connection with the circuit diagram, electric circuits for causing a toll recorder cycle are rendered operative upon the complete insertion of the trip card with proper regard to the position of corner cut. The complete insertion of the trip card into card receiver 120 is indicated when the leading edge of the trip card engages stem 129 (see also Fig. 14 to thereupon move bell crank 130 in a clockwise direction and link 131 to the left in order to close a pair of card fully inserted contacts 132. If the trip card has been inserted into card receiver 120 with proper regard to corner cut, stem 135 is not acted upon, and a pair of normally closed corner cut contacts 136 remain closed since bell crank 137 and adjoining stem 138 are not moved. The absence of a corner cut will cause the leading edge of the trip card to act upon stem 135 which, in turn, rocks bell crank 137 and moves stem 138 in order to open the aforementioned corner cut contacts. The use of these contacts will also be described hereinafter in connection with the circuit diagram.

Figure 12:
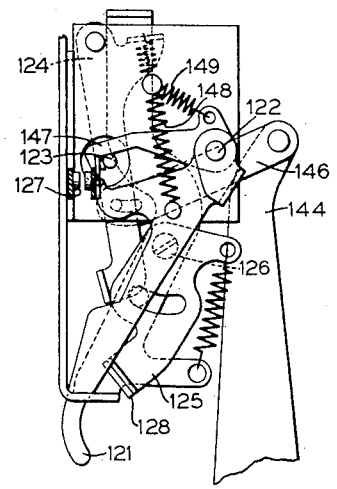
Fig. 12 is an elevation of the card receiver braking mechanism in a disabled position.

In the event a trip card is improperly inserted in card receiver 120 and it is desired to insert the same therein properly, a card release mechanism by which card braking member 125 (Fig. 9) is moved in a counterclockwise direction whereby brake shoes 128 are moved out of engagement with the trip card, is provided. This card release mechanism includes a card release handle 139 which is pulled upwardly an amount limited by the length of slot 140 therein. This upward movement of handle 139 causes camming surface 141 to engage pin 142, to thereupon rock cam follower arm 143 and cam follower arm link 144 in a clockwise direction. Arm 143 and link 144 are loosely positioned on hammer bail shaft 145 but are rigidly joined to one another. Inasmuch as arm restoring lever 146 is fixed to link 144, the aforesaid clockwise movement causes lever 146 to move to the right and carry with it arm 124 which is in engagement with lever 146 via a pin and slot connection. Arm 124 is carried back an amount sufficient for arm latch 147 to engage pin 123 (see Fig. 12). Arm 124, in turn, acts upon card braking member 125 in a manner to remove the action of brake shoes 128 on the trip card. As is shown in Fig. 12, brake shoes 128 are prevented from acting upon the trip card even though card lever 121 is being acted upon by the trip card. This is due to the fact that latch 147 is now in engagement with pin 123 to thereupon hold arm 124 in its most rearward position and member 125 in its most counterclockwise position.

Complete removal of the trip card from card receiver 120 permits spring-biased card lever 121 to move in a clockwise direction to its normal position shown in Fig. 9. As card lever spring 148 is stronger than arm latch spring 149, the upper projection of lever 121 acts upon latch 147 so that the latch is disengaged from pin 123 which then engages the projection of lever 121. This action returns the card braking mechanism to its normal position.

After a trip card has been properly inserted in card receiver 120, and after a machine cycle is begun by the recorder, release card interposer magnet 153 (Fig. 9) is energized through circuits to be described hereinafter, and causes release card interposer 154 to engage a step 333 in card release handle 139. This action locks handle 139 in a downward position, thereby assuring the non-removal of a trip card during a toll recorder cycle. The lower end of release card interposer 154 closes a pair of release card interposer contacts 155 when magnet 153 is energized.

It will be shown subsequently that during a recorder cycle, shaft 156 (Fig. 8) is caused to revolve. Shaft 156 has attached thereto a release card cam 157 (Fig. 9) which is in engagement with cam follower roller 158, said cam follower roller being attached to arm 143. This cam causes arm 143 to move in a clockwise direction so that the card braking mechanism is rendered ineffective in the same manner as when camming surface 141 acted upon pin 142.

*Card sensing mechanism*

As a trip card does not have punched data thereon when it is inserted in the entrance station toll recorder 27 (Fig. 1), mechanism for sensing punched data is not required in this toll recorder. However, since information is punched in the trip card at the entrance station, a means for sensing this punched information is required at the exit station toll recorder 33. Consequently, one of the basic differences between the entrance station and the exit station toll recorders is the presence of a card sensing mechanism in the exit station toll recorder.

As was mentioned hereinbefore in General System Description, complete insertion of the trip card with proper regard to the position of corner cut will render electric circuits operative whereby a card sensing mechanism is caused to analyze the trip card. These circuits will be described hereinafter in connection with the circuit diagram, it being sufficient for the present to say that proper insertion of the trip card into the toll recorder card receiver will cause card sensing solenoid 165 (Fig. 15) to become energized. This causes core 166 to be moved to the left and arm 167 to pivot in a clockwise direction about pin 168 in member 170. As is shown, arm 167 is connected to core 166 by a pin and slot connection. Sensing bail 169 is attached to a spring-biased member 170 by an adjusting screw 171 for arm 167 (see also Fig. 13), and a screw 180. As is apparent, screw 171 is used as a stop for arm 167.

Figure 15:
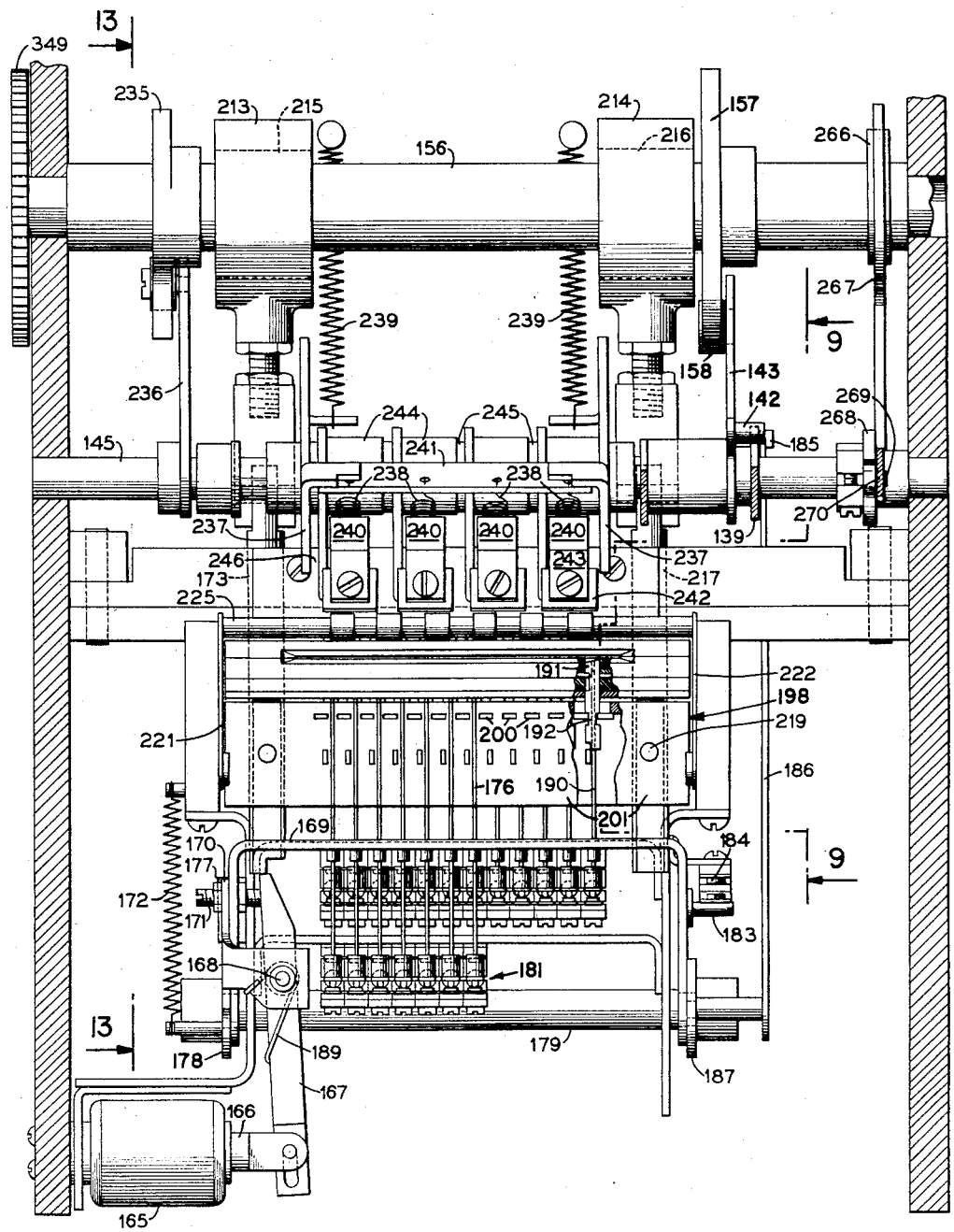
Fig. 15 is a plan view, somewhat diagrammatic in character, of a toll recorder card sensing, card punching, and card printing mechanism.

The forward movement (upward movement as shown in Fig. 15) of sensing bail 169 and member 170 under the urging of spring 172, is limited by a stop block 177. Stop block 177 engages link 178 (see also Fig. 13) which is rigidly attached, at one end, to shaft 179, and, at the other end, rigidly attached to member 169. Thus, the energization of solenoid 165 disengages arm 167 from the high point of link 173 to thereupon permit the forward movement of sensing bail 169 under the urging of spring 172; the forward movement of the sensing bail being limited by the position of stop block 177 with respect to link 178.

Figure 13:
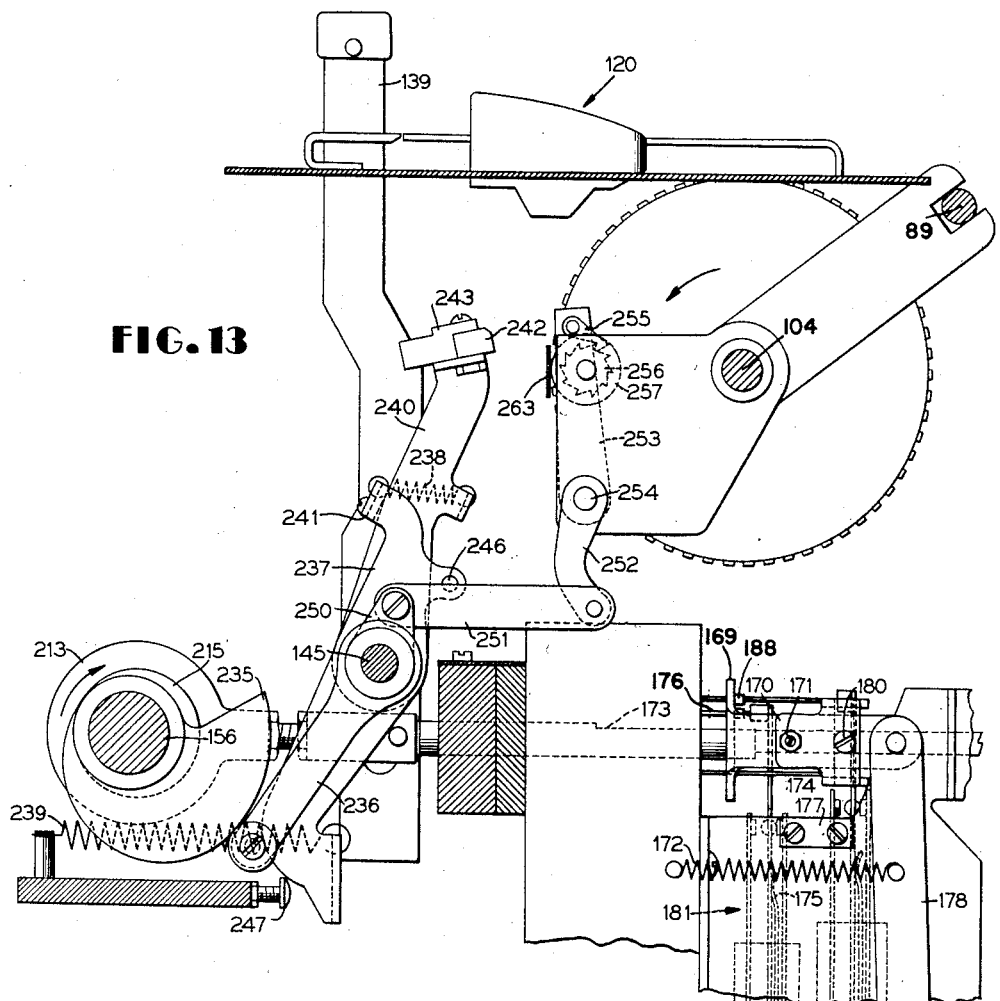
Fig. 13 is an elevation, somewhat diagrammatic in character and taken substantially along lines 13—13 of Fig. 15, of a toll recorder hammer mechanism.

Referring to Figs. 13 and 15, the movable transfer strap 174 of each sensing contact 181 is spring-biased against sensing bail 169 by an associated leaf spring 175. A sensing pin 176 for determining whether a hole is punched in a corresponding position of the trip card, is connected to each sensing contact transfer strap 174. A sensing pin plug 188 is rigidly attached to an associated sensing pin 176 for movement therewith. It is to be observed that the plugs 188 are biased against bail 169 due to the action of leaf springs 175. Hence, the forward motion of sensing bail 169 (movement to the left in Fig. 13) allows the leaf springs 175 to move the transfer straps 174 with the sensing bail. In addition, as a transfer strap 174 moves in a forward direction with sensing bail 169, sensing pins 176 also move in a forward direction to engage the trip card which is positioned in card receiver 120. Wherever a hole is present in the trip card, a correspondingly positioned sensing pin 176 is caused to pass through the hole under the urging of an associated leaf spring 175 to thereupon cause the normally open contacts of the sensing contact to close. However, with the absence of a punched hole, the sensing pin is stopped when it engages the face of the trip card, whereupon the normally open contacts are prevented from closing. It is to be observed in Fig. 15 that pin 183 which is fixed to sensing bail 169 acts upon sensing bail contacts 184 so as to close the latter when the sensing bail is in a forward, or operated, position.

As will be described hereinafter in connection with the circuit description, a toll collector may occasion the necessity for removing a trip card from the card receiver of a toll recorder after the sensing mechanism has been rendered operative. Referring to Fig. 9, it was described previously how an upward movement imparted to card release handle 139 causes the card braking mechanism to be rendered ineffective. It is to be observed that when a trip card is to be removed from the card receiver after the card sensing mechanism has been rendered operative and the pins 176 thereof moved toward the trip card, it is necessary to move the card sensing pins 176 shown in Fig. 13 out of engagement with the trip card. In other words, the removal of a trip card from the card receiver of an exit station toll recorder necessitates disabling the card braking mechanism and the card sensing mechanism.

Referring to Fig. 9, the upward movement of handle 139 causes pin 185 to engage the camming surface of the sensing bail restoring arm 186. This action causes arm 186 to be moved to the left carrying with it connecting link 187. Hence, inasmuch as link 187 is moved in a counterclockwise direction with shaft 179 to which it is pinned, sensing bail 169 is also moved to the left, or as is shown in Fig. 15, sensing bail 169 is moved in a downward direction. There are two links; namely, links 178 and 187 pinned to shaft 179 which is used as a torsion member to make both ends of the sensing bail move together. The movement imparted to the sensing bail causes the latter to act upon the sensing pin plugs 188 (Fig. 13) so as to carry the sensing pins 176 which are rigidly attached to the plugs 188, out of engagement with the trip card in the card receiver. The rearward movement imparted to sensing bail 169 also causes member 170 to be moved a distance such that arm 167 (Fig. 15) is free to move in a counterclockwise direction about pin 168 and against adjusting screw 171 under the urging of its spring 189. Hence, after the trip card has been removed from the card receiver, and the card release handle 139 has been restored to its normal position in a downward direction, arm 167 is in engagement with the high point of link 173 so as to keep the sensing pins 176 out of the card receiver card path.

As was mentioned previously in the General System Description, the trip card is analyzed at the exit station so as to determine the presence or absence of a cancelation perforation. Inasmuch as a cancelation perforation is punched in a trip card at the exit station only after the sensing operation is completed, this check operation for a cancelation perforation is to prevent the reuse of a trip card after it has once been processed at an exit station. Referring to Fig. 15, cancelation hole sensing pin 190 is passed through a hollow cancelation punch 191. Thus, when sensing bail 169 is moved in a forward direction as described previously, sensing pin 190 is moved therewith and through the hollow punch 191. As the description advances, the circuit operation will be described in detail to show that if pin 190 senses the absence of a cancelation perforation in the trip card, the hollow punch 191 will subsequently during a punching operation cause a cancelation perforation to be entered in the card. However, if a cancelation perforation is sensed by pin 190, circuits are set up whereby the exit toll recorder cycle, including card punching, is prevented. In addition, a visual signal is caused to operate so that the toll collector is made aware of the fact that a reuse of a previously processed trip card is being attempted.

The manner in which the sensing mechanism is restored during a toll recorder cycle will be described hereinafter under Punch Mechanism.

*Card punching mechanism*

The information recorded on the trip card at the entrance station and the exit station as perforated data is enumerated in General System Description. Some of the items of information punched in the trip card are common to all trip cards punched at a given station toll recorder. For example, the entrance station number is an item of information which is the same in all trip cards punched at a particular entrance station toll recorder. On the other hand, other items of information vary from one card to the next because the punching mechanism for recording this information is selectively set up either manually or automatically. An example of this latter type of varying information is the number of axles carried by the vehicle.

As the punching mechanism in the entrance toll recorder 27 (Fig. 1) is similar to that in exit toll recorder 33, only the aforesaid mechanism in recorder 27 will be described to avoid undue prolixity.

A punch which is to perforate a trip card each toll recorder cycle is preset to do so. This causes unvarying information to be entered upon each trip card. However, a punch which does not perforate the trip card every recorder cycle, is selectively controlled by an electromagnet actuated interposer associated with the punch. As a punching machine having an electromagnet actuated interposer is well known to persons familiar with this art, and is described in the prior art, for example U.S. Patent 1,878,935 issued to F. L. Lee, a detailed description of such a punching mechanism is believed to be unnecessary.

Referring to Fig. 9, an energized electromagnet (not shown) causes its interposer 195 to be moved upwardly an amount sufficient to position the upper portion of the interposer between its related punch 196 and the backing member 197 of punch carrier 198. As is to be described in detail shortly, punch carrier 198 is caused to move to the right during a punching operation, and only those punches 196 whose interposers have been moved upwardly, will be carried with the carrier. That is, the backing member 197 acts upon the upper portion of the interposer moved between the member and a punch 196 so that the interposer, in turn, acts upon the punch. The absence of an interposer between the backing member and a punch results in only a movement of the backing member and not the corresponding punch. A punch engaging screw 199 is inserted in member 197 in alignment with an associated punch that is to perforate the trip card each recorder cycle, whereby movement of the backing member will cause screw 199 to engage and move therewith its punch.

As described previously with reference to Fig. 15, movement of sensing bail 169 causes pin 183 to close sensing bail contacts 184. As is shown in Fig. 9, an upward movement of an interposer 195 engages an interposer bail 182, whereupon the latter is caused to move block 193 so as to cause the latter to close punch interposer bail contacts 194. As to be described hereinafter in connection with the circuit diagram, the closing of contacts 184 and 194 conditions circuits which render the punch and print electromagnet 203 (Fig. 8) energized. Energization of magnet 203 attracts armature 204 thereto to thereupon release clutch dog 205 for engagement with clutch ratchet 206. It is sufficient for the present to state that the toll recorder circuits are so arranged that motor 68 is continuously operating as long as power is applied to the toll recorder. Hence, as long as power is applied to the toll recorder, clutch ratchet 206 is continuously revolving, as shown in Fig. 8, in a counterclockwise direction through a driving train including gear 70, timing belt 72, and gears 74, 75 and 207. Gear 207 is fixed to sleeve 211 to which ratchet 206 is also fixed. Sleeve 211 is loosely positioned on shaft 156.

The engagement of dog 205 and ratchet 206 causes shaft 156 to rotate in a counterclockwise direction because dog 205 which pivots about a pin 208 attached to a disc 209 is connected, in turn, to shaft 156. As the time duration of the voltage impulse applied to magnet 203 is less than the time required for shaft 156 to complete one revolution, armature 204 will be in position to declutch dog 205 at the completion of one revolution. That is, the end of armature 204 will be in position to engage the dog as is shown in Fig. 8, so as to cause disengagement of the dog 205 and ratchet 206 after only one revolution of shaft 156. Detent 210 engages a notch in disc 209 so as to prevent a rebound in a clockwise direction of shaft 156 and mechanism associated therewith when dog 205 is disengaged from ratchet 206.

Referring to Figs. 13 and 15, punch drivers 213 and 214 are loosely positioned on related eccentrics 215 and 216, respectively, which, in turn, are rigidly attached to shaft 156. Hence, the rotation of shaft 156 and eccentrics 215 and 216 by mechanism described hereinbefore, causes the punch drivers to be moved so that links 173 and 217 attached thereto are reciprocated. The links first move in a forward (upward as shown in Fig. 15) direction toward shaft 156, and then move in a rearward direction away from the shaft. Referring to Fig. 15, the connecting links 173 and 217 are each attached to punch carrier 198 by connecting pins 218 and 219, respectively. Thus, the reciprocating movement accorded the links causes a similar movement to be imparted to the punch carrier. That is, with reference to Fig. 9, punch carrier 198 is first caused to move to the right so as to carry therewith selected punches 196 which are to perforate the trip card, and then is caused to move to the left to its home position so as to remove the punches from the card receiver card path.

Referring to Figs. 9 and 15, punch guide pins 200 are arranged between a carrier upper plate 201 and a lower plate 202. Each pin is positioned within a notch 192 (Fig. 15) in adjacent punches. Hence, as the carrier 198 is moved in a rearward direction, each pin is caused to engage the back side of the notches 192 in adjacent punches so as to move the punches out of the card receiver card path. Of course, the punches which are not used to perforate a trip card during the forward motion of the carrier are not in position to be engaged by the pins 200 during the rearward motion of the carrier. As these punches are not moved in the card receiver card path to begin with, it is not necessary to restore them.

The movement of punch carrier 198 as aforedescribed, whereby the punches 196 are caused to perforate the trip card causes the card chips to be moved through the die 220 (Fig. 9) and into a chip chamber 221. So as not to permit an amount of chips to become a solidly packed mass in chamber 221, a chip agitator is provided. Referring to Figs. 9 and 15, bell cranks 571 and 222 are caused to oscillate about their respective pivot points, point 223 for example, as carrier 198 is caused to reciprocate. Stem 225 is attached to bell cranks 571 and 222 so that the stem is caused to reciprocate in a vertical direction. A chip agitator screen 226 (Fig. 9) is hung on stem 225 and, accordingly, is also reciprocated in a vertical plane. The agitator screen is a wire lattice network which, during its movement, agitates the chips within chamber 221 to keep the same in a loose state within chamber 221. A rotating worm screw (not shown) is used to carry the chips that fall from chamber 221 into a chamber 572 to a removable chip box placed outside of the toll recorder.

As described in Sensing Mechanism Description, arm 167 (Fig. 15) is moved into the low end of link 173 when solenoid 165 is energized, and this movement of arm 167 is limited by the position of stop 177 (see also Fig. 13) which engages link 178. Thus, during the card punching period of the toll recorder cycle when the links 173 and 217 (Fig. 15) are moved in a forward direction toward punch shaft 156, the movement is sufficient to disengage arm 167 and link 173. This action causes spring 189 to move arm 167 against the end of screw 171 so that the high end of link 173 will once again engage arm 167 when the links are moved in a direction away from punch shaft 156.

As mentioned in the Card Receiver Mechanism description, shaft 156 (Fig. 8) has fixed thereto a release card cam 157 (Fig. 9) which acts against cam follower roller 158 which is attached to arm 143. At the end of the recorder cycle; i.e., after the trip card sensing, punching and printing operations, arm 143 is caused to move in a clockwise direction when the cam follower roller 158 rides on the high point of cam 157. This renders the card braking mechanism ineffective, or disabled, in a manner described previously. In addition, interposer bail operating arm 230 which is connected, at one end, to arm 143, and, at the other end, to link 231, is caused to move in a direction to cause link 231 to pivot in a clockwise direction. Since link 231 is fixed to shaft 232 as are interposer bail 182 and member 193, any interposers 195 in an upward position are moved downwardly by the clockwise action of bail 182. Contacts 194 are opened by the removal of the force exerted by member 193 upon the contact straps.

Card printing mechanism

As the card printing mechanism in the entrance toll recorder 27 (Fig. 1) is similar to that in exit toll recorder 33, only the aforesaid mechanism in recorder 27 will be described to avoid undue prolixity.

It was stated previously that during a toll recorder cycle, shaft 156 (Fig. 8) is caused to complete a single revolution after punch and print electromagnet 203 is energized. As shaft 156 (see also Fig. 15) is rotated, the punch drivers 213 and 214 are moved so that the punch mechanism causes the perforation of trip card in the toll recorder card receiver. Immediately thereafter, the printing mechanism causes items of information enumerated in General System Description to be printed upon the face of the trip card. Referring to Fig. 2, this printed information includes the following items:

(1) The identification number, e.g., H/3, of the entrance station toll collector.

(2) The number of the station lane, e.g., 1/8, through which the vehicle passes to enter or leave the highway.

(3) The time and the day, e.g., 18:26 and 265, respectively, at which the trip card has the information entered thereupon.

(4) The sequence number, e.g., 1593, of the card processed in the toll recorder.

Referring to Figs. 13 and 15, cam 235 is fixed to shaft 156, and restoring cam follower 236 is fixed to shaft 145. Print bail arms 237 are also fixed to shaft 145. Each arm is connected, at one end, to hammer spring 238, and at the other end, to bail spring 239. The second end of hammer spring 238 is connected to hammer 240 which is freely arranged on shaft 145. Thus, hammer 240 is held against print bail 241 which is attached to print bail arms 237. The other end of bail spring 239 is connected to a spring post to thereupon bias the print bail mechanism in a clockwise direction.

As is shown in Fig. 15, there are four hammers 240 each of which is normally held against print bail 241 by associated hammer springs 238. In addition, each hammer includes a platen 242 which is held in place by a hammer head 243. Each hammer is also connected to a collar 244 which is freely arranged on shaft 145, each of the collars being separated by suitable spacers 245.

Referring to Fig. 13, as shaft 156 rotates in a clockwise direction, cam follower 236 causes the print bail mechanism to move in a counterclockwise direction. This movement actually cocks the print bail mechanism and the hammers 240 for rapid release when cam follower 236 drops off the high dwell of cam 235. At this time print bail 241 acts upon hammers 240 to cause the latter to move in a clockwise direction about shaft 145. The impetus of hammers 240 causes the same to continue their movement even after bail 241 stops. It is during this continued movement that platens 242 strike the trip card in the card receiver to effect a printing stroke. The hammers 240 are returned to a position against bail 241 by springs 238. A positive return of the hammers is assured by rod 246 which is carried by print bail arms 237. Quite soon after cam follower 236 falls off the high dwell of cam 235, the cam follower is moved in a counterclockwise direction so that rod 246 is moved in a counterclockwise direction about shaft 145. Hence, any hammer bounce will be restrained, and restricted with the limits set up by bail 241 on the one side and rod 246 on the other side. Immediately after a printing stroke, rod 246 is in a position, however, to prevent platens 242 from striking the trip card. It is to be observed that an adjustable rubber stopper 247 cushions each print bail arm 237 to a stop when the arm engages the stopper after cam follower 236 falls off the high dwell of cam 235.

The platen on the extreme left as is shown in Fig. 15, causes the sequence number of the toll recorder cycle to be printed upon the trip card. The printing counter for setting up this information is a mechanical pulse type counter well known to those persons familiar with this art. Referring to Fig. 13, member 250 is fixed to shaft 145 and connected to link 251. Link 251, in turn, is connected to rocker 252 which is connected to arm 253 through a connector 254. Arm 253 has a pawl 255 pivotally attached at its upper end. The pawl is in engagement with ratchet 256 which is joined to the units wheel 257 of the sequence counter. Thus, when member 250 is moved in a counterclockwise direction, arm 253 is moved in a clockwise direction about stud 254 to cause pawl 255 to engage the next notch of ratchet 256. During the return movement of member 250 in a clockwise direction, arm 253 is moved in a counterclockwise direction carrying with it pawl 255 so that ratchet 256 and counter wheel 257 are advanced one increment. During the movement of counter wheel 257 from a 9 to 0, the well-known deep tooth transfer carry is used to advance the tens wheel one position.

The right-hand platen 242 shown in Fig. 15 causes the identification number of the toll collector and the lane identification number to be printed on the trip card. Referring to Fig. 9, a type face 260 designating the toll collector's identification number is embossed on a toll collector key, key 40 for example (see Fig. 1). This key is assigned to a toll collector, and is inserted into the toll recorder at the start of his tour of duty, and removed from the toll recorder at the end of his tour of duty. In addition to providing the type face designating the toll collector's identification number, key 40 causes collector key contacts 261 to close when extension 259 engages the contact operating arm 262. The purpose of contacts 261 will be described in detail in connection with the circuit diagram.

Ribbon drive mechanism

Figure 17:
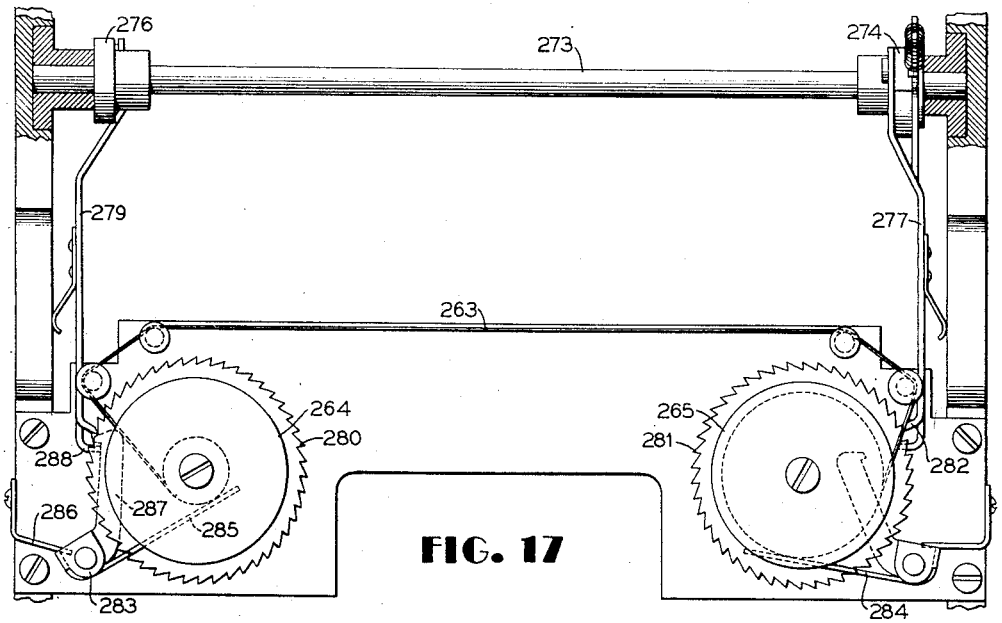
Fig. 17 is a plan view of a toll recorder ribbon spacing drive mechanism.
Figure 18:
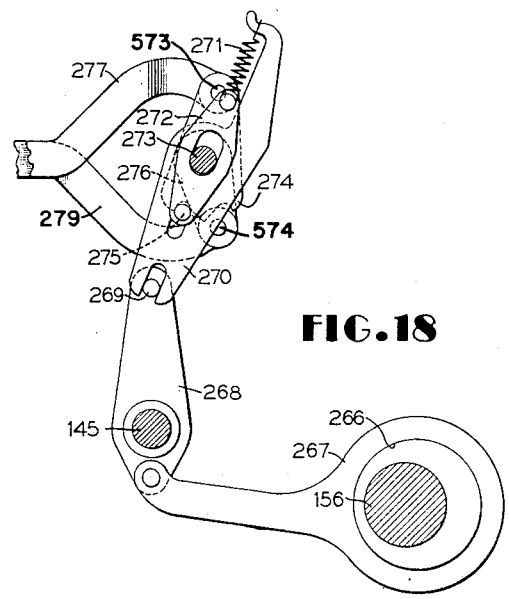
Fig. 18 is a detail view of a portion of the ribbon drive mechanism.

The ribbon drive mechanism which becomes operative immediately after a printing operation to effect ribbon spacing, is shown in Figs. 17 and 18. It is to be observed that the ribbon drive mechanism in the entrance toll recorder 27 (Fig. 1) is similar to that in the exit toll recorder 33. The ribbon 263 (Fig. 21) is wound on spools 264 and 265 each of which are positioned so as to operate in the usual manner, one spool to unwind as the other spool winds the ribbon. The rotation of shaft 156 (Fig. 18) to recock the print bail and hammer mechanism after it has been tripped causes eccentric 266 (see also Fig. 15) to move driver 267 in a direction away from shaft 156. The extreme end of driver 267 is connected to arm 268 which is freely positioned on hammer shaft 145. Hence, the rotation of shaft 156 causes driver 267 to be moved first toward the front of the machine, or toward the left, as viewed in Fig. 18. A stud 269 on arm 268 moves the lower end of a lever 270 to the right. The upper end of lever 270 is connected by a spring 271 to an arm 272 which is positioned by the pivot shaft 273 and also by a slot in lever 270 in the end of a member 274 in which a stud 275 on the arm 272 is seated. Member 274 is secured to the right end of the pivot shaft 273 and a similar member 276 is fastened to the other end but is inverted in its position with respect to member 274. The mechanism is thus arranged so that movement of the lower part of lever 270 to the right causes a ribbon feed arm 277 connected to the member 274 by a loose pin connection 573 to move to the left and at the same time also causes another ribbon feed arm 279 connected to the member 276 by a loose pin connection 574 to move to the right. Referring to Fig. 17, it is seen that the ends of the arms 277 and 279 identified generally by reference numerals 282 and 288, respectively are bifurcated and cooperate with ribbon spool ratchets 280 and 281, respectively. However, due to the toggle mechanism construction shown in Fig. 18, only one of the two arms 277 and 279 is permitted to extend outwardly far enough to operatively engage its corresponding ribbon spool ratchet. This operative action is determined by the notch in the member 274 in which the stud 275 is seated. When this stud is in the forward, or left, notch and arm 268 is operated, the arm 277 moves toward the front, or to the left, to feed the ribbon spool ratchet 281 ahead one tooth by the engaging of the projection 282 with this ratchet. At the same time arm 279 is being moved toward the rear of the machine away from its ratchet 280. On the return stroke of arm 268, the movement of the arms 277 and 279 is reversed for each, the arm 277 moving away from its ratchet 281 and the arm 279 moving towards its ratchet 280. However, with the stud 275 seated in the forward, or left, notch the arm 279 never moves out far enough to engage ratchet 280.

Reversing mechanism for the ribbon is provided and has the effect of throwing the toggle mechanism so that the stud 275 moves out of the notch of member 274 in which it is positioned and into the other notch in this member so that whichever of the arms 277 or 279 that was causing the ribbon spacing will at this time be pulled back out of the way and the other arm moved into an operating relationship with its ratchet. The ribbon reversal sensing mechanism to determine when the ribbon has been fed far enough in one direction comprises a pawl member 285 (Fig. 17) pivotally mounted on shaft 283 and associated with the ribbon spool 264 and a similar pawl member 284 associated with the ribbon spool 265. In Fig. 17 the pawl member 285 is shown in an operative ribbon reversal position due to the fact that the quantity of wound ribbon on the spool 264 is low, whereby the pawl member has moved towards the ribbon spool center under the urging of a flat spring 286. Thus, a pawl 287 attached for movement with pawl member 285 has consequently been permitted to move in a counterclockwise direction sufficiently to engage a projection 288 on the arm 279. Thus, when arm 279 attempts to pursue its normal rearward travel it is prevented in so doing by the engaging pawl 287 and this results in the toggle mechanism being thrown so that the stud 275 is seated in the other notch, i.e., the right notch, of member 274. Consequently, the arm 279 becomes effective to feed the ratchet 280 and wind the ribbon in the reverse direction upon further printing operations.

*Tour of duty recorder mechanism*

The tour of duty recorders 23 (Fig. 1) and 37 are similar in construction, function and purpose. Each recorder is one wherein a summary report of the transactions at a station lane is made. That is, a tour of duty recorder is associated with each entrance and exit station lane so that data relating to the start of a tour of duty for a toll collector and to the end of a tour of duty, are available.

The information printed on the summary check sheet 38 (Fig. 4) includes the following items:

(1) *Total axles selected.*—An accumulation of the number of axles represented by the axle keys depressed in unit 25, for example, by the toll collector.

(2) *Forward axle count.*—An accumulation of the actual number of vehicle axles passing over a treadle in a forward direction.

(3) *Reverse axle count.*—An accumulation of the actual number of vehicle axles passing over a treadle in a reverse direction.

(4) *Sequence number count.*—An accumulation of the number of toll recorder cycles.

(5) *Station number and lane number.*—The type wheels for printing this information are preset so that the check sheet from a particular tour of duty recorder is associated with a specific lane in a definite toll station.

Figure 19:
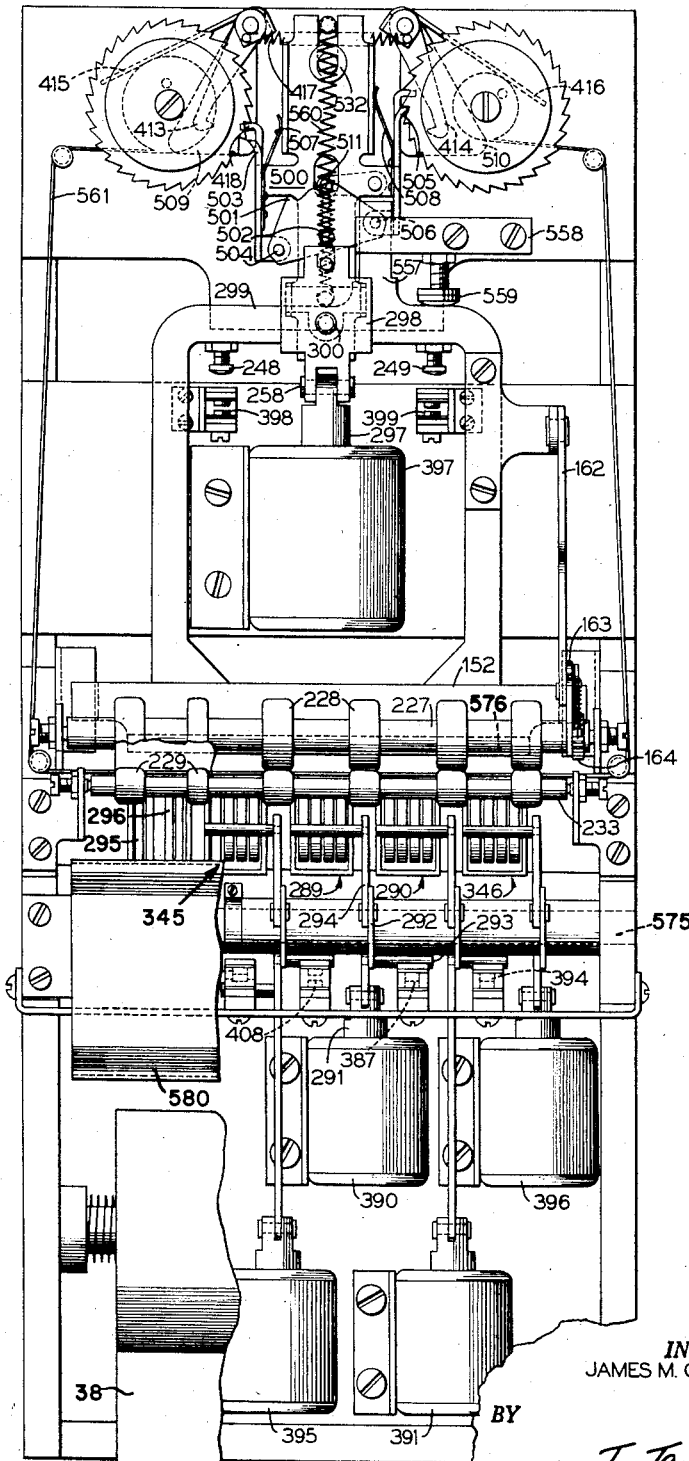
Fig. 19 is a plan view of a tour of duty recorder.

Referring to Fig. 19, the tour of duty recorder in general comprises a plurality of printing counters, a check sheet paper feed, a ribbon drive mechanism, and a print stroke effecting mechanism. Forward axle counter magnet 390 is energized each time a vehicle axle passes over the treadle in a forward direction, whereas magnet 391 is energized every time a vehicle axle passes over the treadle in a reverse direction. By means of a mechanical linkage similar to that for the toll recorder sequence counter wheel 257 shown in Fig. 13, forward axle counter 289 and reverse axle counter 290 are advanced one units position each time their respective counter magnets 390 and 391 are energized. When counter magnet 390, for example, is energized, core 291 is moved downwardly, carrying with it link 292 and contact operating pin 293. Since link 292 is connected to arm 294, and since link 292 is pivotally mounted at approximately its midpoint on shaft 575, the downward movement of link 292 provides the movement of the arm causing a pawl to engage a new tooth of the units counter wheel ratchet so that the return movement of arm 294 advances the units position counter wheel of counter 289 one increment. It is to be observed that the downward movement of core 291 causes pin 293 to open forward contacts 387 so long as magnet 390 is energized.

Similarly, the energization of magnet 391 causes reverse contacts 394 to open. It will be shown in connection with the circuit diagram for the tour of duty recorder that the energization of total counter magnet 395 causes contacts 407 to open and contacts 408 to close concurrently. The station number printing wheels 295 and lane identification printing wheels 296, are preset to print the same information every printing stroke.

The energization of control magnet 397 effects a printing stroke, a paper feed and a ribbon feed. Operating studs 248 and 249 are attached to yoke 299 for movement therewith in order to close their respective contacts 398 and 399 when magnet 397 is energized, to move core 297 downwardly. Core 297 is connected to member 298 by a pin 258, and member 298 is also connected to yoke 299 by pin 300. The upper extension 557 of yoke 299 slides within a fitted opening in member 558 in order to prevent sidewise movement of the yoke. Bumper 559 is attached to member 558 in order to stop the upward movement of the control magnet mechanism under the urging of spring 560. A platen bar 152 including a resilient platen 576 is attached to yoke 299. Arm 162 is also connected to yoke 299 for movement therewith, and spring-biased pawl 163 is connected to arm 162. Pawl 163 engages ratchet 164 which, in turn, is fixed to paper feed shaft 227. Thus, each reciprocating movement of arm 162 causes pawl 163 to engage a succeeding notch on ratchet 164 to thereupon advance shaft 227. Interposed between the rubber rolls 228 fixed to shaft 227 and the rubber rolls 229 fixed to idler shaft 233, is the paper check sheet 38. Thus, the movement imparted to shaft 227 due to the reciprocating action of arm 162 when magnet 397 is energized and subsequently de-energized, causes the sheet 38 to advance.

Slide member 500 is connected to member 298 for movement therewith by pin 300. This member is bifurcated to engage guide stud 532 which prevents sidewise movement of the slide member. Toggle element 501 is pivotally connected to stud 502 which, in turn, is attached to slide member 500. Left ribbon spool advancing pawl 503 is pivotally connected to toggle 501 at point 504, whereas right ribbon spool advancing pawl 505 is pivotally connected to the toggle at point 506. Leaf springs 507 and 508 are each connected, at one end, to pawls 503 and 505, respectively, in order to position the pawls against their respective guides 509 and 510. Spring-biased detent stud 511 engages one of two dwells in toggle 501 to spring lock the toggle in a position so that only one of the two pawls is permitted to extend far enough to reach its corresponding ribbon spool ratchet. When this stud is in the right dwell as is shown in Fig. 19, and slide 500 is moved downwardly due to the energization of magnet 397, pawl 505 engages a notch on the right ribbon spool ratchet. On the return stroke of slide 500 under the urging of spring 560 when magnet 397 is de-energized, pawl 505 advances the ribbon spool associated thereto. It may be seen in Fig. 19 that pawl 503 does not move far enough on the return stroke to advance its corresponding ribbon spool.

Reversing mechanism for the ribbon is provided, and it operates similarly to the ribbon reversing mechanism in the toll recorder. The sensing mechanism to determine when the ribbon has been fed far enough in one direction comprises a pawl member 413 associated with the left ribbon spool and a similar pawl member 414 associated with the other ribbon spool. In addition thereto, a flat arm 415 is attached to pawl member 413 and a flat arm 416 is attached to pawl member 414; each of the arms being maintained in contact with the ribbon wound on a corresponding spool by spring 417. A pawl member, for example member 413, is placed in an operative position when the ribbon windings carried by the associated spool have decreased so that member 413 engages the arm 418 carried with pawl 503. Thus, when slide 500 is moved downwardly due to the energization of magnet 397, pawl 503 is prevented from moving therewith. This results in the toggle mechanism including toggle 501 being thrown so that detent stud 411 engages the left dwell in the toggle. Consequently, pawl 503 becomes operative to feed the left ribbon spool ratchet and wind the ribbon in the reverse direction, and pawl 505 is rendered inoperative.

Sequence counter 346 is advanced one count every toll recorder cycle. As is shown, this counter is controlled by magnet 396 and mechanical linkage associated therewith.

In summation, energization of magnet 397 causes platen support bar 152 to move against check sheet 38 and the ribbon 561 interposed between platen 575 and the type wheels to effect an imprint upon the check sheet. During the return movement of the magnet mechanism, shaft 227 is caused to advance to thereupon feed sheet 38 a suitable amount, and a ribbon spool is rotated one notch to move ribbon 561.

Key mechanism

Figure 16:
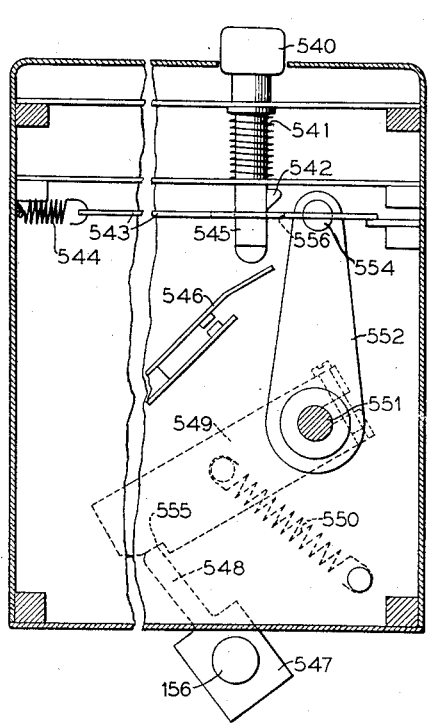
Fig. 16 is an elevation with parts in section of a manually operated key unit mechanism.

The operating features of the key mechanism associated with key units 24 (Fig. 1), 25 and 42 at the entrance station, for example, are shown in Fig. 16. Key 540 is biased upwardly by a spring 541 so that catch lock 542 is normally above slide plate 543. This plate is urged to the left by a spring 544. The stem 545 to which lock 542 is attached passes through plate 543 in a position such that the camming surface of lock 542 engages plate 543 when key 540 is depressed. The camming surface of lock 542 causes the slide plate to move towards the right against the action of spring 544 until the flat upper surface of the lock is below the lower surface of plate 543. At this time, the slide plate is released to return to its home position, whereupon key 540 is held in a depressed position due to lock 542 being below the plate. In the event another key (not shown) in the key unit is depressed, the movement of the slide plate due to the camming surface of the catch lock attached to this other key, will be sufficient to disengage lock 542 from plate 543. Thus, key 540 will move upwardly under the urging of spring 541.

As is shown, key stem 545 operates upon associated key contacts 546 so long as the key is in a downward position. In other words, the key contacts associated with a key which is depressed, remain in an operative condition until the key is caused to move upwardly.

Member 547 is fixed to shaft 156 (see also Fig. 8) for rotation therewith when magnet 203 is energized. Arm 548 is secured to member 547 and acts upon bar 549. This bar is biased in a counterclockwise direction by spring 550. Bar 549 is fixed to stud 551 as is slide plate operating arm 552. Army 552 has attached thereto a slide plate engaging element 554 for moving plate 543 to the right when bar 549 is caused to pivot in a clockwise direction.

During the period dog 205 (see also Fig. 8) is disengaged from clutch ratchet 206 so that shaft 156 is not revolving, arm 548 is in the first step 555 in bar 549. It is in this position of bar 549 that element 554 does not act upon slide plate 543. Consequently, as mentioned previously, a downward motion of key 540 must simply overcome the light spring tension caused by springs 541 and 544. However, as soon as shaft 156 starts rotating in a counterclockwise direction, bar 549 is released from arm 548 for movement in a counterclockwise direction under the urging of spring 550. This movement is stopped when element 554 engages sidewall 556 in a plate 543. As element 554 engages plate 543, and since spring 550 exerts a comparatively large force, the depression of any key during a toll recorder cycle when shaft 156 is rotating, requires considerable downward force. This is for the reason that the combined urgings of springs 544 and 550 as well as the individual key springs such as 541, must be overcome to move spring plate 543 to the right.

Near the completion of the toll recorder cycle, arm 543 engages the lower surface bar of 549 to thereupon move the latter in a clockwise direction. This movement imparts a movement to the right to plate 543 whereupon all catch locks 542 are released from the plate. Thus, it is at this time that all of the key contacts 546 are once again caused to be inoperative.

Circuit description

Whenever any one of the various recorder mechanisms already described is in both the entrance station and the exit station apparatus, only the mechanism in the entrance station has been described in order to avoid undue prolixity. This, of course, is for the reason that the exit station mechanism in these instances is the same as that in the entrance station. In order to avoid confusion in the circuit description between the entrance station and the exit station wiring diagrams, any electrical apparatus described hereinbefore in connection with a mechanism will be identified in the entrance station diagram by the suffix "N" and in the exit station diagram by the suffix "X." For example, the toll collector key contacts 261 (Fig. 9) in the wiring diagram for the entrance toll recorder 27 (Fig. 1) are designated 261-N (see also Fig. 20a), and in the wiring diagram for the exit toll recorder 33 (Fig. 1) are designated 261-X (see also Fig. 21a). Also, the punch and print clutch magnet 203 (Fig. 8) is designated 203-N (see also Fig. 20b) in the wiring diagram for the entrance toll recorder, and is designated 203-X (Fig. 21b) in the wiring diagram for the exit toll recorder.

Figure 20A:
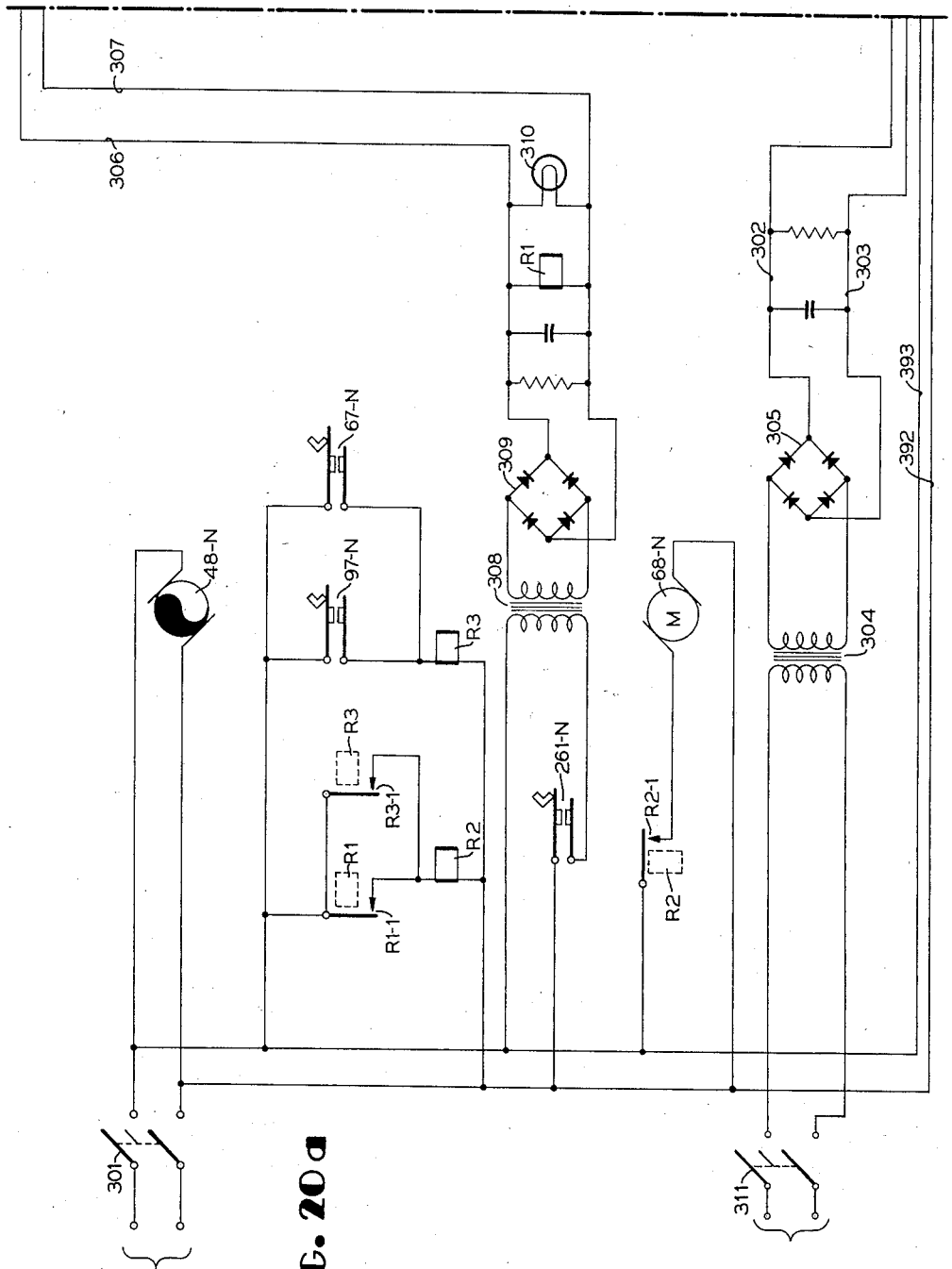

*Entrance station apparatus.*—The circuit description of the entrance station recorder apparatus (Fig. 1) will be given first. Referring to Fig. 20a, power is applied to synchronous motor 48-N when main switch 301 is closed, in order to drive the time control mechanism described previously. Similarly, direct current power is applied to lines 302 and 303 after main line power is applied to transformer 304 and bridge rectifier 305 when switch 311 is closed. As the description advances, it will be shown that the power on lines 302 and 303 is applied to only tour of duty recorder 23 (Fig. 1). This is desirable in order to keep the tour of duty recorder electrically separate from the toll recorders.

With reference to Fig. 9, it has been described previously that the insertion of the toll collector key 40 into the toll recorded causes a pair of key contacts 261 to close. It is to be recalled that the collector key must be inserted in the toll recorded at the start of a tour of duty and must be removed from the toll recorder at the end of a tour of duty. This is important because a key 40 which is assigned to a particular toll collector has embossed thereon a type face for printing the toll collector's identification number on each trip card. Hence, in order to assure the insertion of a toll collector key 40 into the toll recorder, power is not applied to the toll recorder until the key is so inserted. Referring once again to Fig. 20a, power is applied to lines 306 and 307 only if key contacts 261–N are closed to apply a voltage across transformer 308. The direct current power applied to lines 306 and 307 for toll recorder 27 (Fig. 1) is obtained after the power is rectified by bridge rectifier 309 (Fig. 20a). It is to be observed that since power light 310 is connected to lines 306 and 307, the light is energized as soon as the toll collector key is inserted in the toll recorder to close key contacts 261–N. Relay R1 is connected in parallel circuit to light 310. Thus, the closing of key contacts 261–N causes the energization of relay R1 which, in turn, causes the energization of relay R2 when contacts R1–1 close. Energization of relay R2 causes contacts R2–1 to close to thereupon apply power to minute advance motor 68–N (see also Fig. 8). It is apparent that motor 68–N is rendered operative so long as the toll collector key is inserted in the toll recorder to maintain key contacts 261–N closed. However, it is not only desirable but necessary that the time control mechanism described previously, be permitted to operate continuously, even though a toll collector key is not inserted in the toll recorder. With reference to Fig. 20a, it is to be recalled that minute advance warning contacts 97–N (see also Fig. 7) are closed approximately 0.4 second prior to the time that latch arm 53 moves to the left. Arm 53 causes latch member 56 to close minute advance motor contacts 67–N. Hence, minute advance relays R3 is energized when contacts 97–N close and is maintained energized during the time the contacts 67–N are closed. Relay R2 is then energized through contacts R3–1.

Figure 20B:
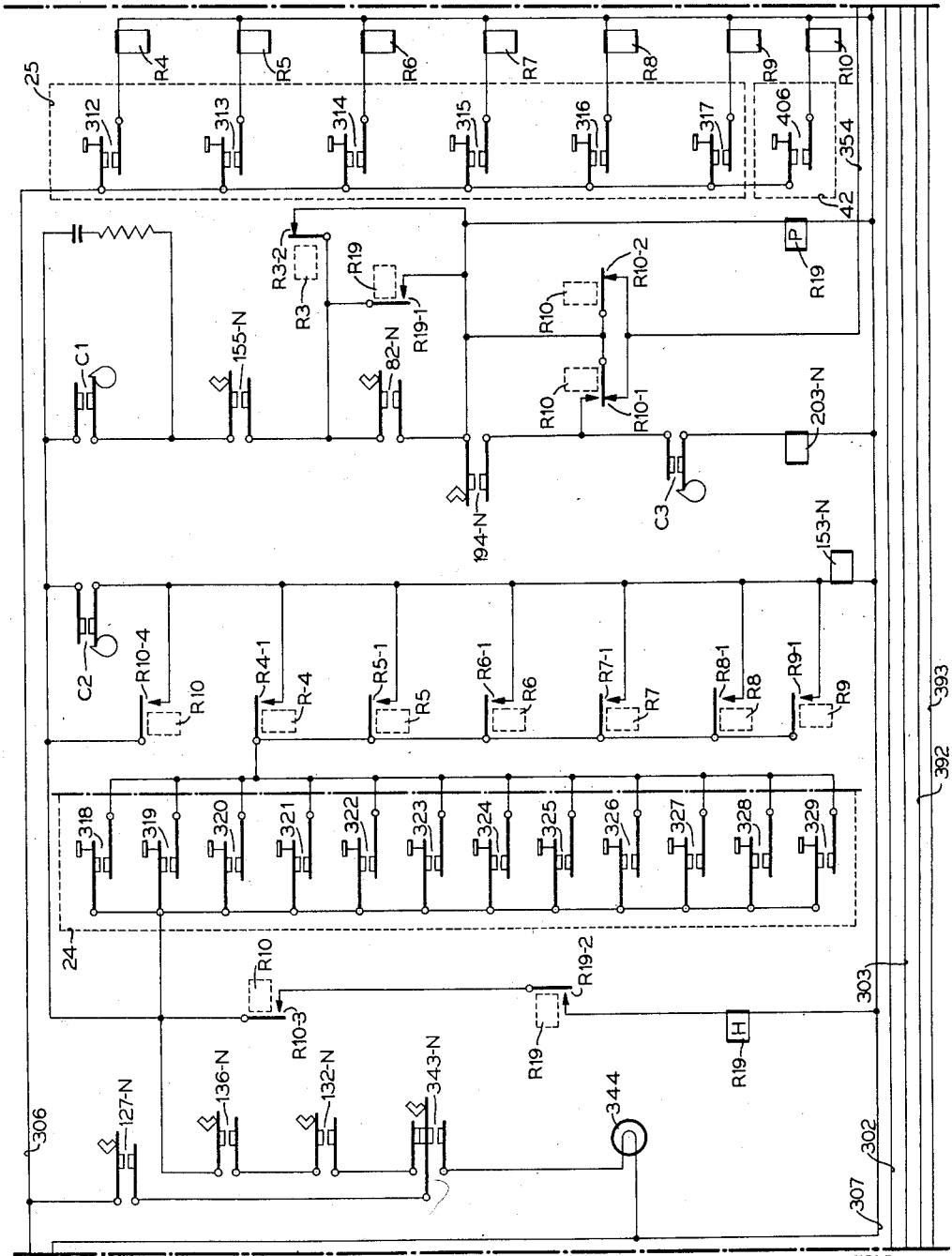

With reference to Fig. 1, it is to be recalled that the vehicle 20 which is stopped opposite entrance station stop booth 21, is examined by the toll collector for the number of vehicle axles thereon. After this examination, the toll collector then depresses an axle key in a unit 25 in Fig. 1; a key which corresponds to the number of axles on vehicle 20. Referring to Fig. 20b, there are six axle keys to control contacts 312 through 317 which, in turn, control relays R4 through R9, respectively. Key contacts 313, for example, are closed for a two axle vehicle whereas key contacts 317 are closed for a six axle vehicle. Accordingly, the energization of relay R5 is indicative of a two axle vehicle, and the energization of R9 is indicative of a six axle vehicle.

Referring once again to Fig. 1, vehicle 20 is also examined by the toll collector so that the classification of the vehicle may be determined. As mentioned hereinbefore in General System Description, the classification of different types of vehicles is preferably determined by the governmental authority which controls the operation of the toll highway recorder system. This authority may, for example, assign a classification "1" to all passenger vehicles whose licensing weight is under 3500 pounds, and a classification "2" to all passenger vehicles whose weight is over 3500. In addition, the authority may determine that lightweight delivery vehicles such as the so-called quarter ton pick-up trucks are in classification "3," etc. Accordingly, a classification key corresponding to the classification determination made by the toll collector, is depressed in unit 24. Each of the classification keys in unit 24 causes a pair of left contacts 318 through 329 (Fig. 20b) and a corresponding pair of right contacts 330 through 341, respectively (Fig. 20c), to close. Provision is made for twelve distinct classifications.

After depressing the proper axle key so as to close a pair of corresponding contacts 313 through 317 (Fig. 20b), and after depressing the proper classification key in unit 24, the toll collector then obtains a trip card 26 (see also Fig. 2) from a convenient card rack, for insertion into the card receiver of the entrance toll recorder. As mentioned hereinbefore, complete insertion of the trip card with proper regard to the position of corner cut 28 is necessary in order to render operative electric circuits which cause a toll recorder cycle. Referring to Fig. 20b, card-inserted contacts 127–N are closed when the trip card being inserted in the card receiver of the toll recorded strikes and moves card lever 121 (see also Fig. 9) to thereupon release arm 124 so that pin 123 engages the shifting strap of the contacts. Hence, the closing of card-inserted contacts 127–N indicates the presence of a trip card in the card receiver of the toll recorder.

It is to be recalled that when the trip card is fully inserted in the card receiver, the bottom edge of the card acts upon stem 129 (Fig. 14) to thereby close the card-fully-inserted contacts 132–N (see also Fig. 20b). The proper insertion of the trip card with regard to corner cut will cause the corner cut to align with stem 135. This, then, causes corner cut contacts 136–N to remain closed. As the description advances, it will be shown that contacts 132–N and 136–N must be closed in order to obtain an entrance station toll recorder cycle; the closing of these contacts indicates the full and proper insertion of the trip card into the card receiver of the toll recorder.

Depression of one of the axle keys and one of the classification keys, and full and proper insertion of the trip card into the card receiver of the toll recorder, will cause a toll recorder cycle. Improper insertion of the trip card into the card receiver, however, prevents a toll recorder cycle and necessitates removal of the trip card from the card receiver for subsequent proper insertion. As described with reference to Figs. 9, 11 and 12, removal of a trip card from the card receiver of a toll recorder requires disabling of the card braking mechanism. That is, it is required to move brake shoes 128 away from the trip card so that the latter is no longer in frictional engagement with the shoes. As described previously, the disabling of the card braking mechanism is caused by moving card release handle 139 upwardly. This causes member 342 which is joined to handle 139 to also move upwardly to thereupon transfer card release contacts 343. As is shown in Fig. 20b, the transfer of card release contacts 343–N energizes release card light 344 through contacts 127–N and contacts 343–N normally open (n/o). Thus, so long as a trip card is in the card receiver to close card inserted contacts 127–N, the disabling of the card braking mechanism by moving handle 139 upwardly is always accompanied by the energization of release card light 344.

Assuming full and proper insertion of the trip card into the card receiver and the depression of a two axle key corresponding to contacts 313 in order to energize relay R5, and the depression of a classification "1" key corresponding to contacts 318, release card interposer magnet 153–N will be energized through the following circuit:

*Release card interposer magnet 153–N.*—From line 306 through card inserted contacts 127–N, card release contacts 343–N normally closed (n/c), the card-fully-inserted contacts 132–N, corner cut contacts 136–N, classification "1" key contacts 318, relay contacts R5–1, release card interposer magnet 153–N, to line 307.

Referring to Fig. 9, energization of the release card interposer magnet causes release card interposer 154 to pivot in a counterclockwise direction. This causes the upper end of interposer 154 to engage a step in card release handle 139, and the lower end of the interposer to close a pair of release card interposer contacts 155 (see also contacts 155–N in Fig. 20b). As described previously, the foregoing action locks handle 139 in a downward position, thereby preventing the disabling of the card braking mechanism and assuring the non-removal of a trip card from the card receiver during a toll recorder cycle. Hence, it may be seen that full and proper insertion of a trip card in the toll recorder, and the depression of an axle key and a classification key causes the energization of interposer magnet 153–N which, in turn, prevents the disabling of the card braking mechanism until after a toll recorder cycle.

The cam contacts, for example cam contacts C1 in Fig. 20b, are operated upon by cams fixed to shaft 347 (Fig. 8). Shaft 347 is driven by gear 348 which is in mesh with gear 349. Gear 349, in turn, is fixed to shaft 156 which, it will be recalled, completes one revolution each toll recorder cycle. Hence, cam shaft 347 and the cams attached thereto are caused to complete one revolution every toll recorder cycle. Referring to the timing chart shown in Fig. 22, the cams are resting at 0° during the period dog 205 (Fig. 8) is disengaged from clutch ratchet 206.

Magnet 153–N is maintained energized during the major part of a toll recorder cycle when cam contacts C2 are closed (see also Fig. 22).

*Clutch interlock relay R19P.*—Just prior to energizing punch and print clutch 203–N (Fig. 20b), relay R19P is energized from line 306 through contacts 127–N, contacts 343–N (n/c), 132–N, 136–N, cam contacts C1, release card interposer contacts 155–N, relay contacts R3–2, clutch interlock relay R19P, to line 307.

Referring to Figs. 20a and 20b, it is to be observed that the energization of minute advance relay R3 will cause contacts R3–2 to open. It is to be recalled that relay R3 is energized just prior to a minute advance, i.e., just prior to the advancement of minute type wheel 94 (Fig. 7), when minute advance warning contacts 97–N are closed. Relay R3 (Fig. 20a) is maintained energized through minute advance motor contacts 67–N for the duration of the minute advance period.

As described previously until Time Control Mechanism, the engagement of drive clutch pawl 59 (Fig. 7) with ratchet 60 causes cam 62 to complete one revolution. As the cam follower end of bell crank 81 rides upon the periphery of cam 62, the bell crank is moved in a direction to close minute interlock contacts 82. The contour of cam 62 is such that contacts 82 are closed only after the minute type wheel 94 has been completely advanced but before contacts 67 are opened. Referring to Fig. 20b, it is apparent that clutch interlock relay R19 may be energized even though contacts R3–2 are open because of a minute advance. This is due to the closing of minute interlock contacts 82–N prior to the de-energization of relay R3 (Fig. 20a) which controls contacts R3–2 (Fig. 20b).

The energization of relay R19P causes contacts R19–1, connected in parallel circuit with contacts R3–2, to close so as to complete a relay R19P hold circuit to maintain the relay picked.

*Axle interposer punch magnets.*—The closing of a pair of axle key contacts 312 through 317 by depressing a key in unit 25 causes the energization of relays R4 through R9, respectively, as described previously. The energization of these relays closes contacts shown in Fig. 20c which control circuits to axle interposer punch magnets 351, 352, and 353. Since the axle key data entered upon the trip card are punched according to a binary code, a hole punched as a result of energizing magnet 351 will be indicative of a one axle vehicle, whereas a hole punched due to the energization of magnet 352 will be indicative of a two axle vehicle and a hole punched due to the energization of magnet 353 will be indicative of a four axle vehicle. Assuming that the three axle key in unit 25 is depressed so as to energize relay R6 (Fig. 20b) by the closing of contacts 314, magnets 351 and 352 (Fig. 20c) will be energized through the following circuits, respectively:

*Axle interposer punch magnet 351.*—From line 306 (Fig. 20b) through contacts 127–N, 343–N n/c, 132–N, 136–N, cam contacts C1, contacts 155–N, R3–2 or 82–N or R19–1, R10–1 n/c or R10–2, wire 354, contacts R6–3 (Fig. 20c), punch magnet 351 to line 307.

*Axle interposer punch magnet 352.*—The circuit just traced to contacts R6–3, through contacts R6–2, punch magnet 352 to line 307.

The energization of axle interposer punch magnets 351 and 352 causes associated interposers 195 (Fig. 9) to be moved upwardly, and positioned between corresponding punches 196 and the backing member 197 of punch carrier 198.

*Vehicle classification interposed punch magnet 355.*—As mentioned previously, the vehicle classification information is punched in the trip card during the entrance station toll recorder cycle. Depression of a classification key in unit 24 (Fig. 1) causes a corresponding interposer punch magnet to be energized. Assuming the vehicle classification to be determined by the toll collector as one, depression of the classification "1" key in unit 24 causes the energization of the punch magnet 355 (Fig. 20c) through the following circuit:

From line 306 (Fig. 20b) through contacts 127–N, 343–N n/c, 132–N, 136–N, cam contacts C1, contacts 155–N, R3–2 or 82–N or R19–1, R10–1 n/c or R10–2, wire 354, classification "1" key contacts 330 (Fig. 20c), interposer punch magnet 355 to line 307.

The energization of punch magnet 355 also causes the movement of an associated interposer 195 (Fig. 9) so as to set up the corresponding punch 196 for punching.

Figure 20C:
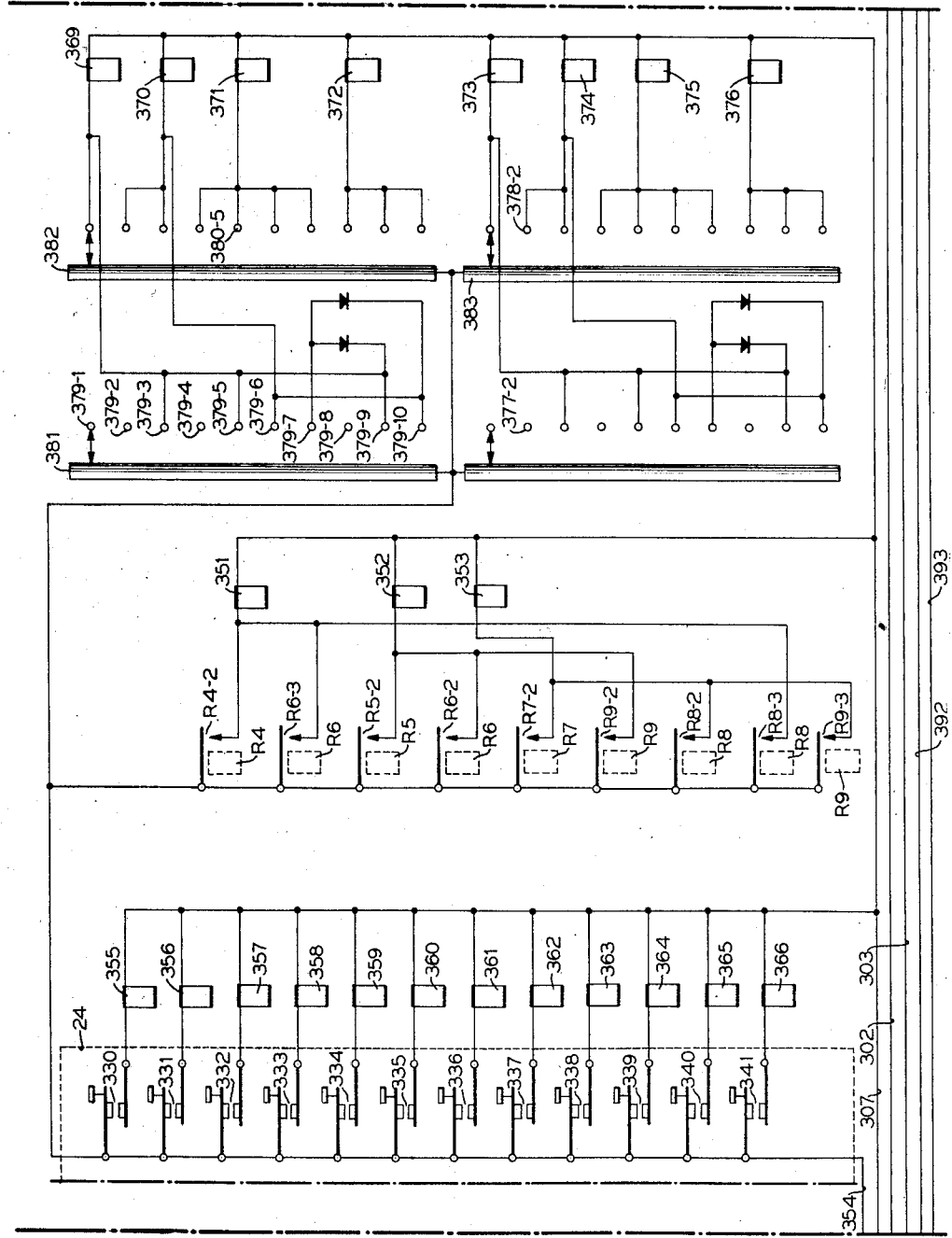

*Time control interposer punch magnets.*—As described previously under Time Control Mechanism, the gear ratio between gears 105 (Fig. 7) and 106 is such that transfer wheel 107 (see also Fig. 10) completes one revolution every half hour. This causes the brushes on rotor 117 to move from one conducting segment to the next each half hour. Similarly, the gear train for moving transfer gear 113 is so designed that the brushes carried by rotor 118 of time emitter 119 are moved from one conducting segment 159 to the next once every five hours. The circuit connection for time emitters 111 and 119 is shown in Fig. 20c. Time control interposer punch magnets 369 through 372 are associated with time emitter 111 whereas punch magnets 373 through 376 are associated with time emitter 119. The first group of punch magnets are energized either singly or in combination thereof to cause the units time control value digit to be punched in binary code in the trip card. The second group of magnets, magnets 373 through 376, are energized either singly or in combination thereof to cause the tens time control value digit to be punched in the trip card. Since the time control value is punched in the trip card according to a binary codal value, magnets 369 and 373 are each assigned the binary value one, magnets 370 and 374 are each assigned a binary value two, magnets 371 and 375 are each assigned a binary value four, and magnets 372 and 376 are each assigned a binary value eight.

Assuming the time control value at the entrance station to be twenty-five, the tens emitter brushes are resting on the conducting segments 377–2 and 378–2, and the units emitter brushes are resting on the segments 379–5 and 380–5. Hence, punch magnets 369, 371 and 374 are energized through the following circuits:

*Time control value interposer punch magnets 369.*—From line 306 (Fig. 20b) through contacts 127–N, 343–N n/c, 132–N, 136–N, cam contacts C1, contacts 155–N, R3–2 or 82–N, or R19–1, R10–1 n/c or R10–2, wire 354, common segment 381 (Fig. 20c), segment 379–5 via the brush connecting segments 381 and 379–5, punch magnet 369 to line 307.

*Time control value interposer punch magnet 371.*—The afore-described circuit for magnet 369 to segment 381, through segment 382, segment 380–5 via the brush connecting segments 382 and 380-5, punch magnet 371 to line 307.

*Interposer punch magnet 374.*—The afore-traced circuits for magnets 369 and 371 to segment 381, through segment 383, segment 378-2 via the brush connecting segments 383 and 378-2, punch magnet 374 to line 307.

The energization of these punch magnets causes interposers 195 (Fig. 9) to be moved upwardly to a position between backing member 197 and associated punches 196.

It is to be observed that the interposer punch magnets for punching the various data described, are energized simultaneously when voltage is applied to wire 354. Consequently, the punch magnet interposers associated with the energized punch magnets are moved upwardly between their associated punches 196 and the backing member 197 of punch carrier 198 simultaneously.

With reference to Fig. 9, it will be recalled that the upward movement of any one of interposers 195 causes punch interposer bail contacts 194 to close. Referring to Fig. 20b, the closing of contacts 194-N causes the energization of punch and print clutch magnet 203-N.

*Punch and print clutch magnet 203-N.*—From line 306 through contacts 127-N, 343-N n/c, 132-N, 136-N, cam contacts C1, contacts 155-N, R3-2 or 82-N or R19-1, punch interposer bail contacts 194-N, cam contacts C3, punch and print clutch magnet 203-N to the other side of the line.

Referring to Fig. 8, the energization of clutch magnet 203-N causes the engagement of entrance toll recorder dog 205 and rotating clutch ratchet 206. This causes punch shaft 156 to rotate, and the punch mechanism and print mechanism associated therewith to operate. Referring to Figs. 20b and 22, clutch magnet 203-N is de-energized during the toll recorder cycle at 10° when cam contacts C3 open. Cam contacts C1, however, remain closed until 180° in order to maintain the interposer punch magnets energized through the punching period of the toll recorder cycle. It is to be observed that cam contacts C1 and C3 each close again at 350°. A toll recorder cycle cannot repeat, however, because card inserted contacts 127-N are opened prior to 350° when pin 123 (see also Fig. 12) is caused to engage arm latch 147. Hence, since card inserted contacts 127-N will remain open until card lever 121 is permitted to move in a clockwise direction by the removal of the trip card in the card receiver, a subsequent toll recorder cycle cannot occur until after a trip card is removed from the card receiver and another trip card is reinserted therein.

*Tour of duty recorder axle count.*—Referring to Fig. 1, it will be recalled that prior to being stopped opposite booth 21, vehicle 20 passes over axle treadle 22. As is shown in Fig. 20d, axle treadle 21 includes two switches 388 and 389. These switches are appropriately termed forward and reverse switches, respectively. As the description advances, it will be shown that a count is not entered into the forward axle counter 289 (see also Fig. 19) controlled by magnet 390-N until the axle wheels associated with one axle have completely passed over both the forward switch 388 and the reverse switch 389 successively. Similarly, a count is not entered into the reverse axle counter 290 controlled by magnet 391-N until after the axle wheels associated with an axle have passed completely over reverse switch 389 and forward switch 388 successively. That is, the closing of either switch alone will not cause a count to be entered into either counter 289 or 290.

*Forward axle count.*—As the wheels associated with the front axle of vehicle 20 (Fig. 1) close switch 388 (Fig. 20d), a circuit is completed from line 302 through switch 388, relay R11 to line 303. The energization of relay R11 causes relay R12 to be energized from line 302 through contacts R11-1, R13-1 n/c, relay R12 to the other side of the line. Relay R12 is maintained energized through a hold circuit from line 302 through contacts R11-2, R12-2, R13-1 n/c, relay R12 to line 303.

As the wheels associated with the front axle pass over reverse switch 389 of treadle 21, relay R14 is energized from line 302 through switch 389, relay R14 to the other side of the line. It is to be noted that there is an interim period during which forward and reverse switches 388 and 389 are closed simultaneously; e.g., while the wheels are moving from switch 388 to switch 389. Thus, the hold circuit for relay R12 is maintained, even after relay R11 is de-energized when switch 388 is caused to open, through the circuit from line 302 through contacts R14-2, R12-2, R13-1 n/c, relay R12 to line 303. The de-energization of relay R11 and the continued energization of relay R12 completes a circuit to energize relay R15 from line 302 through contacts R14-3, R12-1 n/o, R11-3, relay R15 to line 303. A hold circuit for relay R15 is maintained from line 302 through forward contacts 387-N (see also Fig. 19), relay contacts R15-2, R11-3, relay R15 to line 303.

When the wheels associated with the first axle are moved in a forward direction so that reverse switch 389 is finally caused to open and switch 388 is permitted to remain open, relay R14 is de-energized. The resultant closing of contacts R14-4 causes the energization of forward axle counter magnet 390-N through a circuit from line 392 through relay contacts R11-4, R14-4, R15-1, counter magnet 390-N to line 393. The energization of counter magnet 390-N causes a mechanical linkage to open forward contacts 387-N to thereupon open the hold circuit to relay R15. The de-energization of relay R15, in turn, causes counter magnet 390-N to de-energize when relay contacts R15-1 open.

It is to observed that if the vehicle reverses its direction prior to causing reverse switch 389 to open, relay R11 is energized through forward switch 388 as aforedescribed. Thus, even after relay R14 is de-energized after once being energized, forward axle counter magnet 390-N may not be pulsed because relay contacts R11-4 are open. The re-energizing of relay R11 will cause relay R15 to drop out due to contacts R11-3 opening. Therefore, no count is entered and all relays drop to normal as the vehicle reverses its direction.

*Reverse axle count.*—When the wheels associated with an axle are moved completely over treadle 21, reverse switch 389 is closed first to thereupon energize relay R14 from line 302 through switch 389, relay R14 to line 303. The energization of relay R14 causes relay R13 to be energized through the circuit from line 302, relay contacts R14-3, R12-1 n/c, relay R13 to the other side of the line . Relay R13 is maintained energized through a hold circuit from line 302 through contacts R14-2, R13-3, R12-1 n/c, relay R13 to line 303. As the wheels proceed in a reverse direction, forward switch 388 is closed to energize relay R11 by a circuit from line 302 through switch 388, relay R11 to line 303. Thus, when relay R14 is de-energized after reverse switch 389 is opened, relay contacts R14-1 close to complete a circuit from line 302 through contacts R11-1, R13-1 n/o, R14-1, relay R16 to line 303. Relay R16 is maintained energized through a hold circuit from line 302, reverse contacts 394-N, relay contacts R16-1, R14-1, relay R16 to line 303. When forward switch 388 is finally opened to de-energize relay R11, reverse axle counter magnet 391-N is energized from line 392 through relay contacts R11-4, R14-4, R16-2, magnet 391-N to line 393. The energization of this counter magnet causes a mechanical linkage to open reverse contacts 394-N to thereupon de-energize relay R16. The de-energization of relay R16, in turn, causes contacts R16-2 to open the circuit to counter magnet 391-N.

If the vehicle reverses its direction once again to a forward one so that reverse switch 389 is closed before forward switch 388 is opened (remembering that both switches may be closed simultaneously), the energization of relay R14 when switch 389 closes will cause relay contacts R14-4 to open. This, of course, will prevent a circuit to counter magnet 391–N, and the re-energization of relay R14 will drop out relay R16 due to contacts R14–1 opening.

It is to be observed that forward axle counter magnet 390 will be energized once only if forward treadle switch 388 is closed first, reverse treadle switch 389 is closed before switch 388 is opened, and switch 389 is opened after switch 388 is opened. Similarly, reverse axle counter magnet 391–N is energized once only if switch 389 is closed first, switch 388 is closed before switch 389 is opened, and switch 388 is opened only after switch 389 is opened.

Figure 20E:
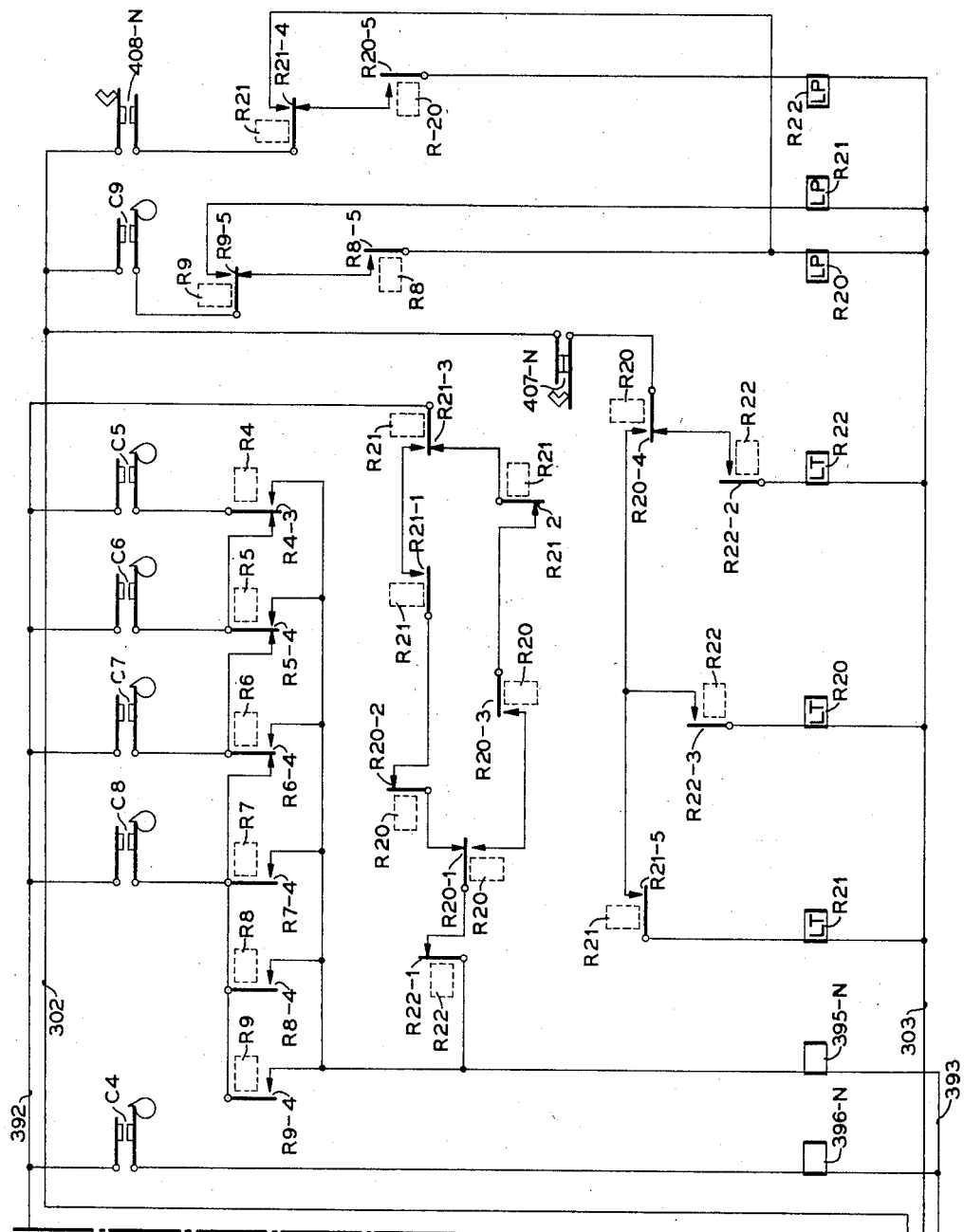

*Tour of duty axle counter.*—Referring to Fig. 20e, tour of duty axle counter magnet 395–N is impulsed so that the count contained therein corresponds to the number of vehicle axles passing over the treadle. As will be described shortly, the number of impulses directed to magnet 395–N is under the control of axle keys in unit 25 (Fig. 1). Thus, it is apparent that the count in the forward axle counter 289 (see also Fig. 19) under control of magnet 390–N (see also Fig. 20d) minus the count in the reverse axle counter 290 (Fig. 19) under control of magnet 391–N (Fig. 20d) will equal the vehicle axle count set up by magnet 395–N (Fig. 20e). A discrepancy will indicate improper selection of axle keys by the toll collector.

Referring to Figs. 20b and 20e, the depression of a three axle key in unit 25 will cause contacts 314 to close to energize relay R6. The energization of relay R6 causes contacts R6–4 (Fig. 20e) to close so that during the toll recorder cycle cam contacts C5, C6 and C7 direct three pulses (see also Fig. 22) to counter magnet 395–N via contacts R4–3 n/c, R5–4 n/c and R6–4 n/o.

If the axle key contacts corresponding to one to four axles, inclusive, are closed, a corresponding number of pulses is directed to counter magnet 395–N during the toll recorder cycle by cam contacts C5, C6, C7 and C8. If, however, the five axle or six axle key is depressed, relay R20LP or R21LP, respectively, is energized in order to direct the fifth and sixth pulses to counter magnet 395–N. This is done in order to afford longer timed pulses which, in turn, allow for a greater safety factor in counter operation.

Thus, if the five axle key is depressed so as to close contacts 316 (Fig. 20b), relay R8 is energized and contacts R8–4 (Fig. 20e) and R8–5 are closed. Thus, during the entrance station toll recorder cycle, cam contacts C5, C6, C7 and C8 close to direct four distinct pulses through contacts R8–4 to counter magnet 395–N. In addition, relay R20LP is energized from line 302 through cam contacts C9, relay contacts R9–5 n/c, R8–5, relay R20LP to line 303. Since relay R20LP is a latch type relay, energization of the latch pick relay coil designated as LP will maintain the relay picked and the relay contacts associated therewith transferred until relay coil R20LT is energized. Consequently, after 320° of the toll recorder cycle when relay R20LP is energized through cam contacts C9, axle counter magnet 395–N is energized from line 392 through relay contacts R21–3 n/c, R21–2, R20–3, R20–1 n/o, R22–1, magnet 395–N to line 393. This pulse causes the fifth count to be entered in axle counter 345 (see also Fig. 19).

The energization of magnet 395–N causes a mechanical linkage to open contacts 407–N and to close contacts 408–N, concurrently. This completes a circuit to relay R22LP from line 302 through contacts 408–N, contacts R21–4 n/c, R20–5, coil R22LP to line 303. The energization of relay R22LP opens the circuit to counter magnet 395–N when contacts R22–1 separate and causes the following circuits to be completed to latch trip relays R20LT and R22LT, respectively, after magnet 395–N is de-energized:

*Relay R20LT.*—From line 302 through contacts 407–N, R20–4 n/o, R22–3, relay R20LT to line 303.

*Relay R22LT.*—From line 302 through contacts 407–N, R20–4 n/c, R22–2, relay R22LT to line 303.

Hence, energization of both latch trip relays R20LT and R22LT ends the possibility of completing any more count circuits to magnet 395–N.

If, however, the six axle key is depressed, relay circuits are set up so that two pulses in addition to the four directed through cam contacts C5 through C8 are directed to magnet 395–N. The depression of a six axle key causes contacts 317 (Fig. 20b) to close so as to enerogize relay R9. As a result, relay contacts R9–4 (Fig. 20e) and R9–5 are shifted. During the toll recorder cycle, cam contacts C5 through C8 close to direct four distinct pulses through relay contacts R9–4 to counter magnet 395–N. In addition, during the toll recorder cycle, cam contacts C9 close at 320° to complete a circuit to energize relay R21LP from line 302 through cam contacts C9, relay contacts R9–5 n/o, relay R21LP to line 303. This causes the contacts associated with relay R21 to shift so that counter magnet 395–N is energized via the following circuit:

Line 392 through contacts R21–3 n/o, R21–1, R20–2, R20–1 n/c, R22–1, magnet 395–N to line 393.

As before, energization of magnet 395–N causes contacts 407–N to open and 408–N to close concurrently (see also Fig. 19). This, in turn, causes relay R20LP to be energized from line 302 through contacts 408–N, R21–4 n/o, relay R20LP to line 303. The energization of relay R20LP opens the circuit to magnet 395–N when contacts R20–1 transfer, and causes the energization of relay R21LT from line 302 through contacts 407–N, R20–4 n/o, R21–5, R21LT to line 303. The energization of relay R20LP directs another pulse to magnet 395–N via the following circuit:

Line 392 through contacts R21–3 n/c, R21–2, R20–3, R20–1 n/o, R22–1, magnet 395–N to line 393.

Once again contacts 408–N are closed and 407–N are opened by the mechanical linkage associated with the axle counter. Relay R22LP is energized from line 302 through contacts 408–N, R21–4 n/c, R20–5, relay R22LP to line 303. The energization of this relay, in turn, opens the circuit to magnet 395–N when contacts R22–1 open, and causes the energization of relay R20LT through a circuit from line 302, contacts 407–N, R20–4 n/o, R22–3, relay R20LT to line 303. The energization of relay R20LT completes a circuit to relay R22LT from line 302 through contacts 407–N, R20–4 n/c, R22–2, relay R22LT to line 303.

Cam contacts C4 close for 25° every toll recorder cycle in order to energize counter magnet 396–N once each cycle. As described previously under Tour of Duty Recorder Mechanism, the energization of magnet 396–N (see also Fig. 19) operates a linkage which advances mechanical pulse counter 346 once each toll recorder cycle. In other words the count of toll recorder cycles are accumulated in this counter operated by magnet 396–N.

*Tour of duty recorder circuit operation.*—As described hereinbefore under General System Description, tour of duty summary information is recorded on the summary check sheet 38 (Fig. 5) at the start of a tour of duty when the collector key 40 (Fig. 9) is inserted in the toll recorder, and at the end of a tour of duty when the collector key is removed from the toll recorder.

Referring to Fig. 20a, the insertion of key 40 (see also Fig. 9) into the toll recorder causes collector key contacts 261–N to close. The closing of contacts 261–N applies power across transformer 308 which, in turn, causes power to be applied to lines 306 and 307. Consequently, relay R1 is energized, and is maintained energized, whenever power is applied to the toll recorder lines 306 and 307.

The transfer of contacts R1–2 (Fig. 20d) completes a circuit to control magnet 397–N from line 392 through contacts R1–2 n/o, R18–1 n/c, magnet 397–N to line 393. As described previously under Tour of Duty Recorder Mechanism, energization of magnet 397–N causes tape print contacts 398–N and 399–N to close concurrently so as to energize their respective relays R18 and R17 under the control of relay contacts R1–2. Hence, with contacts R1–2 transferred, relay R18 is energized from line 392 through contacts R1–2 n/o, tape print contacts 398–N, relay R18 to line 393. The energization of relay R18 causes contacts R18–1 to transfer whereupon relay R18 is maintained energized through a hold circuit from line 392 through contacts R1–2 n/o, R18–1 n/o, relay R18 to the other side of the line.

As described hereinbefore, energization of magnet 397–N causes a print cycle to take place in the tour of duty recorder (see also Fig. 4), the record sheet 38 to be advanced one printing line, and the ribbon to also be spaced.

Removal of key 40 (Fig. 9) from the entrance station toll recorder at the end of a tour of duty causes collector key contacts 261–N (see also Fig. 20a) to open. This, in turn, causes the de-energization of relay R1. Hence, with reference to Fig. 20d, a circuit is completed to magnet 397–N from line 392 through contacts R1–2 n/c, R17–1 n/c, magnet 397–N to line 393. As before, the energization of magnet 397–N causes tape print contacts 398–N and 399–N to close. Relay R17 is energized from line 392 through contacts R1–2 n/c, contacts 399–N, relay R17 to the other side of the line. Relay R17 is maintained energized through a hold circuit from line 392, contacts R1–2 n/c, R17–1 n/o, relay R17 to line 393. The de-energization of relay R1 causes the de-energization of relay R18 when the normally open points of contacts R1–2 separate.

When the next toll collector starts his tour of duty and inserts his key into the toll recorder, key contacts 261–N (Fig. 20a) will once again be closed, and relay R1 will once again become energized. The energization of relay R1 will cause the normally open points of contacts R1–2 (Fig. 20d) to meet to thereupon complete a circuit to magnet 397–N from line 392 through contacts R1–2 n/o, R18–1 n/c, magnet 397–N to line 393. As before, relay R18 will be energized when contacts 398–N close, and relay R18 will be maintained energized through relay contacts R18–1 n/o. Relay R17 is de-energized when the normally closed points of contacts R1–2 separate.

A push button switch 405 is available to energize magnet 397–N whenever the switch is closed. Since the switch 405 and magnet 397–N are in the tour of duty recorder which is in a locked cabinet remotely positioned from the toll recorder, only an inspector, or toll collector supervisor, expected to inspect the summary totals printed on the check sheet 38 will have access to switch 405.

*Tour of duty card circuit description.*—In addition to inserting a toll collector key into the toll recorder at the start of a tour of duty, the toll collector is required to insert a tour of duty record card 39 (Fig. 5) into the card receiver of the toll recorder. A tour of duty card toll recorder cycle takes place upon full insertion of the tour of duty card into the card receiver with proper regard to the position of corner cut, and the depression of a tour of duty key in unit 42 (Fig. 1). Depression of a tour of duty key causes contacts 406 (Fig. 20b) to close. As a result relay R10 is energized from line 306 through contacts 406, relay R10 to line 307. The energization of relay R10 transfers relay contacts R10–1 and R10–2 to thereupon prevent the application of a voltage on wire 354. Since wire 354 is in a circuit to the vehicle classification interposer punch magnets, axle key interposer punch magnets, and time control interposer punch magnets, none of these items of information can be punched in a tour of duty card.

The insertion of a tour of duty card into the card receiver causes card inserted contacts 127–N to close in the manner described hereinbefore. Similarly, the full insertion of the card into the card receiver causes card fully inserted contacts 132–N to close, and proper regard to the corner cut thereon causes corner cut contacts 136–N to remain closed. Thus, with the full and proper insertion of the tour of duty card into the card receiver, and the energization of relay R10, the release card interposer magnet 153–N is energized through the following circuit:

*Release card interposer magnet 153–N.*—From line 306 through contacts 127–N, 343–N n/c, 132–N, 136–N, relay contacts R10–4, release card interposer magnet 153–N to line 307.

The energization of magnet 153–N causes release card interposer contacts 155–N (see also Fig. 9) to close so that relay R19 and magnet 203–N are energized concurrently through the following circuit:

*Relay R19P.*—From line 306 through contacts 127–N, 343–N n/c, 132–N, 136–N, cam contacts C1, contacts 155–N, R3–2 or 82–N, relay R19P to line 307.

*Punch and print clutch magnet 203–N.*—A circuit similar to the one just traced to relay R19, through relay contacts R10–1 n/o, cam contacts C3, clutch magnet 203–N to line 307.

Relay R19 is maintained picked by a relay R19H hold circuit from line 306 through contacts 127–N, 343–N n/c, 132–N, 136–N, R10–3, R19–2, relay R19H to line 307.

Energization of magnet 203–N (see also Fig. 8) causes one complete revolution of shaft 156 to thereby effect a tour of duty card toll recorder cycle. As is shown in Fig. 5, and as was enumerated hereinbefore, only a limited amount of information is recorded on the tour of duty card.

The tour of duty card is marked at the start of a tour of duty so that information is recorded on one side of the card, and is marked at the end of a tour of duty so that similar information is recorded on the other side of the card. Thus, the tour of duty card is in effect a daily work record for a particular toll collector.

*Exit station apparatus.*—The circuit for the entrance station apparatus has been described with reference generally to Figs. 20a to 20e, inclusive. The circuit description for the exit station apparatus shown in Fig. 1 will now be given. It will be recalled that any electrical apparatus described hereinbefore in connection with a mechanism will be identified in the exit station diagram by the suffix letter "X."

Figure 21A:
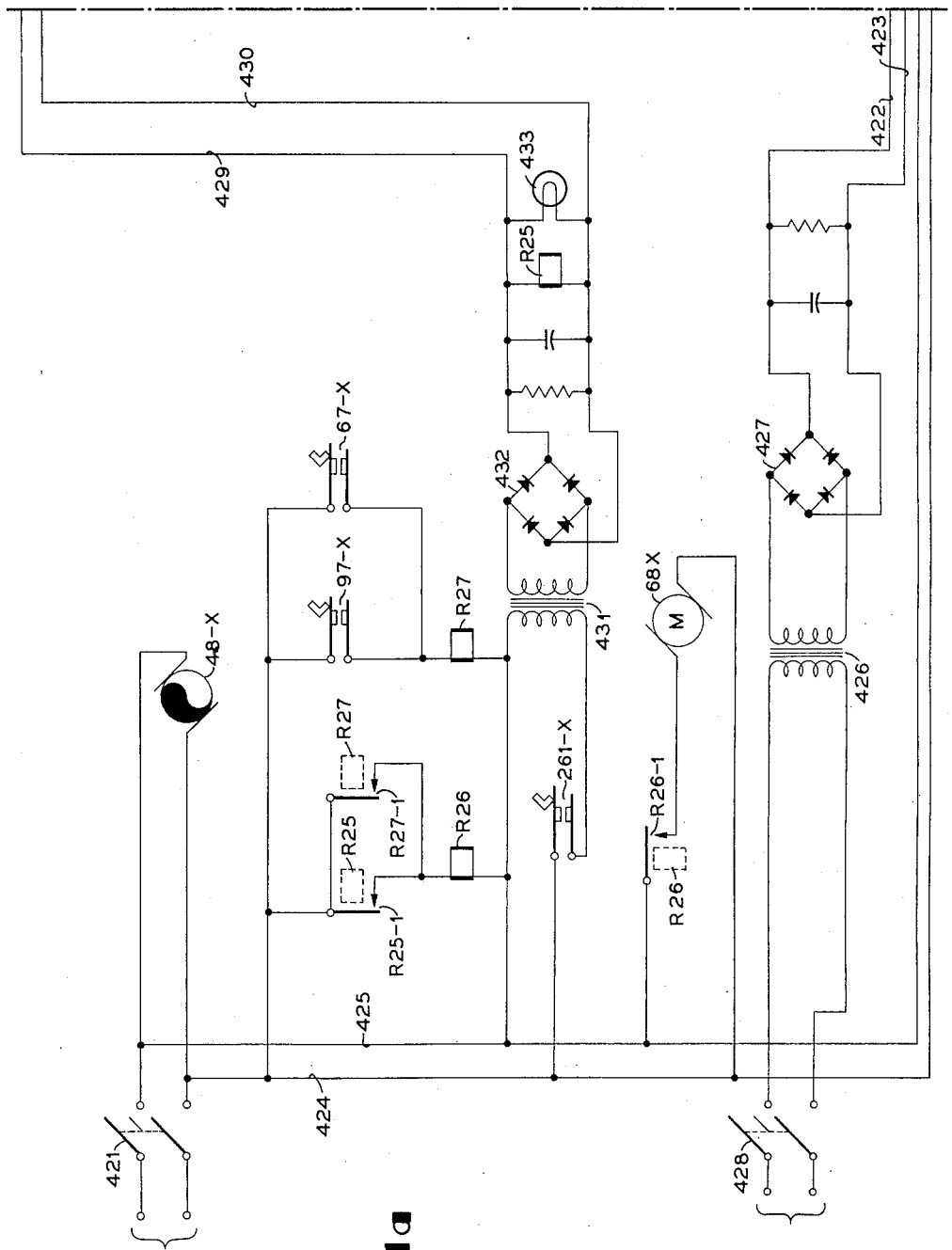
Figure 21C:
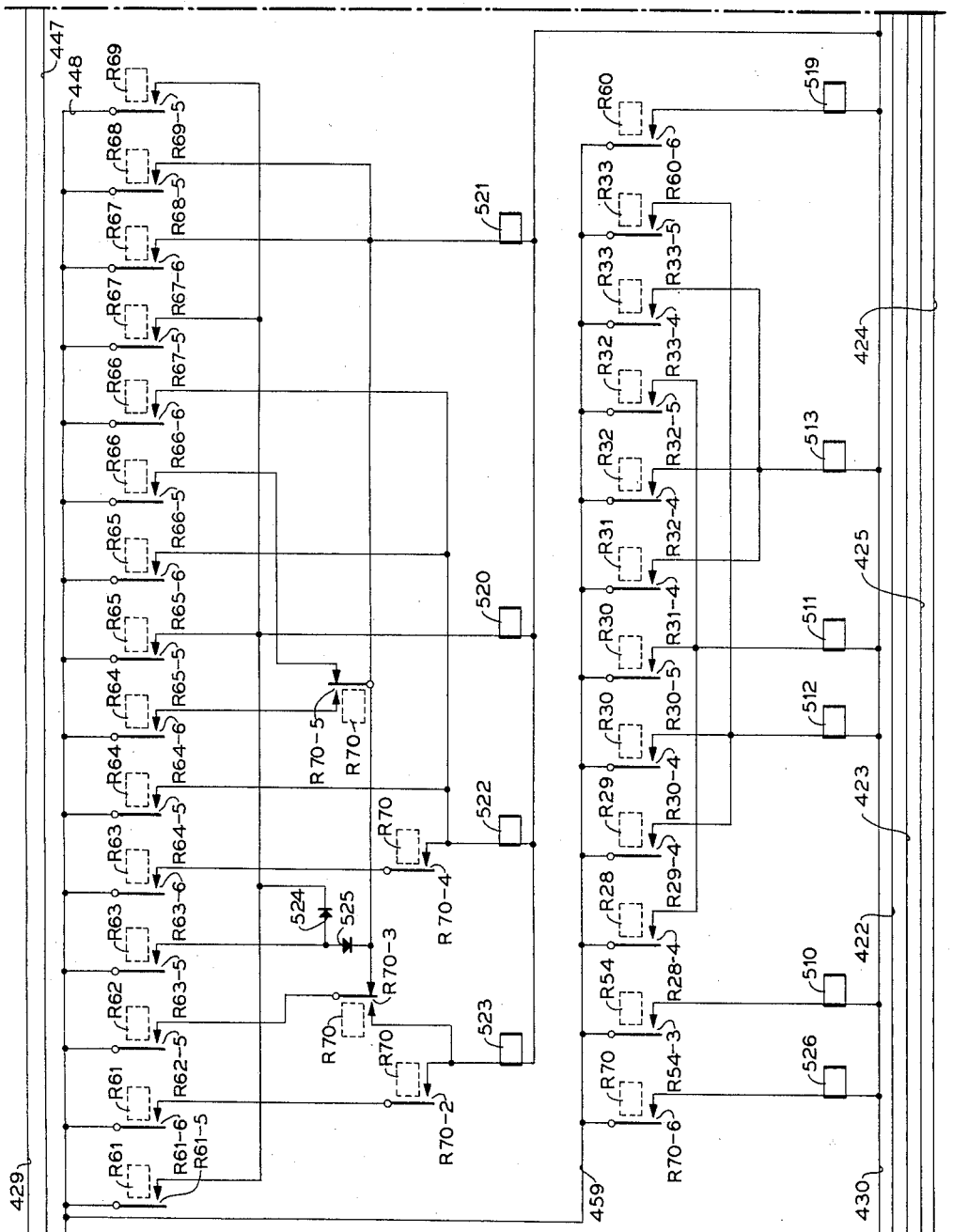

Referring to Fig. 21a power is applied to synchronous motor 48–X when main switch 421 is closed, to drive the time control mechanism described previously. Similarly, direct current power is applied to lines 422 and 423 after the switch 428 is closed to apply voltage to transformer 426 and bridge rectifier 427. As the description advances, it will be shown that the power applied to lines 422 and 423 is directed to only the exit station tour of duty recorder 37 (Fig. 1).

As is described hereinbefore with reference to Fig. 9, the insertion of a toll collector key into the toll recorder causes a pair of key contacts 261 to close. To assure the insertion of a toll collector key into the toll recorder, power is not applied to the toll recorder until the key is so inserted. Power is applied to toll recorder lines 429 (Fig. 21a) and 430 when the key contacts 261–X are closed to apply a voltage across transformer 431. The direct current power applied to lines 429 and 430 is obtained after the power is rectified by bridge rectifier 432. It is to be observed that since power light 433 is connected to lines 429 and 430, the light is energized as soon as the toll collector key is inserted in the exit station toll recorder to close key contacts 261–X. Power relay R25 is connected in parallel circuit with light 433. Consequently, the closing of the key contacts causes the energization of relay R25, which, in turn, causes the energization of relay R26 when contacts R25–1 close. The energization of relay R26 closes contacts R26–1 to thereupon apply power to exit toll recorder minute advance motor 68–X. It is to be observed that motor 68–X is operative so long as the toll collector key is inserted in the toll recorder so as to maintain the key contacts 261–X closed. It is necessary, however, that the time control mechanism described previously be permitted to operate continuously even though this key is not inserted in the exit station toll recorder. Minute advance relay R27 is energized when minute advance warning contacts 97–X close, and is maintained energized during the time minute advance motor contacts 67–X are closed. Hence, even though power is not applied to the toll recorder lines 429 and 430 because the key is not inserted in the toll recorder, relay R26 is energized and its contacts R26–1 are closed in order to energize motor 68–X when relay contacts R27–1 are closed upon the energization of relay R27.

With reference to Fig. 1, it is to be recalled that vehicle 20 is stopped opposite exit station stop booth 30 for examination by the exit station toll collector whereby a determination is made as to the number of axles on the vehicle. After having made a vehicle axle determination, the toll collector depresses an axle key in a unit 32, a key which corresponds to the number of vehicle axles. Referring to Fig. 21e, axle key unit 32 includes six axle keys which operate upon contacts 437 through 442 to control their respective relays R28 through R33. Key contacts 437, for example, are closed for a single axle vehicle whereas key contacts 442 are closed for a six axle vehicle. Accordingly, the energization of relay R28 is indicative of a single axle vehicle, and the energization of relay R33 is indicative of a six axle vehicle.

After depressing the proper axle key in unit 32, the exit station toll collector obtains a partially processed trip card 26 from the vehicle operator for insertion into the card receiver of the exit toll recorder. The trip card which was partially processed at the entrance station is carried by the vehicle operator for delivery to the exit station toll collector so that the processing of the trip card may be completed. As mentioned hereinbefore, complete insertion of the trip card with proper regard to the position of the corner cut 28 is necessary in order to render operative electric circuits which cause the card sensing mechanism to analyze the trip card. Referring to Fig. 21b, card inserted contacts 127–X are closed when the trip card is inserted in the card receiver of the exit station toll recorder. This causes the energization of relay R34 through a circuit from line 429 through release card handle contacts 343–X n/c, card inserted contacts 127–X, relay R34 to line 430.

As in the entrance station toll recorder, when the trip card is fully inserted in the card receiver of the exit station toll recorder, the card fully inserted contacts 132–X (Fig. 21e) are closed. In addition, the proper insertion of the trip card with regard to corner cut will cause the corner cut contacts 136–X to remain closed. Thus, the full and proper insertion of the trip card in the card receiver of the exit toll recorder causes the card sensing solenoid (see also Fig. 15) 165 to be energized.

*Card sensing solenoid 165.*—From line 429 (Fig. 21e) through cam contacts C11, card fully inserted contacts 132–X, corner cut contacts 136–X, relay contacts R34–1, solenoid 165 to line 430.

As mentioned hereinbefore with reference to Fig. 15, the energization of solenoid 165 causes sensing pins 190 to move towards the trip card positioned in the card receiver 120 to engage the card. The presence of a hole in the trip card causes a corresponding sensing pin 190 to move a sufficient amount to permit the associated pair of sensing contacts 181 to shift.

The card sensing mechanism in the exit station toll recorder analyzes the trip card for the following items of information:

(1) The entrance station, or interchange, number punched in row 2 at columns F through L (see Fig. 2) in the trip card.

(2) The number of vehicle axles caused to be punched in row 3 at columns B through D in the trip card at the entrance station.

(3) The time of trip control value punched in row 3 at columns E through L in the trip card at the entrance station.

(4) A trip card cancelation marking in row 3 at column A which, if present, will prevent the reuse of a trip card.

Referring to Fig. 2, the entrance station identification number is punched in trip card 26 at the entrance station in row 2 at columns F through L. Columns F, G and H represent the tens digit position of the station number whereas columns I through L represent the units digit position of the station number. Referring also to Figs. 21h and 21i, sensing contacts 452 through 458 are controlled by sensing pins corresponding with the entrance station number at index points in row 2 at columns F through L, respectively. The transfer of contacts 452, 453 and 455 through 458 due to a corresponding hole in the trip card causes the energization of associated relays R35 through R40.

As is shown in Fig. 21e, one of the pairs of contacts of relays R37 through R40 corresponding to the units position of the entrance station interchange number, must be closed in order to complete a circuit to relay R44P. Accordingly, at least one of the relays R37 through R40 must be energized. As to be described, relay R44P must be energized prior to having an exit station toll recorder cycle. Hence, card sensing mechanism at the exit station toll recorder must sense an entrance station number. The absence of such data in the trip card will prevent an exit station toll recorder cycle.

*Relay R44P circuit.*—From line 429 (Fig. 21b) through card release contacts 343–X n/c, line 447, cam contacts C23 (Fig. 21e), relay contacts R37–1 or R38–1 or R39–1 or R40–1, relay R44P to line 430.

Relay R44P is maintained energized so long as any one of the relays R37 through R40 is also energized to keep a pair of related contacts R37–1 through R40–1 closed.

*Exit cancelation.*—Concurrently with the sensing of the trip card for an entrance station number, the trip card is checked for a cancelation marking which is entered upon the trip card only at an exit station during a toll recorder cycle. This check is to prevent the reuse of a previously processed trip card. Referring to Fig. 2, a completely processed trip card has a cancelation hole punched in row 3 at column A. The presence of a cancelation hole in the trip card will cause exit cancelation contacts 465 during card sensing time (Fig. 21b) to transfer and to thereby prevent an exit station toll recorder cycle. The circuit to accomplish this will be explained more fully hereinafter. In addition to preventing a recorder cycle, the transfer of contacts 465 causes a circuit to be closed to release card light 466 from line 429 through contacts 343–X n/c, card sensing bail contacts 184 (see also Fig. 15), contacts 465 n/o, R45–1, light 466 to line 430.

It is to be observed that a circuit may also be completed to light 466 through contacts 343–X n/o. It will be recalled, however, that contacts 343–X are transferred only when card release handle 139 (see also Fig. 9) is moved upwardly in order to disable the card braking mechanism. Thus, when the toll collector at the exit station observes an energized release card light 466, it signifies that the reuse of a trip card is being attempted or that the card release handle 139 is in an upward position.

*Time of trip control value.*—The time of trip control value (see Fig. 2) punched in row 3 at columns E through L is sensed along with the entrance station number and the exit cancelation marking. The units digit position of the time of trip control value is punched in columns I though L whereas the tens digit position of this value is punched in columns E through H. Referring also to Fig. 21h, time of trip control value sensing contacts 467 through 474 correspond to the index positions in row 3 at columns E through L, respectively. The presence of a hole at any of these index positions causes a corresponding pair of sensing contacts to close. These contacts, in turn, cause the energization of a respective relay R46 through R53.

Assuming an entrance station time of trip control value of twenty-five, the trip card is punched at index positions G, J and L in row 3. Corresponding relays R48, R51 and R53, respectively, are each energized from line 429 (Fig. 21b) through contacts 343–X n/c, line 447, cam contacts C23 (Fig. 21e), line 449, parallel circuit sensing contacts 469 (Fig. 21h) and 472 and 474, associated relays R48 and R51 and R53 to line 430.

*Keyed vehicle axles.*—Referring to Fig. 2 once again, the number of vehicle axles punched in the trip card at the entrance station under control of the keys in unit 25 (see also Fig. 1), is perforated at the index positions in row 3 at columns B through D. These index positions correspond to sensing contacts 460 through 462 (Fig. 21i), respectively. Thus, for example, holes punched in columns C and D represent, in binary code, a three axle vehicle and will cause sensing contacts 461 and 462 to close to thereupon energize relays R42 and R43, respectively. As is shown, the axle sensing relays R41 through R43 are connected in parallel circuit with the entrance station interchange number sensing relays R35 through R40. Since the circuit for energizing the relays R35 through R40 is described hereinbefore, it is not necessary to describe the circuit for energizing relays R41 through R43.

*Kiting.*—A common fraudulent act which was referred to hereinbefore but briefly, is kiting. This act will now be explained in detail, and the apparatus to detect this act will be described in detail.

Referring to Fig. 6, kiting is an act in which a vehicle operator traveling in a westerly direction from Binghamton to Jamestown, for example, withholds from the Jamestown exit station toll collector the trip card which was issued to him at the entrance station in Binghamton. On a return trip in an easterly direction, e.g., Jamestown to Binghamton, the vehicle operator leaves the toll highway at Endicott and withholds from the toll collector at the exit station in Endicott the trip card issued at the entrance station in Jamestown. Instead, the vehicle operator presents to the toll collector at this exit station the trip card issued previously at Binghamton. Hence, without apparatus to detect this fraudulent act, the presentation at the Endicott exit station of the trip card procured at the Binghamton entrance station, simply indicates to the toll collector at the Endicott exit station that the vehicle has been moved only the comparatively short distance between Binghamton and Endicott. The fact of the matter is, however, that the vehicle has been moved from Binghamton to Jamestown to Endicott. Similarly, during a subsequent westerly trip in the general direction Binghamton to Jamestown the vehicle operator will leave the toll highway at Kennedy. He will present to the toll collector at the Kennedy exit station the trip card received at the entrance station at Jamestown during the previous easterly trip. Thus, once again it will appear that the vehicle has been moved a relatively short distance between Jamestown and Kennedy. It may be seen that a single withheld trip card enables a vehicle operator to commit any number of successive acts of this type; acts known as kiting.

Kiting is prevented in the instant toll highway recorder system by providing a time limit within which a vehicle must be moved from an entrance station to one or more designated exit stations within a zone checking area. For example, a vehicle entering the toll highway at Binghamton must leave the highway at Endicott within a predetermined time limit. Similarly, a vehicle entering the toll highway at Jamestown must leave the highway at Kennedy within a time limit. This is due to the fact that Binghamton and Endicott, and Jamestown and Kennedy are each within a zone checking area 400 and 401, respectively. Although it is possible to provide a time limit within which a vehicle must be moved from any entrance station to any other exit station outside of the zone checking area, for example, Binghamton to Rochester, this is generally not done. This is for the reason that generally it would not be profitable for a vehicle operator to leave the toll highway twenty or thirty miles ahead of the true point of highway departure, and the zone checking areas to detect kiting usually do not extend beyond a radius of thirty miles.

Two conditions must be met by the instant apparatus to detect kiting. First, the exit station must be located within the same zone checking area as the entrance station at which the trip card is partially processed. Secondly, the vehicle operator must take more time than the allotted predetermined time limit to move from the entrance station to the exit station. If the exit station is outside of the zone checking area determined by the location of the entrance station, or if the time taken to move the vehicle from the entrance station to the exit station is less than the predetermined time limit, the exit station toll recorder will not indicate kiting. That is, to detect kiting it is necessary that the vehicle be moved within a zone checking area for a period of time exceeding the predetermined time limit.

Assume that a vehicle operator enters the toll highway at Binghamton for travel to Jamestown. At the Binghamton entrance station toll recorder, a trip card is partially processed. The entrance station number is punched at the index points in row 2 at columns F through L to indicate the Binghamton station number 30. This trip card is withheld by the vehicle operator from the Jamestown toll collector, and is subsequently presented to the Endicott exit station toll collector after the vehicle is moved from Jamestown in an easterly direction.

A pluggable control panel at the Endicott exit station is wired to include station numbers 28, 30, 32 and 35 within the Endicott zone checking area 401. Thus, any trip cards partially processed in the entrance toll recorders at the stations at Kirkwood, Binghamton or Owego, must leave the highway at Endicott within a predetermined time limit. Referring to Fig. 21h, relay R54P is energized only if the entrance station number punched in the trip card at the entrance station is outside of the zone area. For the example shown in Fig. 6, the Endicott exit station toll recorder must be plug wired to check station numbers 28, 30, 32 and 35. To simplify wiring of the pluggable control panel, the Endicott recorder is wired to check station numbers 28 to 35, inclusive. This is shown in Fig. 21h. Plug hubs 476–0 through 476–7 correspond to the tens digit position of the entrance station number, and plug hubs 477–0 through 477–9 represent the units digit position of the entrance station number. It is to be observed that provision is made for only seventy-nine entrance station numbers; this is not a limitation but simply an arbitrary number. In order to avoid cross circuits, the control panel is always plug wired to check one to ten stations; e.g., station numbers 28 through 37. The plug hubs 476–0, 476–4, 476–6, 476–1, 476–5, and 476–7 are connected by a common wire to plug hub 478 because the tens digit position of the entrance station numbers within the zone area being checked includes only a two or a three. That is, a zero, one, or four through seven digit, in the tens position of the entrance station number will cause circuits to be formed whereby an impulse is directed to plug hub 478 and to relay R54P. This wiring is correct because relay R54P is energized only if the entrance station number punched in the trip card is outside of the zone checking area. Of course, any station number having a tens digit other than a two or a three must be outside of the Endicott zone checking area for the example given. Since station numbers 28 through 37 are being checked, provision is made to permit signals representing station numbers 20 through 27, and 38 and 39 to energize relay R54P. For this reason plug hub 476–2 is connected to hub 479, and hub 476–3 is connected to 480. Diodes 481 and 482 are each connected, at one end, to hubs 479 and 480, respectively, and, at the other end, to hubs 483 and 484, respectively. Hub 484 in turn is connected to hubs 477–9 and 477–8, whereas hub 483 is connected to hubs 477–7, 477–3, 477–5, 477–1, 477–6, 477–4, 477–0 and 477–2. In summation, any entrance station number having a tens digit of zero, one or four through seven, will cause a pulse to be directed to relay R54P via hub 478; an entrance station number 20 through 27 will cause an impulse to be directed to relay R54P via diode 481; and an entrance station number 38 or 39 will cause an impulse to be directed to relay R54P via diode 482.

As stated previously, a vehicle enters the toll highway at Binghamton station, number 30 (see Fig. 6), for travel to Jamestown. The vehicle operator withholds the trip card received at the Binghamton entrance station from the Jamestown exit station toll collector. Subsequently, after travel in an easterly direction from Jamestown towards Binghamton, the vehicle operator leaves the toll highway at Endicott exit station, number 32. Operation of the card sensing mechanism in the Endicott exit station toll recorder will cause sensing contacts 453 (Fig. 21i), 457 and 455 to close, and sensing contacts 454 (Fig. 21h) to transfer, these sensing contacts indicating the Binghamton station number 30. Accordingly, relays R35 (Fig. 21i), R38 and R40 are energized via circuits previously traced. Consequently, an impulse is directed from line 429 (Fig. 21b) through contacts 343–X n/c, line 447, cam contacts C23 (Fig. 21e), line 449, contacts 454 n/o (Fig. 21h), R35–3 n/o, R36–3 n/c, plug hubs 476–3 and 480, diode 482, and hub 484 to hubs 477–9 or 477–8. The transfer of contacts R38–4 prevents a circuit being completed from hub 477–9, and the transfer of contacts R38–2 prevents a circuit being completed from hub 477–8. Hence, relay R54P is not energized. The failure to energize this relay indicates that the Binghamton entrance station number punched in the trip card is within the zone checking area 401 of the Endicott exit station at which the trip card is being processed.

It is to be recalled that the moving of a vehicle within the zone checking area must be done within a predetermined time limit. If the moving of a vehicle within the zone checking area requires a time period in excess of the predetermined time limit, the toll recorder apparatus will indicate this to the exit station toll collector when excess time light 485 (Fig. 21b) is illuminated. In the preferred embodiment of this invention, the maximum predetermined time limit is always five hours. That is, the time limit within which a vehicle is moved from an entrance station to an exit station within one zone checking area is five hours. The time limit setting is obtained by setting the time of trip control apparatus in the entrance station toll recorders five hours ahead of the time of trip control apparatus in the exit station toll recorders. It is obvious that this five hour limit is not a limitation of the invention but a matter of preference. Any suitable time differential between entrance and exit stations may be used.

Hence, if at the time a trip card is partially processed at an entrance station toll recorder, the time of trip control value punched at the index positions in row 3 at columns E through L (Fig. 2) is twenty-five, the time of trip control value at all exit station toll recorders within the zone checking area is 15. It is to be recalled with reference to Fig. 10 that the time emitters which determine the time control value, are mechanically driven by the time control mechanism in half hour increments from a time control value 0 to 99, inclusive. The time comparing apparatus in the exit station toll recorder indicates excess time only if the exit station time control value at the period the trip card is analyzed at the exit station, is greater than the entrance station time control value punched in the trip card. Conversely, the moving of a vehicle within the predetermined time limit is indicated if the time control value at the exit station at the time the trip card is being processed therein, is less than or equal to, the time control value punched in the trip card at the entrance station.

Assuming the time control value punched in the trip card to be twenty-five, and the trip card is sensed in the exit station toll recorder when the time of control value therein is twenty-six, an excess time indication will occur if the entrance station and the exit station are within a common zone checking area. In other words, the exit station time control value as compared to the entrance station time control value punched in the trip card indicates that the vehicle operator required five and one half hours to move from the entrance station to the exit station.

Referring to Fig. 21h, the time control value punched in the trip card at the entrance station will cause relays R48, R51, and R53 to become energized via their corresponding sensing contacts during the exit toll recorder card sensing period. The exit station time control emitters (see also Fig. 10) are shown in Figs. 21f and 21g. Since the time control value at the exit station is twenty-six, the exit station tens digit emitter rotor brush 487 (Fig. 20f) is connected to the two digit conducting segment 488–2. The units emitter rotor brush 489 (Fig. 21g) is in contact with conducting segment 490–6.

*Allowable time of trip relay R54H circuit No. 1.—* From line 429 (Fig. 21b) through contacts 343–X n/c, line 447, cam contacts C23 (Fig. 21e), line 449, contacts R44–2 (Fig. 21b), tens emitter common segment 491, brush 487, segment 488–2, contacts R46–2 n/c, R48–1 n/o, R47–1 n/c, R49–1 n/c, wire 450, units emitter common segment 492 (Fig. 21g), brush 489, and segment 490–6. Inasmuch as relays R51 and R53 are energized, relay R54H is not energized. This is indicative of excess time.

It is conceivable that the tens digit of the time control value punched in the trip card at the entrance station may be greater by one than the tens position of the time control value of the exit station toll recorder. For example, a time control value of thirty-one is punched in the card, and the card is processed at the exit station when the time control value thereat is twenty-nine. Circuits are provided to take care of this tens digit position difference of one.

Assuming the time control value punched in the trip card at the entrance station is thirty-one and the actual time control value at the exit station is twenty-nine, relays R48 (Fig. 21h), R49 and R53 are energized during the card sensing period. Thus, the tens digit position brush 487 (Fig. 21f) is in contact with segment 488–2 whereas the units digit emitter brush 489 (Fig. 21g) is in contact with segment 490–9.

*Card tens high relay R55* (Fig. 21f).—From line 449 through relay contacts R44–2, common conducting segment 491, brush 487, segment 488–2, wire 493, contacts R47–6 n/c, R48–4 n/o, R49–2 n/o, wire 494, relay R55 to line 430.

Relay R55 is maintained energized by circuit from line 449 (Fig. 21g) through relay contacts R55–12, wires 451 and 494 (Fig. 21f), relay R55 to the other side of the line.

*Relay R54 circuit No. 2.*—From line 449 (Fig. 21g) through relay contacts R55–12, wires 451 and 494 (Fig. 21f) contacts R55–11, wire 450, units emitter common conducting segment 492 (Fig. 21g), brush 489, conducting segment 490–9, relay contacts R50–4, R55–9 n/o, R55-8 n/o, R55-7 n/o, R55-6 n/o, R55-5 n/o, R55-4 n/o, R55-3 n/o, R55-2 n/o, R55-1 n/o, R50-6 n/c, R51-9 n/c, R52-11 n/c, R53-8 n/o, R51-10 or R50-7, relay R54H to line 430.

Relay R54H is maintained energized by a circuit completed from line 449 through relay contacts R54-1, relay R54H to the other side of the line.

To summarize the detailed description under kiting, allowable time of trip relay R54P (Fig. 21h) is not energized when the entrance station number punched in the trip card identifies an entrance station included in the zone checking area of the exit station. Allowable time of trip relay R54H (Fig. 21g) is not energized if the actual time control value at the exit station is larger than the time control value punched in the trip card at the entrance station. In fact, relay R54H is not energized if the exit station time control value is less than the trip card time control value by a great amount, namely ten or more. The failure to pick relay R54 is indicative of a vehicle passing over a portion of the toll highway within a zone checking area, and exceeding the predetermined time limit for such passage. Since contacts R54-2 (Fig. 21b) transfer when relay R54 is picked, the failure to energize relays R54P or R54H will form a circuit to excess time light 485 when release card interposer magnet 153-X is energized. In addition, a circuit to punch and print clutch interlock relay R45 is opened to prevent an exit station toll recorder cycle.

*Release card interposer magnet 153-X.*—From line 429 (Fig. 21b) through contacts 343-X n/c, 184, 465 n/c, R44-3, magnet 153-X to the other side of the line. Magnet 153-X is energized when relay R44P (Fig. 21e) is picked which, in turn, is energized due to an entrance station in the trip card. Magnet 153-X is maintained energized for most of the exit toll recorder cycle by cam contacts C11.

Upon the depression of an axle key in the exit station toll recorder, one of the relays R28 through R33 (Fig. 21e) is energized. Assuming the axle key corresponding to a three axle vehicle is depressed, contacts 439 are caused to close to complete a circuit to energize relay R30. As described hereinbefore under Key Mechanism, the contacts associated with a key are maintained closed until the end of the toll recorder cycle when a mechanical linkage causes the contacts to open. The energization of relay R30 causes contacts R30-1 (Fig. 21b) to close, whereupon the circuit to energize relay R56P is completed only after relay R45 is energized.

*Card test delay No. 2 relay R56P.*—From line 429 through contacts 343-X n/c, cam contacts C10, contacts 155-X, R57-1 n/c or R57-2, R30-1, relay R56P to the other side of the line. The coil of relay R56H is wound on the same core as the coil R56P. Since coil R56H is short-circuited, the well-known resulting transformer action for affecting the magnetic flux in the common core when coil R56P is energized and de-energized causes relay R56 to pick and drop out, respectively, slowly.

*Axles check.*—Referring to Fig. 1, the toll collector at the exit station depresses an axle key in unit 32 which corresponds to the number of axles on the vehicle. If this number as represented by the depressed axle key does not agree with the keyed axle information punched in the trip card at the entrance station, axle light 495 (Fig. 21e) is energized and the circuit to relay R45P (Fig. 21b) is caused to open because relay R71 (Fig. 21e) is not energized. The energized light indicates to the exit station toll collector that there is a discrepancy between the number of axles determined by the entrance station toll collector and the exit station toll collector. The open circuit to relay R45P prevents the energization of this clutch interlock relay which, in turn, prevents an exit station toll recorder cycle. As the description advances, the circuit relative to relay R71 will be explained.

Assuming the keyed axle information punched in the trip card at the entrance station is indicative of three axles, i.e., holes are punched at the index positions in row three at columns C and D (Fig. 2), relays R42 (Fig. 21i) and R43 are energized during the exit station toll recorder card sensing period. If the toll collector at the exit station depresses the three axle key in unit 32 (Fig. 21e), contacts 439 will close to complete a circuit to relay R30. Since the data punched in the card represents three axles and the axle key depressed at the exit station also represents three axles, axle check relay R71 will be energized, assuming that zero axles in error relay contacts R60-5 are closed.

*Axle check relay R71.*—From line 429 (Fig. 21b) through contacts 343-X n/c, wire 447, cam contacts C23 (Fig. 21e), relay contacts R44-4, R30-2, R43-1 n/o, R42-2, R41-1 n/c, R60-5, relay R71 to the other side of the line.

It is sufficient for the present to state that contacts R60-5 are closed due to the energization of relay R60. As the description advances, the circuit relating to relay R60 will be described in detail to show that an axles in error indication other than zero will prevent a circuit to relay R71.

If the axle key depressed in unit 32 does not correspond with the axle number information punched in the trip card at the entrance station, a circuit will not be completed to relay R71. Hence, when card test delay No. 2 relay R56P (see also Fig. 21b) is energized to close contacts R56-2, axle light 495 is energized through a circuit from line 447, cam contacts C23, relay contacts R44-4, R56-2, R71-1, light 508 to line 430.

*Clutch interlock relay R45P.*—Upon the energization of relay R71, a circuit is completed to relay R45P (Fig. 21b) from line 429, contacts 343-X n/c, cam contacts C10, interposer contacts 153-X, contacts R56-1, R54-2 n/o, R71-2, R27-2, relay R45P to the other side of the line.

In the event that minute advance warning contacts 97-X (Fig. 21a) or minute advance motor contacts 67-X are closed so as to energize minute advance relay R27, contacts R27-2 (Fig. 21b) are caused to open. Hence, a circuit to energize relay R45P is delayed until just prior to the de-energization of relay R27 when minute interlock contacts 82-X close. With reference to Fig. 7, it will be recalled that the cam follower end of bell crank 81 rides upon the periphery of cam 62. The bell crank is moved in a direction to close minute interlock contact 82-X only after the time indicating type wheels have been completely advanced, and before contacts 67-X (see also Fig. 21a) are opened.

A stick circuit to maintain relay R45P energized is completed through contacts R45-4 which are connected in parallel circuit with contacts R27-2 and 82-X. Relay R45 remains picked during the major portion of the toll recorder cycle when relay R45H is energized through contacts C11 and R45-4.

It is to be observed that release key 402 is available to energize relay R45P even after excess time relay R54 is not energized and/or axles check relay R71 is not energized.

*Exit station interposer punch magnets.*—Prior to the closing of punch interposer bail contacts 194-X (see also Fig. 9), selected interposer punch magnets are energized. These magnets are associated with the exit cancelation marking in row three at column A (see also Fig. 2); axles in error holes in row 5 at columns I through L; type of axles in error perforation in row 5 at column G; excess time hole in row 5 at column F; and the exit station keyed axles number in row 5 at columns B through D. The exit station number punched in row 4 at columns F through L is caused to be punched by a preset mechanism. The circuits in connection with the axles in error interposer magnets and the type of axles in error interposer magnets, will be described in detail hereinafter in connection with the zero control counter 34 (Fig. 1).

*Allowable time of trip interposer magnet 510 (Fig.*

21c).—Magnet 510 is energized only if allowable time of trip relays R54H (Fig. 21g) and/or R54P (Fig. 21h) are energized to close contacts R54–3 (Fig. 21c) in order to complete a circuit from line 429 (Fig. 21b) through contacts 343–X n/c, cam contacts C10, interposer contacts 155–X, relay contacts R57–1 n/c or R57–2, R45–2 or R45–3, wires 448 and 459 (Fig. 21c) contacts R54–3, magnet 510 to the other side of the line.

*Axle interposer punch magnet.*—The axle interposer punch magnets 511 (Fig. 21c), 512 and 513 are energized in accordance with the axle key depressed in unit 32 (see also Figs. 1 and 21e). The depression of a one axle key, for example, causes the energization of magnet 511 which, in turn, causes a hole to be punched in the card at the exit station in row 5 at column D (see also Fig. 2. Similarly, the depression of a two axle key causes the energization of magnet 512 which, in turn, causes a hole to be punched in row 5 at column C, and the depression of a four axle key causes the energization of magnet 513 and a hole to be punched in row 5 at column B. Thus, if a three axle key is depressed in unit 32 (Fig. 21e), contacts 439 are closed to energize relay R30. Accordingly, magnets 511 (Fig. 21c) and 512 are energized.

*Interposer punch magnet 511.*—From wires 448 and 459 through contacts R30–5, magnet 511 to the other side of the line.

*Interposer punch magnet 512.*—From wires 448 and 459 through contacts R30–4, magnet 512 to the other side of the line.

Energization of the keyed axle number interposer punch magnets and the allowable time of trip magnet causes interposers 195 (Fig. 9) associated therewith to be moved upwardly and positioned between corresponding punches 196 and the backing member 197 of punch carrier 198. Thus, during the toll recorder cycle when punch carrier 198 is moved to the right, the aforementioned corresponding punches 196 are also moved to the right and through the trip card to perforate the latter.

The upward movement of any punch interposer acts upon a punch interposer bail which closes punch interposer bail contacts 194–X (Fig. 21b).

*Punch and print clutch magnet 203–X.*—From line 429 (Fig. 21b) through contacts 343–X n/c, 184, 465 n/c, R44–3, R45–4, 194–X, cam contacts C12, magnet 203–X to the other side of the line.

Referring to Fig. 8, the energization of clutch magnet 203–X causes dog 205 to engage rotating clutch ratchet 206. This causes punch shaft 156 to rotate, and thereby the punch mechanism and the print mechanism to operate. Referring to Figs. 21b and 22, magnet 203–X is de-energized during the toll recorder cycle at 10° when cam contacts C12 open. Card test delay No. 1 relay contacts R44–3 and card sensing bail contacts 184 are caused to open prior to 350° of the exit station toll recorder cycle when cam contacts C12 close once again. Cam contacts C10, however, remain closed until 180° of the toll recorder cycle in order to maintain the interposer punch magnets energized through the punching period of the toll recorder cycle. At 335° of the recorder cycle, cam contacts C11 open to de-energize release card interposer magnet 153–X (see also Fig. 9). Interposer magnet 153–X causes contacts 155–X to open prior to the time that cam contacts C10 close again.

*Amount of toll determination.*—After completion of the exit station toll recorder cycle caused by the energization of magnet 203–X, the trip card is removed from the card receiver of the toll recorder so that the exit station toll collector may determine the fare.

A trip card is always associated with only one entrance station. For example, card 26 shown in Fig. 2 is obtainable only at the Binghamton entrance station No. 30. The reverse side of a trip card (see also Fig. 3) has imprinted thereon by numeral identification all exit stations affording egress to vehicles entering the toll highway by way of Binghamton. In addition, the trip card has imprinted thereon the fare amounts for these vehicles of any vehicle classification. The fare is printed at the intersection of the vehicle classification value as the abscissa and the exit station number as ordinate. For example, a vehicle determined to be in classification five is perforated at the entrance station in row 1 at column G. Examination of the reverse side of this trip card at the exit station, e.g., station No. 32, reveals the toll to be fifty-five cents as is determined by the intersection of the station No. 32 column and the classification five column.

*Tour of duty recorder axle count.*—Referring to Fig. 1, it may be seen that after vehicle 20 is stopped opposite booth 30, and the exit station toll recorder 33 has been caused to complete a recorder cycle, the vehicle subsequently passes over axle treadle 31 when leaving the toll highway. Treadle 31 includes switches which direct a pulse for each axle passing over the treadle to tour of duty recorder 37 and zero control counter 34. Referring to Fig 21i, axle treadle 31 comprises a forward switch 517 and a reverse switch 518. The operation of the circuits associated with the exit station axle treadle 31 are similar to those associated with entrance station treadle 22 (see also Fig. 1). That is, a count is not entered into the forward axle counter 289 (see also Fig. 19) controlled by magnet 390–X (see also Fig 21j) until one axle has completely passed over the forward switch and the reverse switch successively. Similarly, a count is not entered into the reverse axle counter 290 controlled by magnet 391–X until after an axle has passed completely over the reverse switch 518 and the forward switch 517 successively.

*Forward axle count.*—When the wheels associated with the front axle of the vehicle pass over the treadle to close forward switch 517 (Fig. 21i), a circuit is completed from line 422 through switch 517, relay R73 to line 423. This causes relay R77 to become energized from line 422 through contacts R73–1, R75–1 n/c, relay R77 to the other side of the line. Relay R77 is maintained energized through a stick circuit completed from line 422, through contacts R73–2, R77–1, R75–1 n/c, relay R77 to line 423.

When the wheels associated with the front axle pass over reverse switch 518 of treadle 31, relay R76 is energized from line 422 through switch 518, relay R76 to the other side of the line. It is to be recalled that there is an interim period during which switches 517 and 518 are both closed simultaneously to thereupon energize their respective relays R73 and R76 simultaneously. Thus, the stick circuit to relay R77 is maintained while relay R76 is energized due to the continued energization of relay R73. This permits a second stick circuit to be completed to relay R77 even after relay R73 is de-energized when forward switch 517 is finally caused to open. The circuit formed is from line 422 through contacts R76–2, R77–1, R75–1 n/c, relay R77 to the other side of the line. The de-energization of relay R73 and the continued energization of relay R77 causes a circuit to be completed to relay R78 from line 422 through relay contacts R76–3, R77–2 n/o, R73–2, relay R78 to the other side of the line. A hold circuit for relay R78 is maintained from line 422 through forward axle counter contact 387–X (see also Fig. 19), relay contacts R78–1, R73–2, relay R78 to line 423.

An additional forward movement of the wheels associated with the first axle will cause reverse switch 518 to open and to thereupon open the circuit to relay R76. The resultant closing of contacts R76–4 (Fig. 21j) completes a circuit to forward axle counter magnet 390–X from line 425, relay contacts R73–3, R76–4, R78–2, magnet 390–X to line 424. The energization of counter magnet 390–X causes a mechanical linkage to open contacts 387–X (Fig. 21i), whereupon the hold circuit to relay R78 is opened. The de-energization of relay R78, in turn, causes magnet 390–X (Fig. 21*j*) to de-energize when contacts R78–2 separate.

It is to be observed that if the vehicle reverses its direction of movement prior to causing reverse switch 518 to open, and causes relay R73 (Fig. 21*i*) to become energized a second time through forward switch 517, forward axle counter magnet 390–X (see also Fig. 20*j*) is not pulsed after relay R78 is energized, even after relay R76 is de-energized, because relay contacts R73–3 are separated. The re-energization of relay R73 opens the relay R78 hold circuit due to contacts R73–2 separating.

*Reverse axle count.*—When the wheels associated with an axle are moved completely over treadle 31 (Fig. 21*i*) in a reverse direction, reverse switch 518 is closed first to thereupon energize relay R76 from line 422 through switch 518, relay R76 to the other side of the line. This causes relay R75 to become energized from line 422, through relay contacts R76–3, R77–2 n/c, relay R75 to line 423. Relay R75 is maintained energized through a stick circuit from line 422, relay contacts R76–2, R75–2, R77–2 n/c, relay R75 to the other side of the line. When forward switch 517 is closed, relay R73 is energized from line 422 through switch 517, relay R73 to the other side of the line. During the previously mentioned interim period during which relays R73 and R76 are energized simultaneously, a second stick circuit is completed to relay R75 from line 422 through contacts R73–2, R75–2, R77–2 n/c, relay R75 to the other side of the line. Thus, when reverse switch 518 is caused to open to de-energize relay R76, a circuit is completed to relay R74 from line 422 through contacts R73–1, R75–1 n/o, R76–1, relay R74 to the other side of the line. A hold circuit is completed to relay R74 from line 422 through contacts 394–X, R74–1, R76–1, relay R74 to line 423. When forward switch 517 is finally caused to open to de-energize relay R73, reverse axle counter magnet 391–X (see Fig. 21*j*) is energized from line 425 through contacts R73–3, R76–4, R74–2, magnet 391–X to the other side of the line. The energization of this counter magnet causes a mechanical linkage to open reverse contacts 394–X to thereupon de-energize relay R74. The de-energization of relay R74 causes contacts R74–2 to separate and open the circuit to magnet 391–X.

In summation, the forward axle counter magnet 390–X is energized once for each axle causing switches 517 and 518 to be closed and opened successively, and reverse axle counter magnet 391–X is energized once for each axle causing switches 518 and 517 to be closed and opened successively.

Figure 21D:
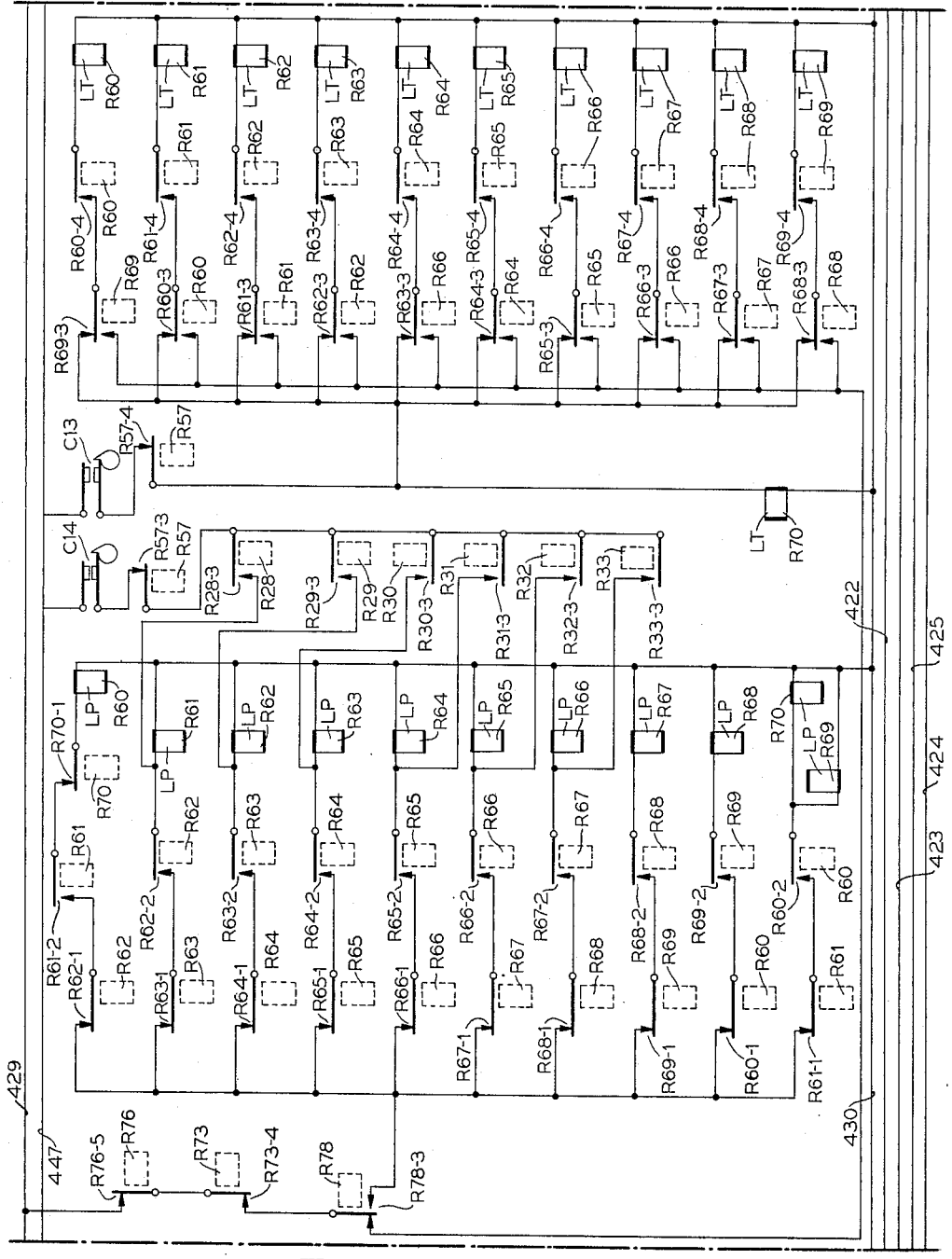
Figure 21E:
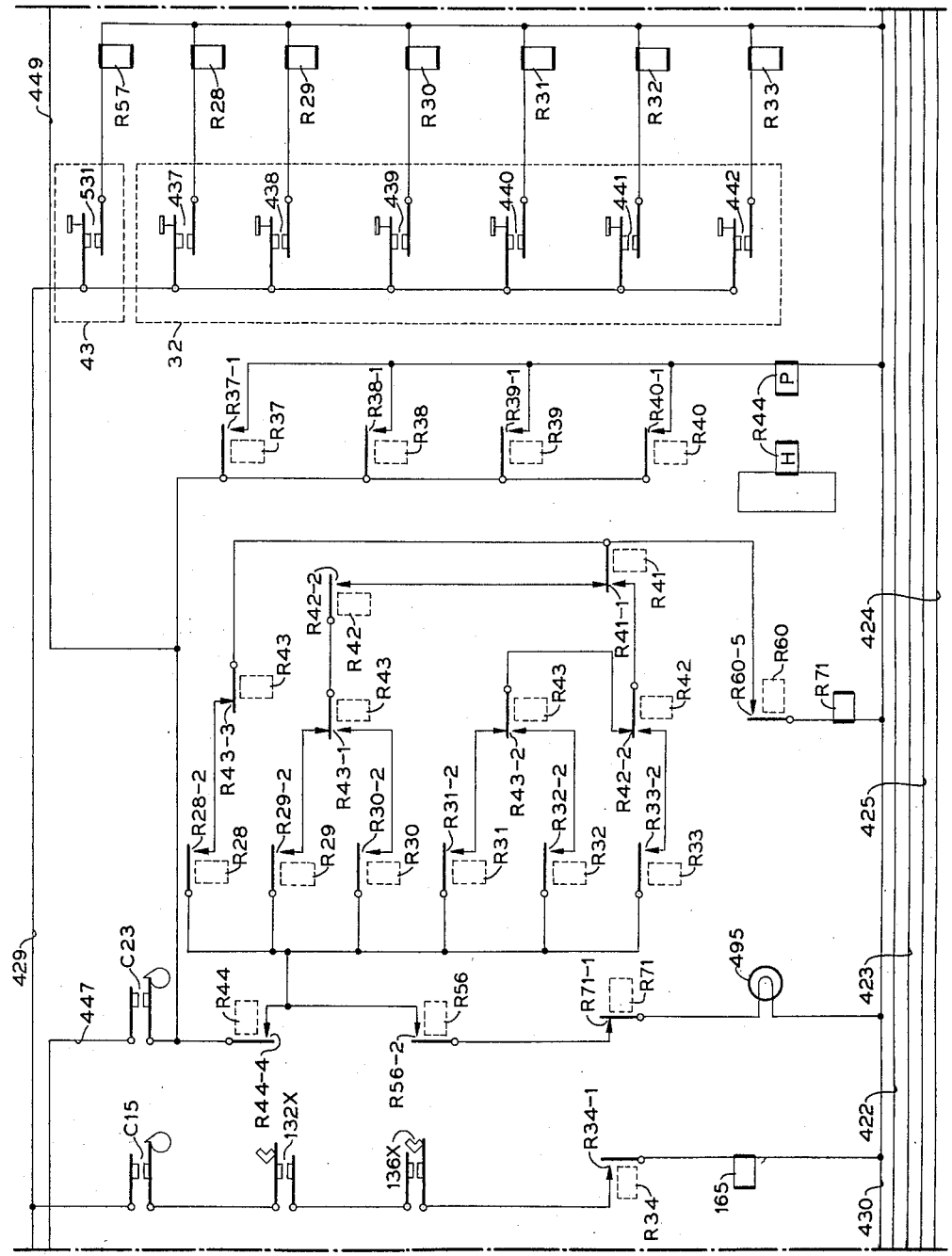
Figure 21F:
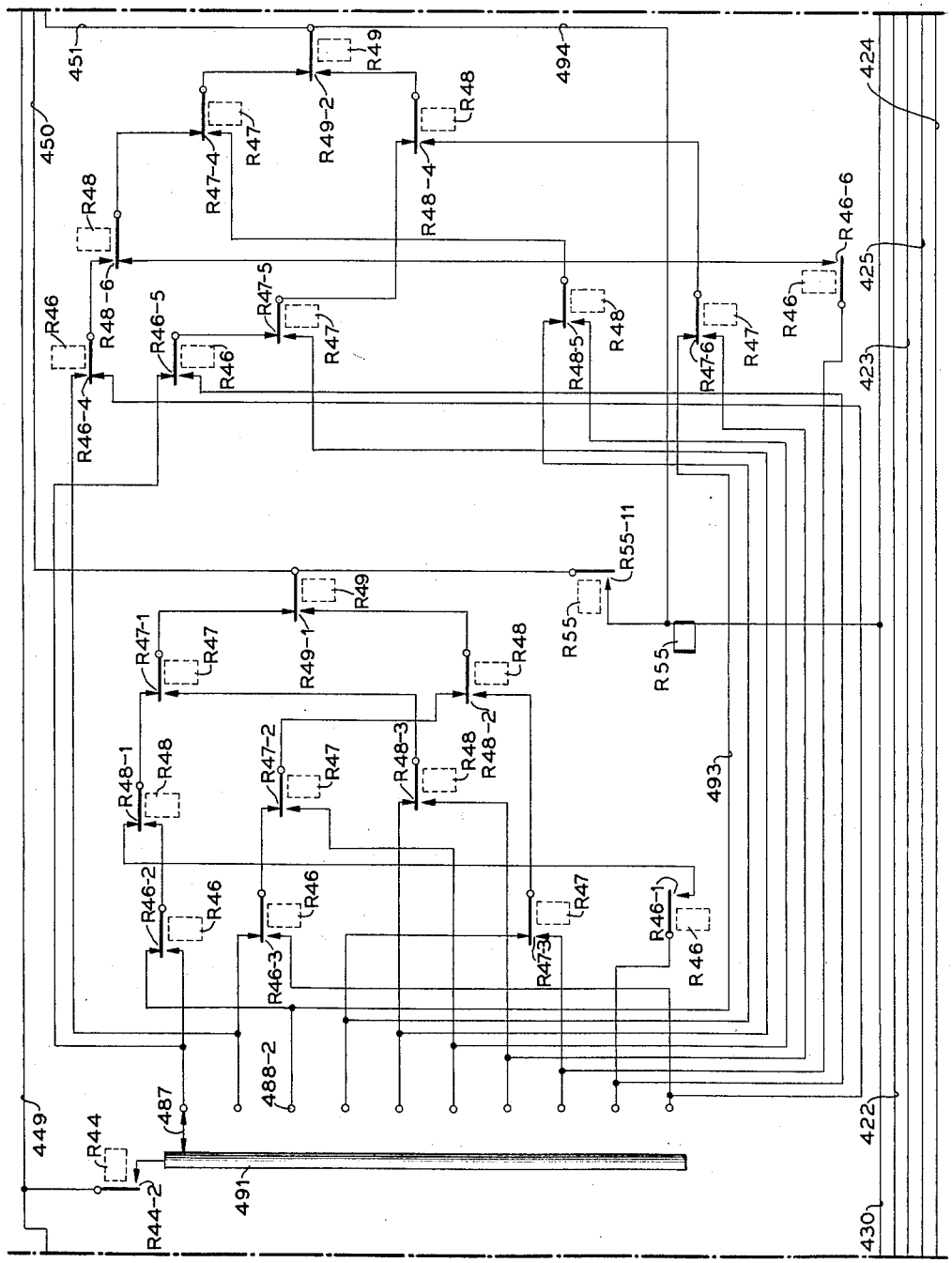
Figure 21G:
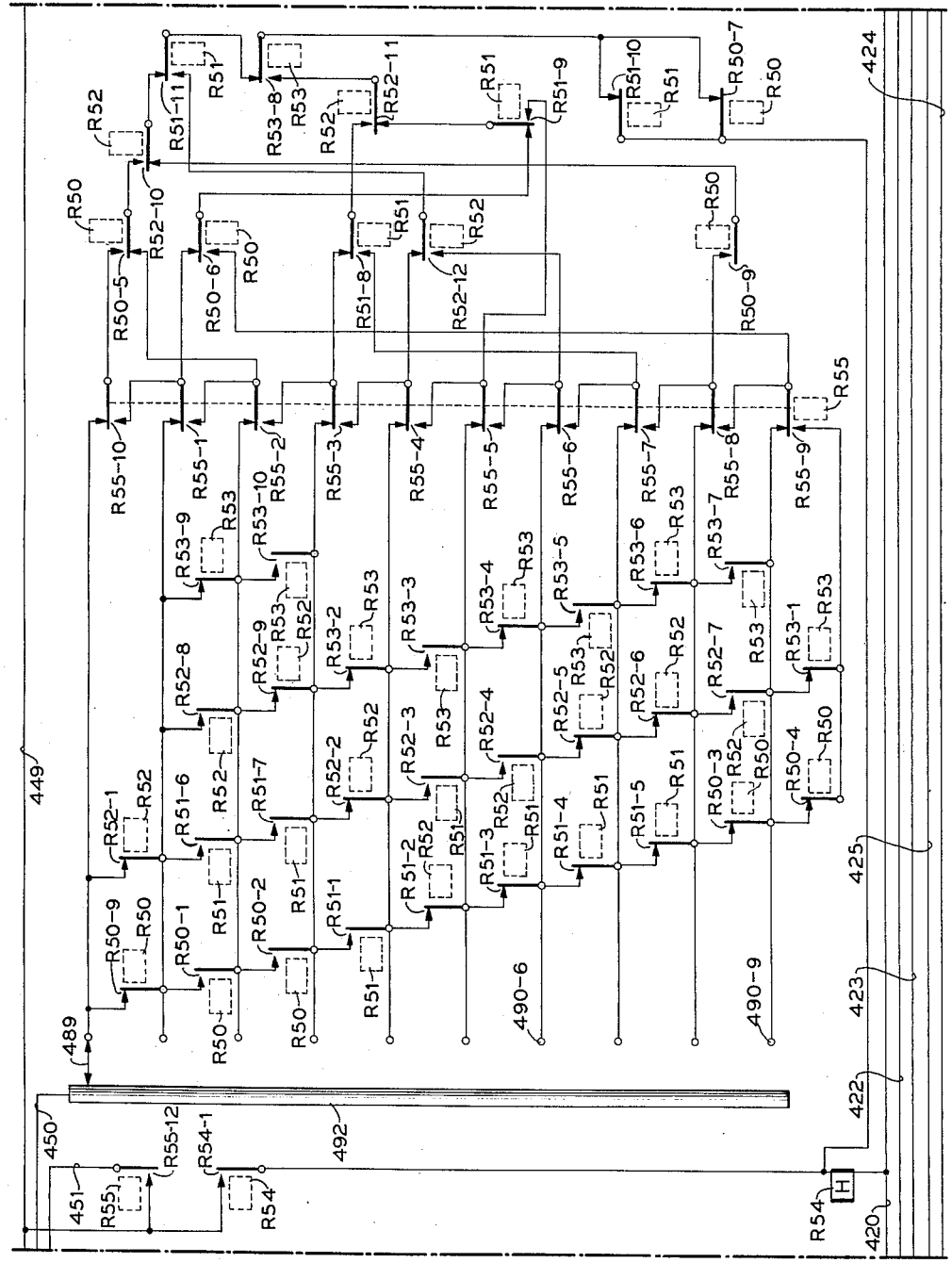
Figure 21H:
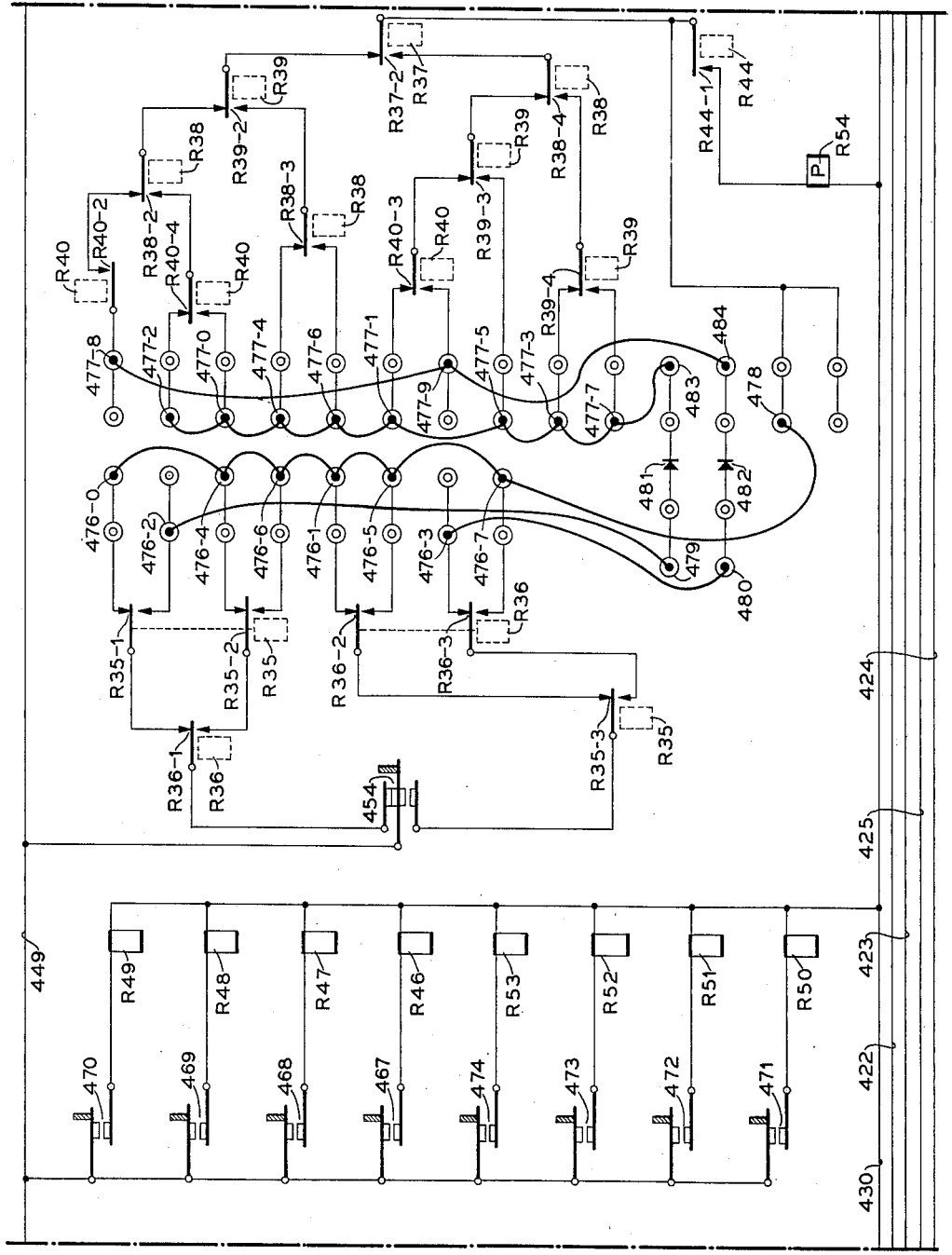
Figure 21I:
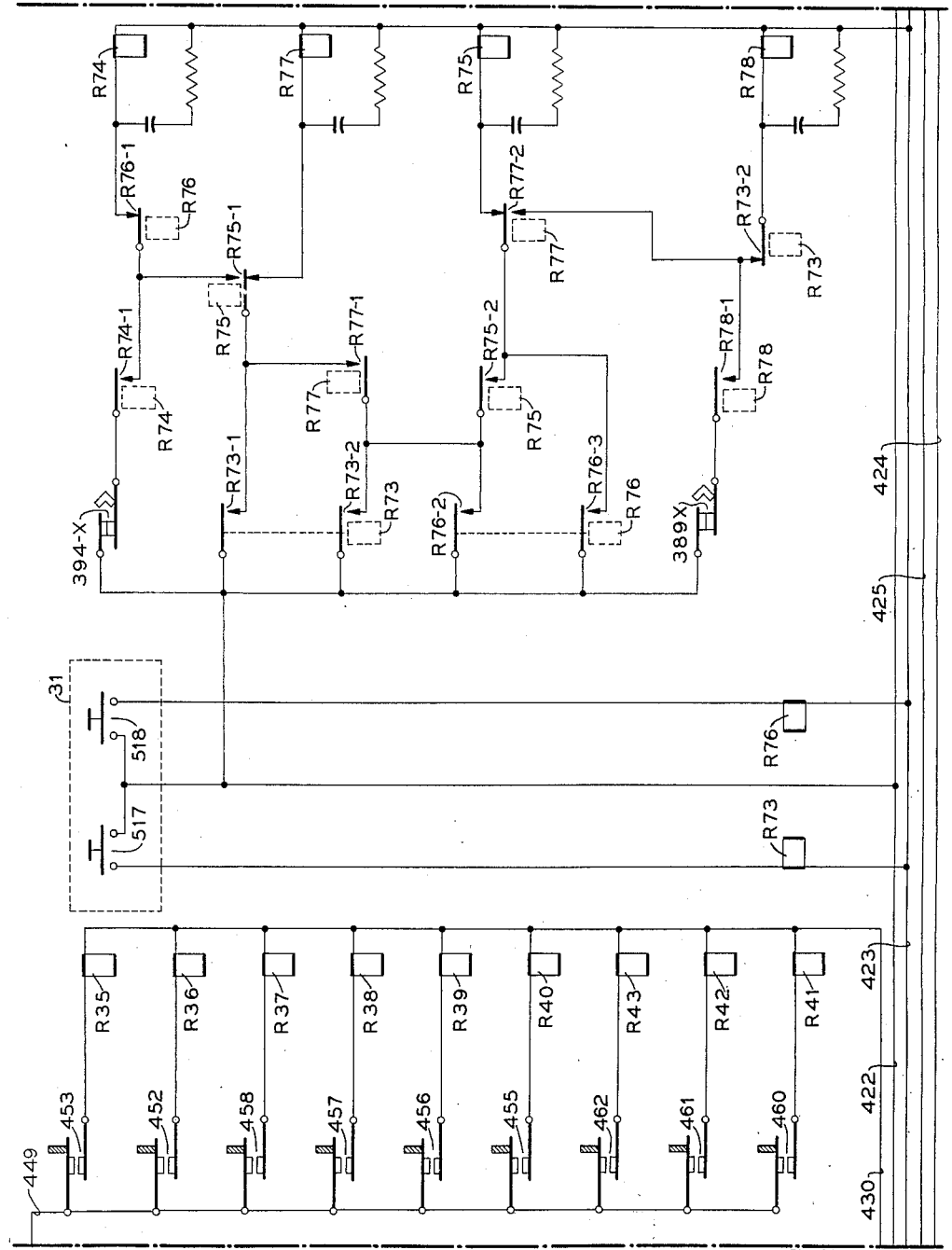
Figure 21J:
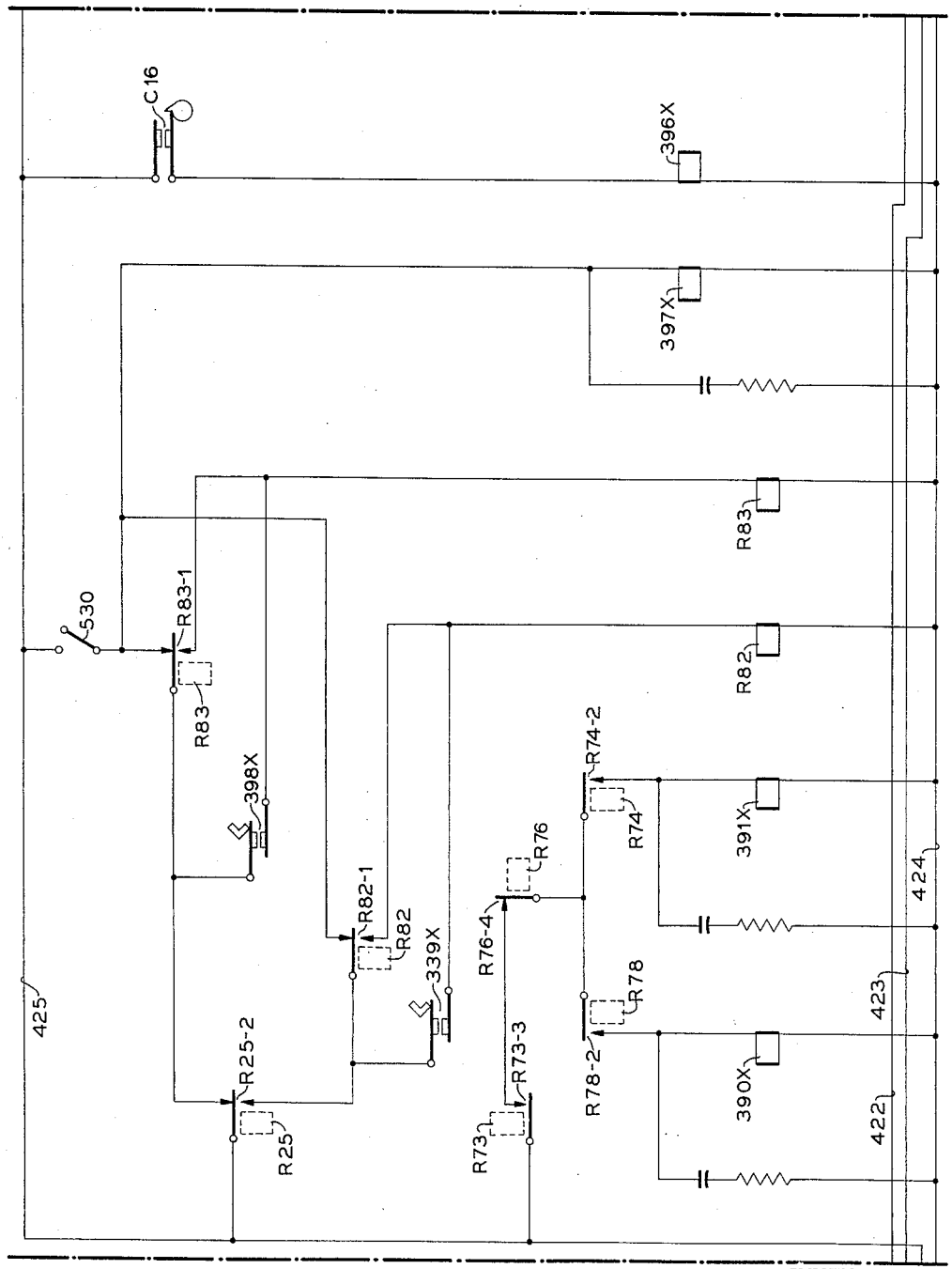

*Zero control counter-keyed axle count.*—Referring to Fig. 21*d*, depression of one of the axle keys in unit 32 (see also Fig. 21*e*) causes one pair of corresponding contacts R28–3, R29–3, R30–3, R31–3, R32–3, or R33–3 to close, and to thereby energize relays R61LP through R66LP, respectively, when cam contacts C14 close at 288° during the exit station toll recorder cycle. For example, depression of the three axle key causes the energization of relay R30 which, in turn, closes contacts R30–3. Thus, a circuit is completed to relay R63LP at 288° from line 447 through cam contacts C14, relay contacts R57–3, R30–3, relay R63LP to line 430. Relay R63LP is a latch type relay and will maintain its contacts shifted after it is once energized until relay R63LT is energized.

Assuming that a vehicle having three axles passes over treadle 31 (Fig. 21*i*) in a forward direction, relay R78 is energized three distinct times, once for each axle. Each time relay R78 is energized, contacts R78–3 (Fig. 21*d*) are transferred to complete a circuit to the zero control counter. When contacts R78–3 are transferred as a result of the first axle passing completely over the treadle, a circuit is completed to relay R62LP from line 429 through contacts R76–5, R73–4, R78–3 n/o, R64–1, R63–2, relay R62LP to the other side of the line. It is to be observed that relay R63LP was energized when the toll collector depressed the three axle key and caused a toll recorder cycle. When forward axle counter contacts 387–X are caused to open to de-energize relay R78 (see also Fig. 21*i*), contacts R78–3 return to normal and complete a circuit to latch trip relay R63LT from line 429 through contacts R76–5, R73–4, R78–3 n/c, R62–3 n/o, R63–4, relay R63LT to the other side of the line. Thus, the first axle moving over the treadle causes relay R62 to pick and relay R63 to drop.

When contacts R78–3 transfer as a result of the second axle passing over the treadle in a forward direction, a circuit is completed to energize relay R61LP from line 429 through contacts R76–5, R73–4, R78–3 n/o, R63–1, R62–2, relay R61LP to the other side of the line. The second de-energization of relay R78 causes a circuit to be completed to relay R62LT from line 429 through contacts R76–5, R73–4, R78–3 n/c, R61–3 n/o, R62–4, relay 62LT to the other side of the line. Similarly, a third axle passing over the treadle causes relay R60LP to energize and, subsequently thereto, relay R61LT to energize.

The zero control counter circuit is designed to operate only when an axle passes over the treadle in a forward direction. In order to keep this circuit as simple as possible, an axle passing over treadle 31 (see Fig. 1) in a reverse direction will not affect the counter. This is not a limitation, but a practical expedient, because the vehicle is not expected to stop after once leaving its position opposite booth 30.

*Zero control counter-treadle axle count.*—Referring to Fig. 1, it may be seen that the axle treadle pulses due to the passing of vehicle 20 over the treadle 31 are directed to the tour of duty recorder 37 and the zero control counter 34 after the trip card associated with vehicle 20 has been processed at the exit station toll recorder. This, of course, is for the reason that the exit station vehicle stop booth 30 is ahead of the axle treadle. Thus, any information to be marked upon a trip card due to data in the zero control counter must be marked on the trip card processed immediately after the card associated with vehicle 20 is processed. In line with the foregoing, since relay R60LP was the last relay energized due to a three axle vehicle passing over treadle 31 (refer to description under "Zero control counter-keyed axle count"), a circuit to zero interposer punch magnet 519 (Fig. 21*c*) is completed during the toll recorder cycle for the following vehicle from wires 448 and 459 through contacts R60–6, magnet 519 to line 430. The energization of this interposer magnet causes a hole to be punched in row five at column H of the trip card. It may be seen that energization of relay R60LP will maintain relay R60 picked until after R60LT is energized during a toll recorder cycle as will be described in detail shortly.

At 238° during the toll recorder cycle in which the zero control counter zero hole is punched in the trip card, a reset pulse is directed through cam contacts C13 (Fig. 21*d*) to energize latch trip relay R60LT from line 447 through cam contacts C13, relay contacts R57–4, R69–3 n/c, R60–4, relay R60LT to the other side of the line.

Assuming that only two axles pass over the exit station treadle after relay R63LP is energized as a result of the depression of the three axle key in unit 32, an axles in error hole will be punched in the trip card associated with the following vehicle. As described previously, the passing of the first axle over treadle 31 will cause relays R62LP and R63LT to energize, whereas the second axle passing over the treadle will result in the energization of relays R61LP and R62LT. As a result, a circuit is completed to an axles in error interposer punch magnet which will cause a hole indicative of the one axle difference to be punched in the trip card.

*Axles in error interposer punch magnet* 520.—From line 429 through contacts 343–X n/c, cam contacts C10, interposer contacts 155–X, relay contacts R57–1 n/c or R57-2, R45-2 or R45-3, wires 448 and 459 (Fig. 21c), contacts R61-5, magnet 520 to the other side of the line.

As a result, a hole is punched in row 5 at column L to designate an axles in error of one axle between the number of axles keyed in unit 32 (Fig. 1) and the actual number of axles passing over axle treadle 31. The absence of a hole in row 5 at column G indicates a plus error; i.e., one in which the number of keyed axles exceeds the actual number of axles passing over the treadle. A hole punched in row 5 at column G indicates a negative error wherein the number of keyed axles is less than the number of axles passing over treadle 31.

Assuming five axles pass over treadle 31 after relay R63LP (Fig. 21d) is energized due to the depression of a three axle key in unit 32, the fifth axle passing over the treadle will cause the energization of relays R68LP and R69LT. In other words, the first axle passing over the treadle causes the energization of relays R62LP and R63LT; the second axle causes the energization of relays R61LP and R62LT; the third axle causes the energization of relays R60LP and R61LT; the fourth axle causes the energization of relays R69LP, R70LP and R60LT; and the fifth axle causes the energization of relays R68LP and R69LT. Hence, after all of the axle treadle pulses are directed to the zero control counter, only relays R68 and R70 remain picked. During the toll recorder cycle for the immediately following vehicle, for example, the one following vehicle 20 in Fig. 1, a circuit is completed to energize axles in error interposer punch magnet 521 (Fig. 21c) from wire 448 through contacts R68-5, magnet 521 to the other side of the line. This magnet causes a hole to be punched in row 5 at column K to indicate an axles in error difference of two axles between the number of keyed axles and the number of axles passing over treadle 31. In addition, interposer punch magnet 526 is energized from wires 448 and 459 through contacts R70-6, magnet 526 to line 430. This magnet causes a hole to be punched in row 5 at column G to indicate that the two axles in error punched in the trip card is a minus error. In other words, this error is one wherein the number of axles passing over the treadle exceed by two the number of axles keyed by the exit station toll collector.

During the toll recorder cycle, cam contacts C13 (Fig. 21d) close to direct a reset pulse to relay R70LT, as well as through contacts R67-3 n/c and R68-4 to relay R68LT.

The axles in error index positions in row 5 at columns I through L (Fig. 2) are determined according to a binary code; e.g., a one axle hole is punched in column L when magnet 520 (see also Fig. 21c) is energized, a two axle hole is punched in column K when magnet 521 is energized, a four axle hole is punched in column J when magnet 522 is energized, and an eight axle hole is punched in column I when magnet 523 is energized. As mentioned hereinbefore, no axles in error wherein the number of axles keyed in unit 32 by the exit station toll collector and the number of axles passing over treadle 31 are equal, is indicated by a hole punched in row 5 at column H when magnet 519 is energized.

Referring to Fig. 21e, axles check relay R71 may be energized only if zero control counter relay R60 is up during the toll recorder cycle. It will be recalled that relay R71 is not energized if the number of axles punched in the trip card at the entrance station does not correspond with the number of axles keyed in unit 32 at the exit station. Hence, axles light 495 is energized when the value accumulated in the zero control counter is anything other than zero. This is a visual indication to the toll collector of the axles in error.

Figure 21K:
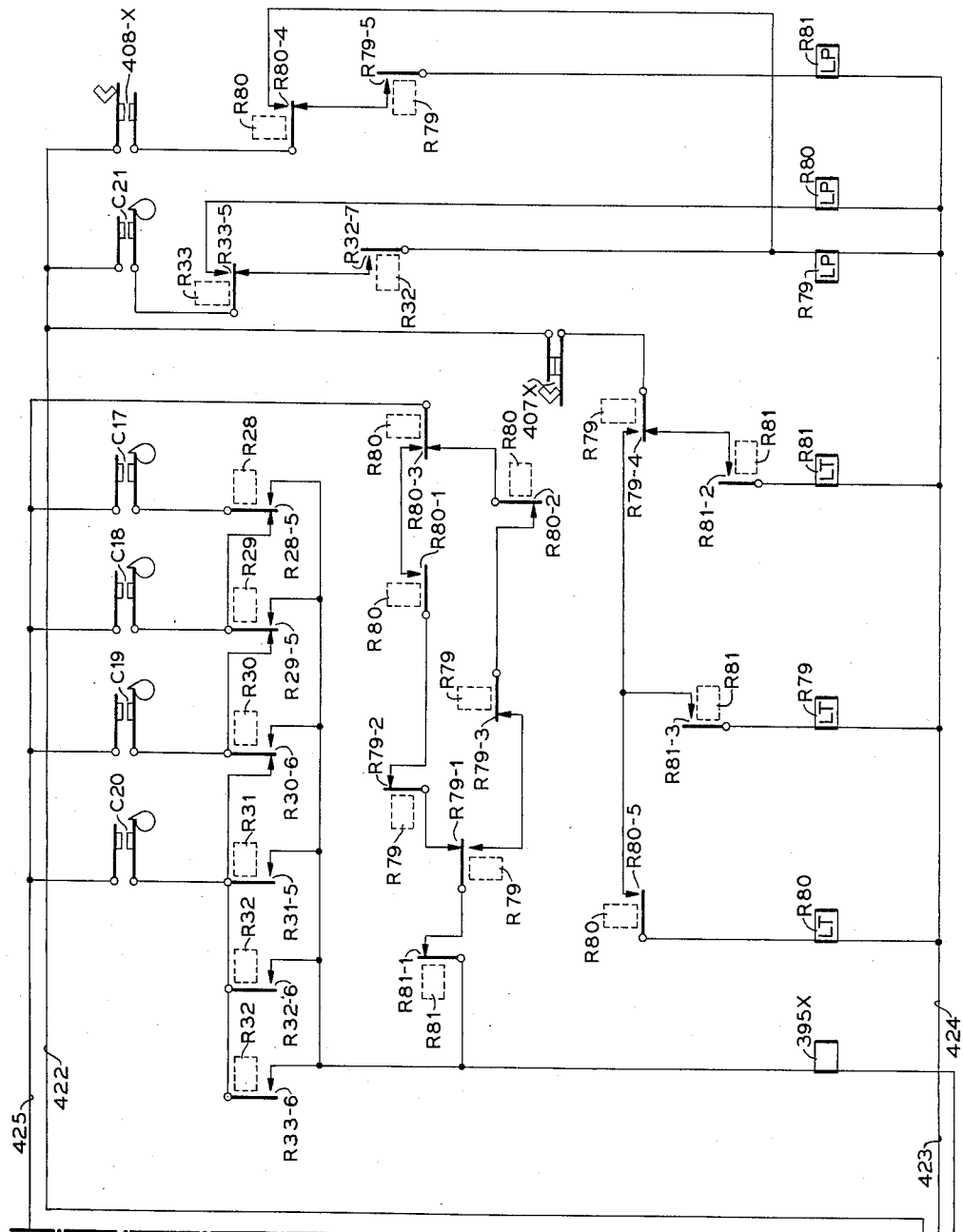

*Tour of duty axle counter 395–X.*—Referring to Fig. 21k, counter magnet 395–X is pulsed a number of times corresponding with the number of axles represented by the depressed axle key in unit 32. It may be seen that since forward axle counter 289 (see also Fig. 19) under control of magnet 390–X (see also Fig. 21j) records the number of axles passing over the exit station treadle 31 in a forward direction, and the reverse axle counter 290 under control of magnet 391–X records the number of axles passing over the treadle in a reverse direction, the count in counter 289 minus that in counter 290 should equal the count in axle counter 395 under control of magnet 395–X. Any axle count difference between these two preceding values will indicate that the exit station toll collector has not depressed the correct axle keys.

Since the circuit shown in Fig. 21k is similar to the axle counter circuit shown in Fig. 20e for which a detailed description has been given previously, the circuit shown in Fig. 21k will be described only briefly.

If a one through four axle key is depressed in unit 32, a corresponding number of pulses is directed through cam contacts C17 through C20, and axle keyed relay contacts R28-5, R29-5, R30-6 and R31-5, to axle counter magnet 395–X. If, however, the five axle or six axle key in unit 32 is depressed, relay R79LP or R80LP, respectively, is energized so that the fifth and sixth pulses are directed to magnet 395–X. As stated previously, this is done in order to afford longer timed pulses which, in turn, allow for a greater safety factor in axle counter operation.

Depression of the five axle key in unit 32 (see Fig. 21e) causes contacts 441 to close and relay R32 to energize. During the exit station toll recorder cycle, cam contacts C17 through C20 close to direct four distinct pulses through contacts R32-6 (Fig. 21k) to magnet 395–X. In addition, latch pick relay R79LP (Fig. 21k) is energized at 320° when cam contacts C21 close. Thus, when the contacts associated with relay R79LP shift, after the relay is energized, a fifth pulse is directed to magnet 395–X from line 422 through relay contacts R80-3 n/c, R80-2, R79-3, R79-1 n/o, R81-1, magnet 395–X to the other side of the line.

Upon being energized, magnet 395–X causes a mechanical linkage to open contacts 407–X and to close contacts 408–X, concurrently. Contacts 408–X complete a circuit to relay R81LP from line 422 through contacts 408–X, R80-4 n/c, R79-5, relay R81LP to the other side of the line. The energization of relay R81LP opens the circuit to counter magnet 395–X when contacts R81-1 separate, and causes the circuit to latch trip relays R79LT and R81LT to be completed after magnet 395–X is de-energized. The energization of latch trip relays R79LT and R81LT ends any possibility of completing another count circuit to magnet 395–X.

If, however, the six axle key in unit 32 is depressed, relay circuits are set up so that two pulses in addition to the four directed through cam contacts C17 through C20 are directed to magnet 395–X. The depression of a six axle key causes contacts 442 (see also Fig. 21e) to close and relay R33 to energize. Thus, when cam contacts C21 close during the exit station toll recorder cycle after cam contacts C17 through C20 have directed four pulses to magnet 395–X, a circuit is completed to relay R80LP from line 422 through cam contacts C21, contacts R33-5 n/o, relay R80LP to the other side of the line. When the contacts associated with relay R80LP shift after the relay is energized, a fifth pulse is directed to magnet 395–X from line 425 through relay contacts R80-3 n/o, R80-1, R79-2, R79-1 n/c, R81-1, magnet 395–X to the other side of the line.

Inasmuch as the energization of magnet 395–X causes contacts 407–X to open and 408–X to close, concurrently, relay R79LP is energized when contacts 408–X close by a circuit completed from line 422 through contacts 408–X, R80-4 n/o, relay R79LP to the other side of the line. The energization of relay R79LP opens the circuit to magnet 395–X when contacts R79-1 transfer, and closes the circuit to relay R80LT after contacts 407–X close once again. The latter circuit is from line 422 through contacts 407–X, R79–4 n/o, R80–5, relay R80LT to the other side of the line. The resultant shifting of the contacts associated with relay R80LT causes a sixth pulse to be directed to magnet 395–X from line 425 through contacts R80–3 n/c, R80–2, R79–3, R79–1 n/o, R81–1, magnet 395–X to the other side of the line.

Contacts 407–X and 408–X are once again shifted by the mechanical linkage associated with the axle counter. Relay R81LP is energized from line 422 through contacts 408–X, R80–4 n/c, R79–5, magnet R81LP to the other side of the line. The energization of this relay, in turn opens the circuit to magnet 395–X when contacts R81–1 separate, and causes the energization of relay R81LT when contacts 407–X close. The energization of relay R79LT causes a circuit to be completed to relay R81LT from line 425 through contacts 407–X, R79–4 n/c, R81–2, relay R81LT to the other side of the line.

*Sequence counter magnet 396–X.*—Cam contacts C16 (Fig. 21j) close for 25° every toll recorder cycle in order to energize counter magnet 396–X once each cycle. As described previously, the energization of magnet 396–X (see also Fig. 19) operates a linkage which advances counter 346 once each toll recorder cycle to thereupon total the entire number of toll recorder cycles in this counter.

*Exit station tour of duty recorder circuit operation.*— Referring to Fig. 21a the insertion of a toll collector key (see also Fig. 9) into the exit station toll recorder causes key contacts 261–X to close. This applies power to lines 429 and 430 to energize relay R25. Relay R25 is maintained energized so long as power is applied to the toll recorder lines 429 and 430.

As described previously under Tour of Duty Recorder Mechanism, energization of magnet 397–X causes a tour of duty recorder print cycle, and the tour of duty recorder record sheet and ribbon advancement.

The transfer of contacts R25–2 (Fig. 21j) completes a circuit to control magnet 397–X from line 425 through contacts R25–2 n/o, R82–1 n/c, magnet 397–X to the other side of the line. The energization of magnet 397–X causes contacts 398–X and 399–X (see also Fig. 19) to close concurrently. With contacts R25–2 transferred, a circuit is compelted to relay R82 from line 425 through contacts R25–2 n/o, 399–X, relay R82 to line 424. R82 is maintained energized through a stick circuit from line 425 through contacts R25–2, R82–1 n/o, relay R82 to the other side of the line. It is to be observed that the transfer of contacts R82–1 opens the circuit to magnet 397–X.

Removal of the collector key from the exit station toll recorder at the end of the tour of duty causes contacts 261–X to open, and relay R25 to de-energize. Thus, magnet 397–X is energized once again from line 425 through contacts R25–2 n/c, R83–1 n/c, magnet 397–X to the other side of the line. When contacts 398–X and 399–X are caused to close concurrently, relay R83 is energized from line 425 through contacts R25–2 n/c, 398–X, relay R83 to the other side of the line. The resulting transfer of contacts R83–1 causes the de-energization of magnet 397–X.

A push button switch 530 is available to energize magnet 397–X at will. Since the switch and the magnet are in a tour of duty recorder which is in a locked cabinet remotely positioned from the toll recorder, only a toll collector supervisor will have access to the switch.

*Exit station tour of duty card circuit.*—A tour of duty card toll recorder cycle is effected upon full insertion of the tour of duty card (see also Fig. 5) into the card receiver with proper regard to the position of corner cut, and the depression of a tour of duty key in a unit 43 shown in Fig. 1. Depression of this key causes contacts 531 (Fig. 21e) to close and relay R57 to energize. The energization of relay R57 causes contacts R57–1 (Fig. 21b) and R57–2 to transfer, and to thereupon prevent the application of a voltage on wire 448. Since wire 448 is connected to the interposer punch magnets, none of the items of information controlled by these magnets can be punched in a tour of duty card during a tour of duty card recorder cycle.

The full and proper insertion of a tour of duty card into the card receiver of the exit toll recorder causes a circuit to be completed to card sensing magnet 165 (Fig. 21e). The energization of this magnet renders the card sensing mechanism (see also Fig. 15) operative. Thus, a circuit is completed to release card interposer magnet 153–X (Fig. 21b) from line 429 to contacts 343–X n/c, card sensing bail contacts 184, exit cancellation contacts 465 n/c, contacts R57–5, magnet 153–X to the other side of the line. As a result of energizing magnet 153–X, release card interposer contacts 155–X are closed to complete a circuit to punch and print clutch interlock relay R45. This circuit is from line 429 through contacts 343–X n/c, cam contacts C10, release card interposer contacts 155–X, relay contacts R57–1 n/o, R27–2, or R82–X if a minute advance causes the energization of relay R27, relay R45P to the other side of the line. The energization of relay R45P completes a circuit to punch and print clutch magnet 203–X (see also Fig. 8) from line 429 through contacts 343–X n/c, 184, 465 n/c, R57–5, R45–4, R57–6, cam contacts C12, magnet 203–X, to the other side of the line.

The energization of this magnet causes one complete revolution of shaft 156 to thereby effect a tour of duty card toll recorder cycle. As is shown in Fig. 5, only the exit station toll recorder station number is punched in the tour of duty card.

Summary

Referring to Fig. 1, prior to entering upon the toll highway a vehicle 20 passes over entrance station axle treadle 22 positioned in the entrance lane. One pulse for each axle passing over treadle 22 is directed to counters in tour of duty recorder 23 in which one counter accumulates the number of axles passing over treadle 22 in a forward direction and another counter accumulates the number of axles passing over the treadle in a reverse direction. After passing over the treadle, the vehicle is stopped opposite entrance station stop booth 21 for examination and classification determination by the entrance station toll collector. This toll collector depresses an axle key in unit 25 which corresponds to the number of axles on vehicle 20. He also depresses a classification key in unit 24 corresponding to his classification determination. Subsequent full and proper insertion of a trip card (see also Fig. 2) in the card receiver of the toll recorder 27 causes an entrance station toll recorder cycle only if the toll collector key is inserted in toll recorder 27. That is, the toll recorder will not start a recorder cycle if the key is not inserted.

An entrance station toll recorder cycle will partially process the trip card inserted in toll recorder 27 by recording on the trip card the following information:

(1) Sequence number, one for each card processed at the entrance station.

(2) The day of the year; 1 through 366.

(3) Hour of the day; 0 through 23.

(4) Minute of the hour; 0 through 59.

(5) The toll collector's identification number which is embossed on the toll collector key.

(6) Station lane identification number.

The preceding six items of information are printed on the face of the trip card. The following items of information are punched in the card:

(1) Classification number 1 through 12 determined by the key depressed in unit 24.

(2) Station number whose punch is preset.

(3) The number of axles keyed, 1 through 6, determined by the key depressed in unit 25.

(4) A time of trip control value for determining, in part, excess time required to move vehicle 20 from the entrance station to the exit station within a zone checking area.

During the entrance station toll recorder cycle, pulses are directed from toll recorder 27 to tour of duty recorder 23 so that a counter in recorder 23 accumulates the number of axles keyed in unit 25. In addition, a sequence count is accumulated in recorder 23 to indicate the number of toll recorder cycles.

After completion of a toll recorder cycle, the entrance station toll collector removes the trip card from toll recorder 27. This card is given to the vehicle operator for transmittal to an exit station.

To leave the toll highway at any exit station, vehicle 20 is driven onto an exit lane and is stopped opposite exit station stop booth 30. The trip card received by the vehicle operator from the entrance station toll collector is given to the exit station toll collector. In the event a vehicle operator loses his trip card, he may be penalized the toll for a trip from the most distant entrance station to the particular exit station at which he is leaving the toll highway. Each exit station toll collector has access to prepunched classification trip cards having the entrance station number of the most distant station also prepunched thereon. Thus, the exit station toll collector will insert the prepunched trip card corresponding with the classification determination made by him, into tour of duty recorder 37 in place of the lost trip card.

However, prior to inserting either the trip card carried by the vehicle operator or the prepunched one used in place of a lost card, into the tour of duty recorder 37, the collector depresses the axle key in unit 32 corresponding to the number of axles on the vehicle. Upon subsequent full and proper insertion of the card in recorder 33, a card sensing mechanism is rendered operative to analyze the perforated markings on the card for the following items of information:

(1) Entrance station number; this is to verify that the trip card has been previously processed at an entrance station. The absence of an entrance station number will prevent an exit station toll recorder cycle and indicate this to the exit station toll collector by the energization of a card release light on a signal panel. The collector must remove the trip card from the toll recorder, and will penalize the vehicle operator as if he had lost his trip card.

(2) Time of trip control value; a comparison is made between the actual time control value at the exit station and the time control value punched in the trip card at the entrance station. If excess time of travel is indicated for a vehicle passing over the toll highway within a zone checking area, an exit station toll recorder cycle is prevented. This is indicated to the toll collector by the energization of an excess time light. This light is simply a signal to the toll collector to take whatever action the toll highway authority may direct, such as writing the license plate number of vehicle 20 on the trip card. After taking whatever action is necessary, the toll collector depresses a release key to permit the toll recorder to cycle.

(3) The number of vehicle axles keyed; the value represented by this information should agree with the number of axles keyed by the depression of the axle key in exit station unit 32. Upon disagreement, a recorder cycle is prevented and an axle error light is energized to so apprise the toll collector. The collector must re-examine vehicle 20 to ascertain that the proper axle key in unit 32 is depressed. If the axle key depressed is correct, a recorder release key is actuated to permit a recorder cycle. However, if the toll collector had depressed the wrong axle key, depression of the correct one will automatically cause the recorder to complete a cycle.

(4) The absence of an exit cancelation hole to verify that the trip card has not been previously processed at an exit station. If a cancelation hole is sensed, a toll recorder cycle will be prevented and a card release light is energized to apprise the toll collector. This trip card must be removed from recorder 33. The vehicle operator is penalized as if he had lost his trip card.

If the preceding four conditions are met and the exit station toll collector key is inserted in the recorder, recorder 33 will complete a cycle to process the trip card. The following information is printed on the card (see also Fig. 2):

(1) A sequence number.
(2) Day of the year.
(3) Hour of the day.
(4) Minute of the hour.
(5) Exit station toll collector's identification number.
(6) Lane identification number.

The following information is punched in the trip card during the toll recorder cycle:

(1) Exit cancelation hole.
(2) Exit station number.
(3) The number of vehicle axles 1 through 6 determined by the depression of a key in unit 32.
(4) No excess time indication hole indicating that vehicle 20 has moved from an entrance station in one zone checking area to an exit station in another zone checking area, or from an entrance station in a zone checking area to an exit station in the same zone checking area within the predetermined time limit.
(5) Axles in error, 0 through 9, indicating the difference between the number of axles keyed in unit 32 and the number of axles passing over exit station axle treadle 31. It is apparent that since vehicle 20 has not as yet passed over treadle 31, the axles in error information punched in the trip card associated with vehicle 20 must relate to some other vehicle. The circuits are arranged in the preferred embodiment of this invention so that the axles in error information punched in a trip card relates to a vehicle preceding the vehicle with which the trip card is associated.
(6) Type of axles in error; either plus or minus to indicate the axle keyed value set up by a key in unit 32 is greater than, or less than, respectively, the number of axles passing over treadle 31.

After an exit station toll recorder cycle, the trip card is removed from the recorder 33 and the toll required for the privilege of passing over the toll highway is read on the back side of the trip card (see also Fig. 3).

After paying his toll, the operator of vehicle 20 will pass over axle treadle 31 when he leaves the exit lane associated with stop booth 30. One pulse for each axle passing over treadle 31 is directed to tour of duty recorder 37 and zero control counter 34. Recorder 37 includes a counter for accumulating the number of axles passing over treadle 31 in a forward direction, and a counter for accumulating the number of axles passing over the treadle in a reverse direction. The zero control counter 34 determines the axles in error number, if any. This information is caused to be punched in the trip card associated with the vehicle immediately following vehicle 20. In addition, recorder 37 includes a counter for accumulating the number of axles keyed in unit 32.

When a toll collector starts his period of duty, he must process a tour of duty card in the toll recorder before processing any trip cards. Upon full and proper insertion of a tour of duty card in a toll recorder, for example, recorder 27, and the depression of a tour of duty key in unit 42, a recorder cycle is effected to print the same information on the tour of duty card as is printed on a trip card. However, only the station number is punched in the tour of duty card in recorder 27.

Similarly, when a toll collector goes off duty, he must process his tour of duty card a second time. However, this time the tour of duty card is insertedt in the recorder so that the information is marked on the reverse face of the card.

Prior to processing a tour of duty card at the start of his tour, and after processing his tour of duty card for a second time at the completion of his tour, the toll collector must insert and remove, respectively, from the toll recorder, for example recorder 27, his toll collector key. The insertion and the removal of this key causes recording operations of tour of duty recorder 23 so that the following information is printed upon a record sheet:

(1) Total axles keyed as a result of the depression of keys in unit 25.

(2) Forward axle count as determined by the total number of axles passing over treadle 22 in a forward direction.

(3) Reverse axle count as determined by the total number of axles passing over treadle 22 in a reverse direction.

(4) Sequence number indicating the total number of toll recorder cycles.

(5) The station number.

(6) The lane number.

Thus, at the end of a tour of duty a summary report relating to the number and type of vehicles passing through the entrance station is printed on a record in tour of duty recorder 23. Similarly, an exit station summary is available in recorder 33. The exit station toll collector will also have in his possession a number of trip cards, and prepunched cards replacing lost trip cards relating to the number and types of vehicles having passed through the exit station. These various cards are directed to a centrally located punched card accounting bureau for processing through accounting machines such as the well-known IBM punched card machines. Accordingly, various kinds of accurate accounting reports may be obtained rapidly. These reports may be checked against the summary totals printed on the record sheets in tour of duty recorders 23 and 37.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a toll highway recorder for processing a record which is associated with a vehicle passing over the toll highway, a vehicle axle recording device comprising an apparatus having normally inoperative digit representing members each of which is indicative of a number of vehicle axles, a plurality of settable keys each of which is associated with a corresponding one of said members, an axle treadle including a mechanism actuated in response to a vehicle axle passing over said treadle, a first means operatively connecting said keys to said apparatus whereby a first one of said members is rendered operative to indicate a number of vehicle axles when a corresponding key is set, and a second means controlled by the first one of said members operatively connecting said treadle mechanism to said apparatus whereby a second one of said members is rendered operative when a vehicle axle is passed over said treadle to indicate one less number of axles than that indicated by the first one of said members.

2. In a toll highway recorder for processing a record which is associated with a vehicle passing over the toll highway, a vehicle axle recording device comprising an apparatus having normally inoperative digit representing members each of which is indicative of a number of vehicle axles, a plurality of settable keys each of which is associated with a corresponding one of said members, an axle treadle including a mechanism actuated in response to a vehicle axle passing over said treadle, a first means operatively connecting said keys to said apparatus whereby a first one of said members is rendered operative when a corresponding key is set, a second means controlled by the first one of said members operatively connecting said treadle mechanism to said apparatus whereby a second one of said members is rendered operative, recording means, recorder control means, means controlled by the second one of said members for conditioning said recording means to effect a record processing operation in response to said control means whereby information indicative of the number of axles represented by the second one of said members is placed on the record.

3. A toll highway recorder for processing a record which is associated with a vehicle passing over the toll highway comprising an apparatus having sequentially connected vehicle axle representing members each of which is indicative of a different number of vehicle axles and each of which controls operation of a succeeding member indicative of one fewer number of vehicle axles, a plurality of settable keys each of which is associated with a corresponding one of said members, an axle treadle including a mechanism controlled by axles passing over said treadle, a first means operatively connecting each one of said keys to a corresponding one of said members whereby a first one of said members is rendered operative when a corresponding key is set, and a second means operatively connecting said treadle mechanism and said apparatus whereby succeeding ones of said members to the first one of said members are rendered operative sequentially in response to axles passing over said treadle.

4. A vehicle axle indicating device comprising a plurality of axle representing members each of which is indicative of a different number of axles, a first means operable to select any one of said members to effect a first representation of a number of axles, a second means controlled in part by said first means and operable to select any one of said members to effect a second representation of a number of axles, differing by a selected amount from said first representation, and a third means controlled by the axles on a vehicle for controlling said second means so that the second representation is the difference count between the number of axles indicated by the first representation and the number of axles on the vehicle.

5. A device according to claim 4 additionally comprising error designating means controlled by the second one of said members for indicating the difference count.

6. A device according to claim 5 additionally comprising a complement designating element controlled by said second means for indicating that the difference count is negative value.

7. A toll highway recorder for processing a record which is associated with a vehicle passing over the toll highway comprising an apparatus having vehicle axle representing relays each of which includes a contact for controlling that one of said relays which is indicative of a number of axles one less than the number of axles represented by the controlling relay, an axle treadle including a switch controlled by axles passing over said treadle, a plurality of manually settable keys each of which is associated with a corresponding relay, a power source for energizing said relays, a first electric circuit controlled by said keys for connecting said relays to said power source in such a way that a first one of said relays is operated to effect a first representation of a number of axles when a corresponding key is set, and a second electric circuit controlled conjointly by the first one of said relays operated and by said switch for connecting said relays to said power source in such a way that a second one of said relays is operated to effect a second representation of a number of axles.

8. A toll highway recorder for processing a record which is associated with a vehicle passing over the toll highway comprising a plurality of normally de-energized vehicle axle representing relays each of which includes a first contact for controlling that one of said relays which is indicative of a number of axles one less than the number of axles represented by the controlling relay and a second contact for controlling that one of said relays which is indicative of a number of axles one greater than the number of axles represented by the controlling relay, a first electric circuit for energizing a first one of said relays to effect a first representation of a number of axles, a second electric circuit controlled by the first contact of the first one of said relays for energizing a second one of said relays to effect a second representation of a number of axles, and a third electric circuit controlled by the second contact of the second one of said relays for de-energizing the first one of said relays after the second one of said relays is energized.

9. A recorder according to claim 8 additionally comprising a recording means having recording elements each of which is associated with a corresponding one of said relays, recorder control means, and a fourth electric circuit operatively connecting said recording means and that one of said relays in an energized state to condition said recording means to effect a record processing operation in response to operation of said control means whereby information according to the second representation of a number of axles is placed on the record.

10. A toll highway recorder for processing a record which is associated with a two axle vehicle passing over the toll highway comprising an apparatus having vehicle axle representing relays each of which includes a contact for controlling that one of said relays which is indicative of a number of axles one less than the number of axles represented by the controlling relay, an axle treadle including a switch controlled by axles passing over said treadle, a manually settable key associated with a corresponding one of said relays, a first electric circuit controlled by said key for causing a first one of said relays to effect a first represntation of two axles when said key is set, and a second electric circuit controlled by said switch for causing a second one of said relays which is controlled by the contact of the first one of said relays to effect a second representation of one axle in response to the first of the two axles passing over said treadle.

11. A device in a toll recorder system for verifying a vehicle axle count set up on an axle unit comprising an accumulator apparatus having a plurality of axle count representing members operable in a given sequence and each member save the last being indicative of an axle count one greater than that indicated by the next succeeding member in the sequence, a mechanism controlled by axles passing over a given point on a toll highway, a first electrical means controlled by the axle unit for selectively operating one of said members to effect an axle count corresponding in said apparatus to the axle count set up on the axle unit, and a second electrical means controlled by said mechanism for sequentially operating the members succeeding said first operated member at the rate of one member for each axle passing over said point on the toll highway so that the finally operated member represents a difference axle count between the axle count set up on the axle unit and the actual number of axles passing over said point on the toll highway.

12. A vehicle axle indicating device comprising a plurality of axle representing members operable in a given sequence to indicate progressively different numbers of axles, a first means for selectively operating one of said members to effect a first representation of a number of axles, a second means for operating in a progressive fashion the members in said sequence succeeding the first selected member to effect a second representation of a number of axles, and a third means controlled by axles carried on a vehicle for controlling the extent to which said second means operates said members in accordance with the number of axles on the vehicle.

13. A toll highway recorder for processing a record which is associated with a two axle vehicle passing over the toll highway comprising an apparatus having vehicle axle representing relays each of which includes a contact for controlling that one of said relays indicative of a number of axles one less than the number of axles represented by the controlling relay, an axle treadle including a switch controlled by axles passing over said treadle, a manually settable key associated with a corresponding relay, a first electric circuit controlled by said key for causing said corresponding relay to effect a first representation of two axles when said key is set, a second electric circuit controlled by said switch for operating succeeding relays connected sequentially to said corresponding relay in response to axles passing over said treadle so as to cause a second one of said relays to effect a second representation of zero axles, axle error designating means, an operating circuit for said designating means, and means controlled by the second one of said relays for controlling said operating circuit.

References Cited in the file of this patent

UNITED STATES PATENTS

| | | |
|---|---|---|
| 1,351,056 | Moosmann | Aug. 31, 1920 |
| 1,358,921 | Baluta | Nov. 16, 1920 |
| 2,155,928 | Brand | Apr. 25, 1939 |
| 2,268,447 | Ghertman | Dec. 30, 1941 |
| 2,514,054 | Hallden | July 4, 1950 |
| 2,536,837 | Carey et al. | Jan. 2, 1951 |
| 2,545,460 | Hall | Mar. 20, 1951 |
| 2,551,977 | Smith | May 8, 1951 |
| 2,583,377 | Hurni | Jan. 22, 1952 |
| 2,591,448 | Lorenz | Apr. 1, 1952 |
| 2,603,419 | Barker et al. | July 15, 1952 |
| 2,659,533 | Quinby et al. | Nov. 17, 1953 |